United States Patent
Nakamoto et al.

(10) Patent No.: US 11,926,031 B2
(45) Date of Patent: Mar. 12, 2024

(54) ELECTRIC WORK MACHINE

(71) Applicant: MAKITA CORPORATION, Anjo (JP)

(72) Inventors: Akihiro Nakamoto, Anjo (JP); Hitoshi Suzuki, Anjo (JP)

(73) Assignee: MAKITA CORPORATION, Anjo (JP)

(*) Notice: Subject to any disclaimer, the term of this patent is extended or adjusted under 35 U.S.C. 154(b) by 407 days.

(21) Appl. No.: 17/418,595

(22) PCT Filed: Dec. 20, 2019

(86) PCT No.: PCT/JP2019/050169
§ 371 (c)(1),
(2) Date: Jun. 25, 2021

(87) PCT Pub. No.: WO2020/137907
PCT Pub. Date: Jul. 2, 2020

(65) Prior Publication Data
US 2022/0072694 A1 Mar. 10, 2022

(30) Foreign Application Priority Data
Dec. 26, 2018 (JP) ................. 2018-242995

(51) Int. Cl.
H02P 23/20 (2016.01)
B25F 5/00 (2006.01)
H02P 6/24 (2006.01)

(52) U.S. Cl.
CPC . B25F 5/00 (2013.01); H02P 6/24 (2013.01)

(58) Field of Classification Search
CPC ....................................................... H02P 6/24
See application file for complete search history.

(56) References Cited

U.S. PATENT DOCUMENTS

2005/0127862 A1 6/2005 Glasgow et al.
2007/0069672 A1 3/2007 Glasgow et al.
(Continued)

FOREIGN PATENT DOCUMENTS

CN 102947057 A 2/2013
CN 103227608 A 7/2013
(Continued)

OTHER PUBLICATIONS

Apr. 21, 2023 Office Action Issued in Russian Patent Application No. 2021121440.
(Continued)

*Primary Examiner* — Muhammad S Islam
(74) *Attorney, Agent, or Firm* — Oliff PLC

(57) ABSTRACT

An electric work machine includes a motor, a manipulator, a first switch, a second switch, and a control circuit. The manipulator is on-operated or off-operated by a user of the electric work machine. Each of the first switch and the second switch is turned on or off in response to the manipulator being on-operated or off-operated. The control circuit executes a motor control process in accordance with a computer program. The control circuit receives first switch information from the first switch, and receives second switch information from the second switch. The motor control process outputs a drive command for driving the motor in response to the first switch information and the second switch information indicating that the manipulator is on-operated.

13 Claims, 23 Drawing Sheets

(56) References Cited

U.S. PATENT DOCUMENTS

| | | |
|---|---|---|
| 2009/0229957 A1 | 9/2009 | Nishimiya et al. |
| 2010/0001675 A1 | 1/2010 | Matsunaga et al. |
| 2010/0163266 A1 | 7/2010 | Matsunaga et al. |
| 2011/0056715 A1* | 3/2011 | Vanko ................ B25F 5/00 173/217 |
| 2013/0082631 A1 | 4/2013 | Suzuki et al. |
| 2015/0355280 A1 | 12/2015 | Iwata |
| 2016/0028344 A1 | 1/2016 | Kusakawa et al. |
| 2017/0093315 A1* | 3/2017 | Ichikawa ............ H02P 27/08 |
| 2017/0093321 A1 | 3/2017 | Ichikawa |
| 2017/0129090 A1 | 5/2017 | Yamamoto |
| 2020/0067435 A1 | 2/2020 | Nishimiya et al. |

FOREIGN PATENT DOCUMENTS

| | | |
|---|---|---|
| CN | 104903058 A | 9/2015 |
| CN | 105291059 A | 2/2016 |
| CN | 106553162 A | 4/2017 |
| CN | 106560996 A | 4/2017 |
| CN | 106921315 A | 7/2017 |
| EP | 2 621 072 A2 | 7/2013 |
| EP | 3 840 211 A1 | 6/2021 |
| JP | H11-203974 A | 7/1999 |
| JP | 2012-000726 A | 1/2012 |
| JP | 5463014 B2 | 4/2014 |
| JP | 2016-022566 A | 2/2016 |
| JP | 2018-083254 A | 5/2018 |
| RU | 2 442 683 C2 | 2/2012 |
| RU | 2 494 857 C2 | 10/2013 |

OTHER PUBLICATIONS

Feb. 18, 2020 International Search Report issued in International Patent Application No. PCT/JP2019/050169.

Jun. 16, 2021 International Preliminary Report on Patentability issued in International Patent Application No. PCT/JP2019/050169.

Feb. 18, 2020 Written Opinion issued in International Patent Application No. PCT/JP2019/050169.

Jun. 28, 2022 Office Action issued in Japanese Application No. 2020-563213.

Aug. 1, 25, 2022 extended Search Report issued in European Application No. 19905477.6.

Dec. 20, 2022 Office Action issued in Japanese Patent Application No. 2020-563213.

Dec. 26, 2022 Office Action issued in Indian Patent Application No. 202117032637.

Apr. 17, 2023 Office Action Issued in Chinese Patent Application No. 201980085650.1.

Jan. 10, 2024 Office Action issued in Chinese Application No. 201980085650.1.

* cited by examiner

ELECTRIC WORK MACHINE

CROSS-REFERENCE TO RELATED APPLICATION

This international application claims the benefit of Japanese Patent Application No. 2018-242995 filed on Dec. 26, 2018 with the Japan Patent Office, and the entire disclosure of Japanese Patent Application No. 2018-242995 is incorporated herein by reference.

TECHNICAL FIELD

The present disclosure relates to an electric work machine.

BACKGROUND ART

Patent Document 1 below discloses an electric power tool provided with an operation switch to be turned on or off by a user, a control circuit, a drive circuit, and a motor. In this electric power tool, the control circuit outputs a control signal to the drive circuit when recognizing that the operation switch is turned on. The drive circuit drives the motor based on the control signal inputted from the control circuit.

PRIOR ART DOCUMENTS

Patent Documents

Patent Document 1: Japanese Patent No. 5463014

SUMMARY OF THE INVENTION

Problems to be Solved by the Invention

When operation of the operation switch by the user is not properly transmitted to the control circuit, for example, due to a failure of the operation switch, the motor may be driven or stopped against the user's intention.

In one aspect of the present disclosure, it is desirable to provide an electric work machine that can properly stop the motor when a failure occurs in which the user's operation is not properly transmitted to the control circuit.

Means for Solving the Problems

An electric work machine in one aspect of the present disclosure includes a motor, a manipulator, a first switch, a second switch, and a control circuit. The manipulator is configured to be on-operated or off-operated by a user of the electric work machine. The first switch is configured to be turned on or off in response to the manipulator being on-operated or off-operated. The second switch is configured to be turned on or off in response to the manipulator being on-operated or off-operated.

The control circuit is configured to execute a motor control process in accordance with a computer program (that is, by software processing based on a specific program). The control circuit receives first switch information indicating a state of the first switch from the first switch. The control circuit further receives second switch information indicating a state of the second switch from the second switch, separately from the first switch information. The motor control process includes outputting a drive command for driving the motor in response to the first switch information and the second switch information indicating that the manipulator is on-operated.

In the electric work machine configured as above, the control circuit executes the motor control process in accordance with the states of both the first switch and the second switch. Specifically, the control circuit outputs the drive command when the first switch information and the second switch information indicate that the manipulator is on-operated. For example, when a failure occurs to the first switch and the first switch information indicates the on-operation of the manipulator although the manipulator is off-operated, the drive command is not outputted if the second switch information indicates the off-operation of the manipulator. Accordingly, when a failure occurs in which the user's operation is not properly transmitted to the control circuit, the motor can be stopped properly.

The electric work machine may further include a drive stop circuit. The drive stop circuit may be configured to be operated by hardware processing. In other words, the operation executed by the drive stop circuit may be implemented by hardware (hardware method or hard wired method) without relying on software processing (software method). The drive stop circuit may receive the first switch information and the second switch information. The drive stop circuit may be configured to disable the drive command outputted from the control circuit thereby to stop the motor in response to the state of the first switch indicated by the first switch information and/or the state of the second switch indicated by the second switch information corresponding to an off-operated state of the manipulator.

In the electric work machine configured as above, even if a failure occurs to the control circuit and the drive command is outputted from the control circuit although the manipulator is off-operated, the motor is stopped by the drive stop circuit. Thus, reliability of the electric work machine can be improved.

The electric work machine may further include a drive circuit. The drive circuit may be configured to receive the drive command from the control circuit. The drive circuit may be configured to supply electric power to the motor thereby to drive the motor in response to receiving the drive command. The drive stop circuit may be configured to interrupt the drive command to the drive circuit thereby to stop the motor.

In the electric work machine configured as above, the drive stop circuit can easily stop the motor when the first switch information and/or the second switch information indicate the off-operation of the manipulator.

The drive stop circuit may include a stop signal output circuit and an interruption circuit. The stop signal output circuit may be configured to output a stop signal in response to the state of the first switch indicated by the first switch information and/or the state of the second switch indicated by the second switch information corresponding to the off-operated state of the manipulator. The interruption circuit may be configured to receive the stop signal, and interrupt the drive command to the drive circuit in response to receiving the stop signal.

In the electric work machine configured as above, when the first switch information and/or the second switch information indicate the off-operation of the manipulator, input of the drive command to the drive circuit can be easily interrupted, and thus the motor can be easily stopped.

The control circuit may be configured to receive the stop signal from the stop signal output circuit.

In the electric work machine configured as above, the control circuit can effectively use the stop signal outputted by hardware processing in the motor control process, for example.

Specifically, the control circuit may be configured not to output the drive command in response to (i) the first switch information and the second switch information indicating that the manipulator is on-operated, and (ii) the control circuit receiving the stop signal.

When the first switch information and the second switch information indicate that the manipulator is on-operated, and the control circuit receives the stop signal, there is a possibility that the first switch information and the second switch information do not indicate the actual operation state of the manipulator correctly for some reason. In other words, for example, it is possible that both the first switch information and the second switch information indicate the on-operation of the manipulator although the manipulator is actually off-operated. Thus, reliability of the electric work machine can be increased by not outputting the drive command when the stop signal is inputted from the stop signal output circuit.

The control circuit may be configured not to output the drive command even if the first switch information and the second switch information change to indicate the on-operation of the manipulator, in a situation where the control circuit has not received the stop signal while the first switch information and/or the second switch information indicate that the manipulator is off-operated.

Also, when the control circuit has not received the stop signal while the first switch information and/or the second switch information indicate that the manipulator is off-operated, there is a possibility that the first switch information and/or the second switch information inputted to the control circuit do not indicate the actual state of the manipulator correctly for some reason. In other words, for example, it is possible that both the first switch information and the second switch information indicate the off-operation although the manipulator is actually on-operated. Thus, in this case as well, reliability of the electric work machine can be improved by not outputting the drive command.

The control circuit may be configured to output a pseudo-ON signal. The electric work machine may further include a pseudo-ON circuit. The pseudo-ON circuit may be configured to receive the pseudo-ON signal. The pseudo-ON circuit may set the first switch information to indicate that the manipulator is on-operated in response to receiving the pseudo-ON signal.

The control circuit may store first information indicating a first failure state. The control circuit may be configured to further execute an output process and a first memory process. The output process may include outputting the pseudo-ON signal in response to the first switch information and the second switch information indicating that the manipulator is off-operated. The first memory process may include storing the first information in response to the control circuit not receiving the stop signal while the pseudo-ON signal is outputted by the output process.

The control circuit may be configured not to output the drive command in response to (i) the first switch information and the second switch information indicating that the manipulator is on-operated, and (ii) the first information being stored in the control circuit.

In the electric work machine configured as above, the control circuit can confirm whether the stop signal output circuit properly operates by outputting the pseudo-ON signal. In other words, when the first switch information is forcibly set to indicate the on-operation of the manipulator by the pseudo-ON signal while the second switch information indicates the off-operation, the stop signal should be outputted if the stop signal output circuit properly operates. In this case, if the stop signal is not outputted, it is possible that the stop signal output circuit does not properly operate. In a case as such, reliability of the electric work machine can be increased by the control circuit not outputting the drive command.

The control circuit may store second information indicating a second failure state. The control circuit may be configured to further execute a second memory process. The second memory process may include storing the second information in response to (i) the control circuit outputting the pseudo-ON signal, and (ii) the first switch information not indicating that the manipulator is on-operated.

The control circuit may be configured not to output the drive command in response to (i) the first switch information and the second switch information indicating that the manipulator is on-operated, and (ii) the second information being stored in the control circuit.

When the first switch information indicates the off-state although the pseudo-ON signal is outputted, there is a possibility that the pseudo-ON circuit does not operate properly, or some other failure has occurred. Thus, in a case as such, reliability of the electric work machine can be further increased by the control circuit not outputting the drive command.

The first switch may be turned off in response to the manipulator being on-operated. The first switch may be turned on in response to the manipulator being off-operated. On the other hand, the second switch may be turned on in response to the manipulator being on-operated. The second switch may be turned off in response to the manipulator being off-operated.

In other words, in response to the operation to the manipulator, the first switch and the second switch may be configured to be in opposite states to each other (that is, when one is ON, the other is OFF, and, when one is OFF, the other is ON).

The manipulator may be configured such that an operation amount of the manipulator is changed in conjunction with the manipulator being on-operated. The electric work machine may further include an information output circuit including the second switch. The information output circuit may output the second switch information. The information output circuit may output the second switch information including information indicating the operation amount while the second switch is ON. The control circuit may be configured to output the drive command in accordance with the operation amount indicated by the second switch information.

In the electric work machine configured as above, driving of the motor can be controlled in response to the operation amount of the manipulator by the user. Specifically, for example, driving of the motor may be controlled so that the rotational speed of the motor increases in accordance with an increase in the operation amount.

The second switch information may be indicated by a voltage corresponding to an operation state of the manipulator. More specifically, the information output circuit may output an off-voltage that corresponds to OFF of the second switch as the second switch information, in response to turning-off of the second switch. The information output circuit may output an initial on-voltage that is lower than the off-voltage as the second switch information, in response to change of the second switch from OFF to ON. The information output circuit may reduce the voltage from an initial on-voltage value in accordance with the operation amount while the second switch is ON.

In the electric work machine configured as above, when the second switch changes from OFF to ON, the voltage indicating the second switch information is reduced to the initial on-voltage that is lower than the off-voltage. Thus, the control circuit can accurately recognize that the second switch is turned off.

EXPLANATION OF REFERENCE NUMERALS

1 . . . electric work machine, 3 . . . main body, 20 . . . trigger operating device, 21 . . . motor, 22 . . . motor drive circuit, 23 . . . control circuit, 24 . . . CPU, 25 . . . memory, 26 . . . trigger switch unit, 27 . . . first trigger switch, 28 . . . second trigger switch, 29 . . . interruption switch, 30 . . . main power switch, 36 . . . first switching circuit, 37, 47 . . . switch, 50 . . . overvoltage detection circuit, 60 . . . overheat detector, 61 . . . first overheat detection circuit, 62 . . . second overheat detection circuit, 63 . . . third overheat detection circuit, 70 . . . interruption latch circuit, 80 . . . trigger detection circuit.

MODE FOR CARRYING OUT THE INVENTION

Embodiments of the present disclosure will be described with reference to the drawings.

(1) Appearance of Electric Work Machine

Figure 1:
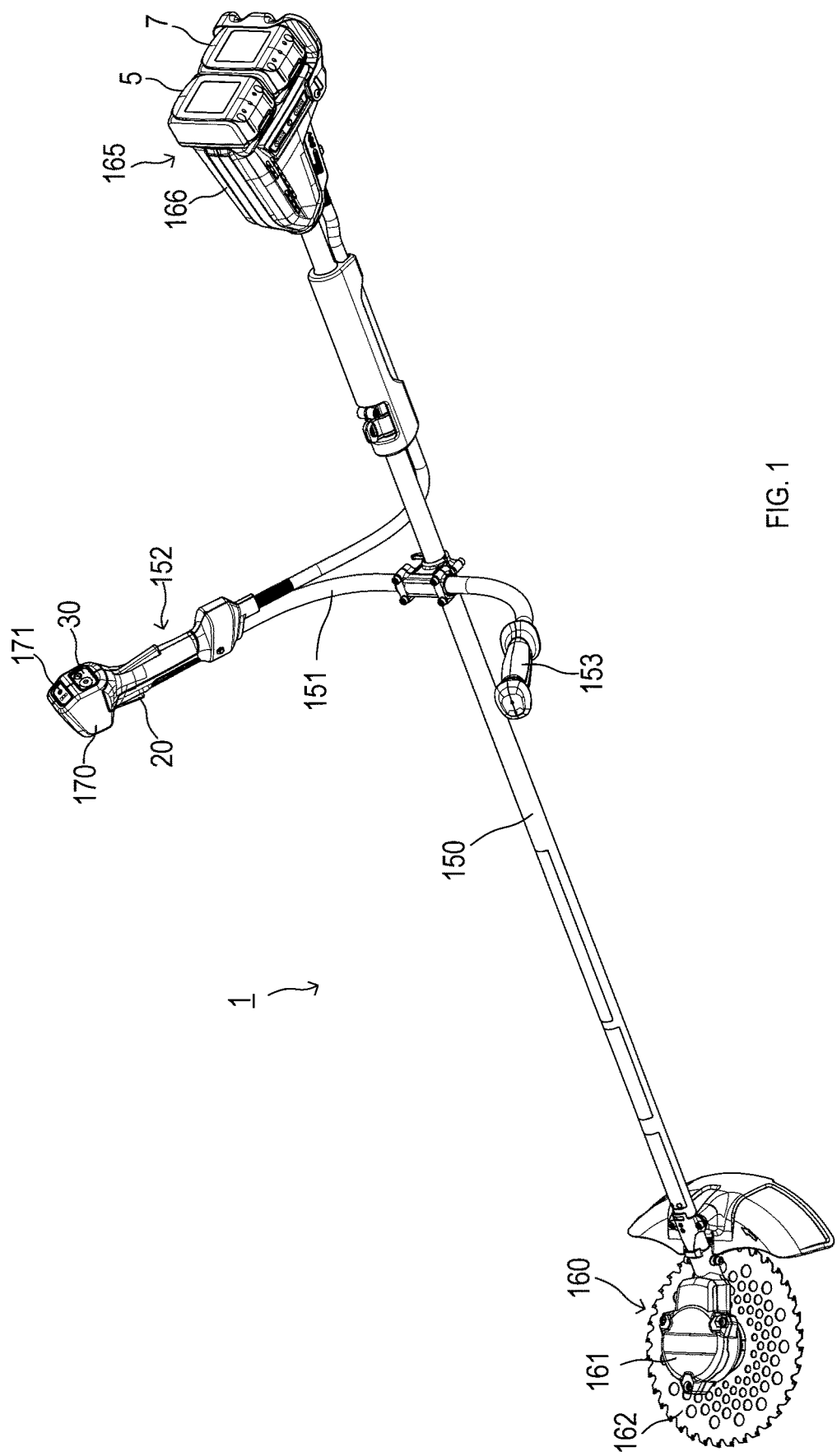
FIG. 1 is a perspective view of an electric work machine of an embodiment.

An electric work machine 1 shown in FIG. 1 is configured, for example, as a rechargeable bush/grass cutter. The rechargeable bush/grass cutter is used to cut bush/grass and small diameter trees. The electric work machine 1 includes a supporting pipe 150, a handle 151, a cutter 160, and a controller 165.

The supporting pipe 150 has a long cylindrical shape. The cutter 160 is provided at a first end of the supporting pipe 150. The controller 165 is provided at a second end of the supporting pipe 150.

The cutter 160 includes a housing 161. The housing 161 is fixed to the first end of the supporting pipe 150. The housing 161 houses a later-described motor 21 (see FIG. 2).

A rotary blade 162 can be attached to/detached from the housing 161. FIG. 1 shows the housing 161 with the rotary blade 162 attached thereto. The housing 161 is provided with a drive mechanism (not shown). The drive mechanism transmits rotation of the motor 21 to the rotary blade 162. When the motor 21 rotates, the rotary blade 162 rotates by a rotational driving force of the motor 21.

The controller 165 includes a housing 166. The housing 166 houses various circuits including a later-described control circuit 23 (see FIG. 2). A first battery pack 5 and a second battery pack 7 can be attached to/detached from the housing 166.

The handle 151 is provided substantially in the middle in a longitudinal direction of the supporting pipe 150. The handle 151 includes, for example, a U-shaped pipe. A first grip 152 is provided at a first end of the handle 151. A second grip 153 is provided at a second end of the handle 151. The first grip 152 is gripped, for example, with the right hand of a user of the electric work machine 1. The second grip 153 is gripped, for example, with the left hand of the user.

The first grip 152 is provided with a trigger operating device 20. The trigger operating device 20 is pulled by the user. Pulling is an operation to pull the trigger operating device 20 toward the first grip 152 with the finger or the like of the user, in other words, an operation to push the trigger operating device 20 into the first grip 152.

The trigger operating device 20 is biased in an operation release direction, which is opposite to a pulling direction, by an elastic member (not shown). As shown in FIG. 1, in a non-operation state where the trigger operating device 20 is not pulled by the user, most of the trigger operating device 20 protrudes from the first grip 152 due to a biasing force of the elastic member. When the trigger operating device 20 is pulled by the user, the trigger operating device 20 moves in the pulling direction (that is, toward the first grip 152) against the biasing force of the elastic member. The trigger operating device 20 moves in the pulling direction into the first grip 152.

The first grip 152 is further provided with an operation indicator 170. The operation indicator 170 includes a main power switch 30 and a display panel 171.

The main power switch 30 is operated by the user. The control circuit 23 to be described later enables (that is, turns on or activates) or disables (that is, turns off or inactivates) main operation (main power) of the electric work machine 1 in response to operation of the main power switch 30.

The main power switch 30 of the present embodiment may be a so-called momentary switch, for example. The momentary switch is turned on while being pressed by the user, and is turned off when the user releases the switch. When the main power switch 30 is a momentary switch, the control circuit 23 may alternately enable or disable the main operation each time the main power switch 30 is pressed and released. This press-release operation includes pressing the main power switch 30 and releasing the main power switch 30.

The main power switch 30 can be any switch. The main power switch 30 may be a so-called alternate switch, for example. The alternate switch is turned on and off alternately each time the user presses the switch. When the main power switch 30 is an alternate switch, the control circuit 23 may enable the main operation when the main power switch 30 is ON, and may disable the main operation when the main power switch 30 is OFF. The main power switch 30 may be, for example, a slide switch.

The display panel 171 displays various information. The various information may include, for example, information indicating whether the main operation is enabled, information indicating various states of the electric work machine 1, and the like. The display panel 171 may include any display device. The display panel 171 may include, for example, a liquid crystal display, a LED, and the like.

(2) Electrical Configuration of Electric Work Machine

Figure 2:
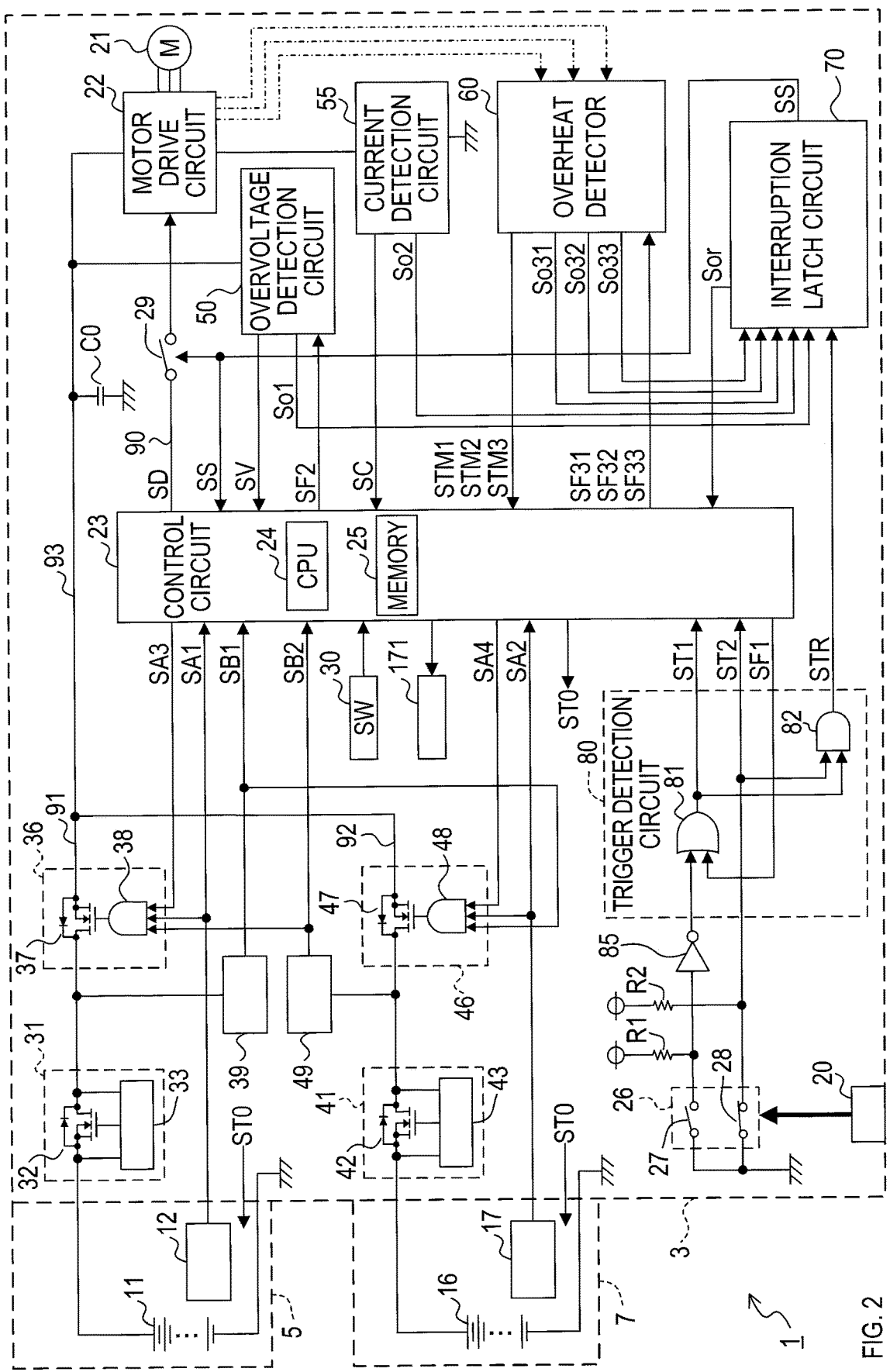
FIG. 2 is an explanatory diagram showing an electrical configuration of the electric work machine of the embodiment.
Figure 3:
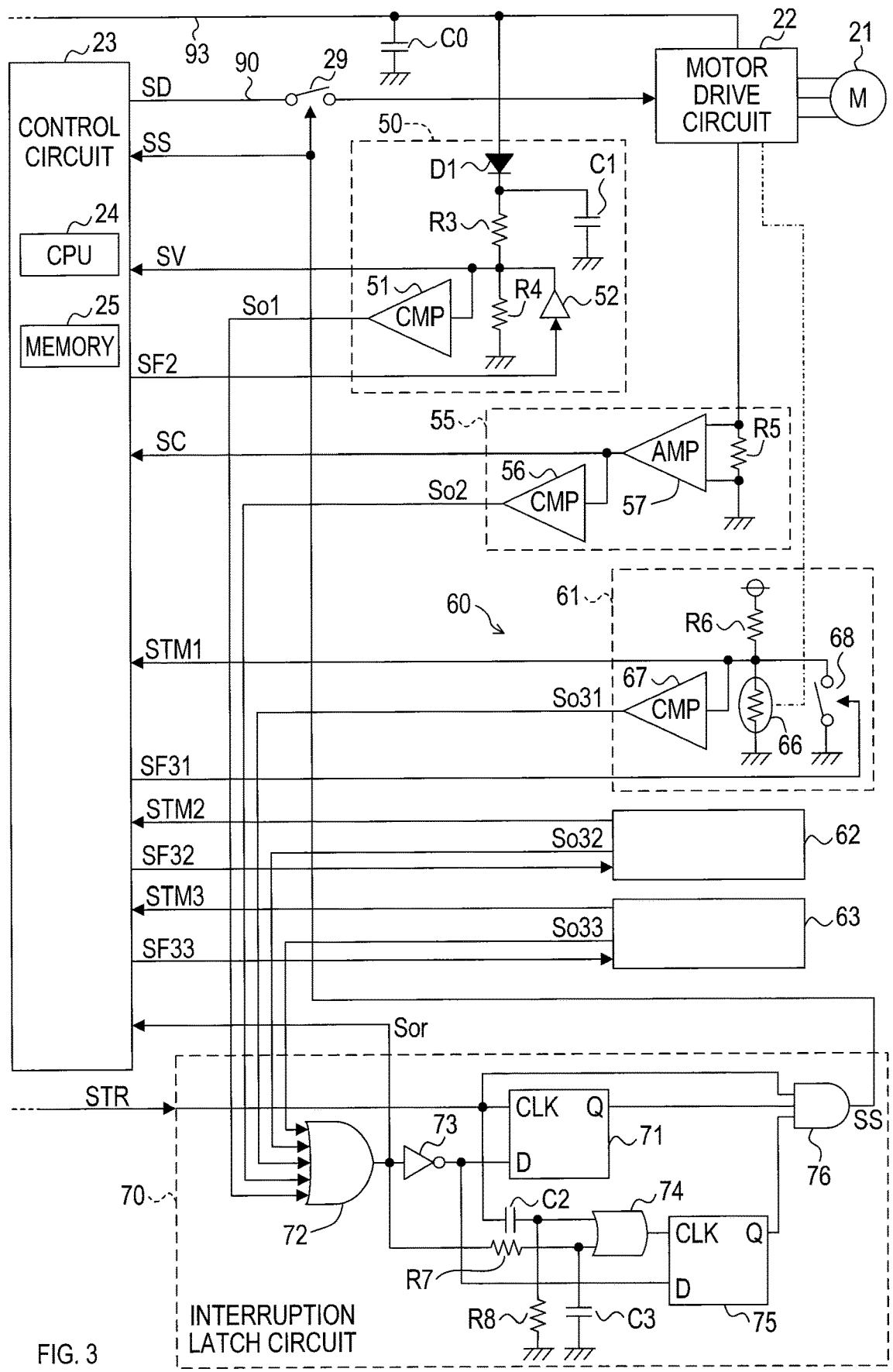
FIG. 3 is an explanatory diagram showing a part of the electric work machine shown in FIG. 2 in detail.

Referring to FIGS. 2 and 3, electrical configuration of the electric work machine 1 of the present embodiment will be described. FIG. 3 shows a portion of FIG. 2 (right side portion of the control circuit 23 in FIG. 2) in more detail. As shown in FIG. 2, the electric work machine 1 includes a main body 3, the first battery pack 5, and the second battery pack 7. In FIG. 2, for convenience of explanation, an assembly of various electrical components, various circuits, and the like provided in each part of the electric work machine 1 is referred to as the main body 3. The assembly includes the motor 21, various circuits in the housing 166, the trigger operating device 20 and the operation indicator 170.

The first battery pack 5 includes a battery 11 and a battery failure detection circuit 12. The battery 11 is, for example, a rechargeable battery. The battery 11 may be a non-rechargeable battery.

The battery failure detection circuit 12 monitors the first battery pack 5. The battery failure detection circuit 12 outputs a first discharge permission signal SA1 when not detecting a failure of the first battery pack 5 for a specific discharge instruction period. The battery failure detection circuit 12, for example, may monitor a state of the battery 11. More specifically, the battery failure detection circuit 12 may determine whether the battery 11 has a failure, for example, based on a value of voltage of the battery 11, a value of electric current discharged from the battery 11 and/or temperature of the battery 11. The battery failure detection circuit 12, when determining that the battery 11 has no failure, may indicate that the battery 11 has no failure by outputting the first discharge permission signal SA1. The battery failure detection circuit 12, when determining that the battery 11 has a failure, may indicate that the battery 11 has a failure by not outputting the first discharge permission signal SA1.

The first battery pack 5 receives trigger detection information ST0 to be described later from the main body 3. The specific discharge instruction period may be, for example, a period during which a logic level of the trigger detection information ST0 is high, that is, a period during which the trigger operating device 20 is on-operated, which will be described later.

The second battery pack 7 includes a battery 16 and a battery failure detection circuit 17. The second battery pack 7 is configured in the same manner as the first battery pack 5. The battery failure detection circuit 17 outputs a second discharge permission signal SA2 when not detecting a failure of the second battery pack 7 during the specific discharge instruction period. The battery failure detection circuit 17 may, for example, monitor a state of the battery 16. More specifically, the battery failure detection circuit 17 may determine whether the battery 16 has a failure, for example, based on a value of voltage of the battery 16, a value of electric current discharged from the battery 16 and/or temperature of the battery 16. The battery failure detection circuit, when determining that the battery 16 has no failure, may indicate that the battery 16 has no failure by outputting the second discharge permission signal SA2. The battery failure detection circuit 17, when determining that the battery 16 has a failure, may indicate that the battery 16 has a failure by not outputting the second discharge permission signal SA2.

As shown in FIGS. 2 and 3, the main body 3 includes the trigger operating device 20, the motor 21, a motor drive circuit 22, the control circuit 23, the main power switch 30, a trigger switch unit 26, a trigger detection circuit 80, an overvoltage detection circuit 50, a first off detection circuit 39, a second off detection circuit 49, a current detection circuit 55, an overheat detector 60, an interruption latch circuit 70, and the display panel 171.

The main body 3 includes a power-supply circuit (not shown). The power-supply circuit receives a battery voltage from the first battery pack 5 or the second battery pack 7 attached to the electric work machine 1. The power-supply circuit generates a constant power-supply voltage based on the battery voltage, and outputs the power-supply voltage. The power-supply voltage is suppled to each portion of the main body 3 via a control power-supply line (not shown). Each portion of the main body 3 operates by the power-supply voltage supplied from the power-supply circuit. A voltage value of the power-supply voltage (hereinafter, "power-supply voltage value Vc") may be any value. In the present embodiment, the power-supply voltage value Vc is, for example, 5V.

The power-supply circuit may output the power-supply voltage when the battery voltage is supplied to the power-supply circuit, for example, regardless of whether the main operation is enabled or disabled. The power-supply circuit may output the power-supply voltage while the main operation is enabled.

The trigger switch unit 26 includes a first trigger switch 27 and a second trigger switch 28. The first trigger switch 27 and the second trigger switch 28 are turned on or off in conjunction with the user's operation of the trigger operating device 20.

The first trigger switch 27 is, for example, a normally open switch. The second trigger switch 28 is, for example, a normally closed switch. When the trigger operating device 20 is off-operated, the first trigger switch 27 is OFF, and the second trigger switch 28 is ON. When the trigger operating device 20 is on-operated, the first trigger switch 27 is ON and the second trigger switch 28 is OFF.

The main body 3 further includes a resistor R1, a resistor R2, and a logical negation (NOT) circuit 85. A first terminal of the first trigger switch 27 is connected to a ground line. A second terminal of the first trigger switch 27 is connected to an input terminal of the NOT circuit 85. The second terminal of the first trigger switch 27 is further connected to the control power-supply line via the resistor R1.

A first terminal of the second trigger switch 28 is connected to the ground line. A second terminal of the second trigger switch 28 is connected to the control circuit 23 via the trigger detection circuit 80. The second terminal of the second trigger switch 28 is further connected to the control power-supply line via the resistor R2.

The NOT circuit 85 receives a voltage of the second terminal of the first trigger switch 27 as a binary signal. The binary signal indicates a high or low logic level. The NOT circuit 85 inverts the logic level of the received binary signal and outputs the resulting signal.

More specific configuration of the trigger switch unit 26 will be described with reference to FIGS. 4A to 4C. The trigger switch unit 26 includes a switch box 100, a plunger 101, the first trigger switch 27, and the second trigger switch 28. The plunger 101 is connected to the trigger operating device 20, and works with the trigger operating device 20.

The first trigger switch 27 includes a first contact 121, a second contact 122, and a support spring 123. The first contact 121 is, for example, connected to the ground line. The second contact 122 is, for example, connected to the NOT circuit 85. The second contact 122 is configured to be rotatable around an axis of rotation (not shown). The support spring 123 biases the second contact 122 in a direction to contact the first contact 121.

The second trigger switch 28 includes a first electrode 111, a second electrode 112, a circuit board 113, and a brush 114. The brush 114 includes a conductor. The first electrode 111 and the second electrode 112 are provided on the circuit board 113. The brush 114 is provided on the plunger 101. The brush 114 is moved with the plunger 101. The first electrode 111 is, for example, connected to the ground line. The second electrode 112 is, for example, connected to the trigger detection circuit 80.

Figure 4A:
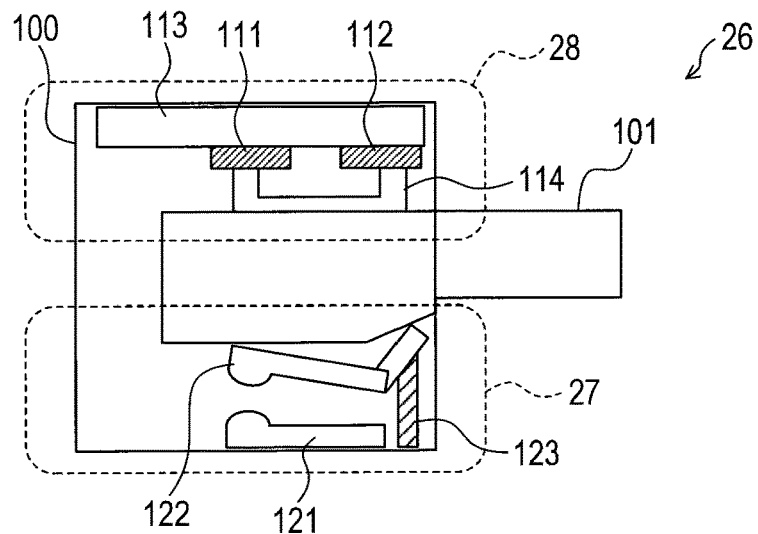
FIG. 4A is an explanatory diagram showing a trigger switch when a trigger operating device is not pulled.
Figure 4B:
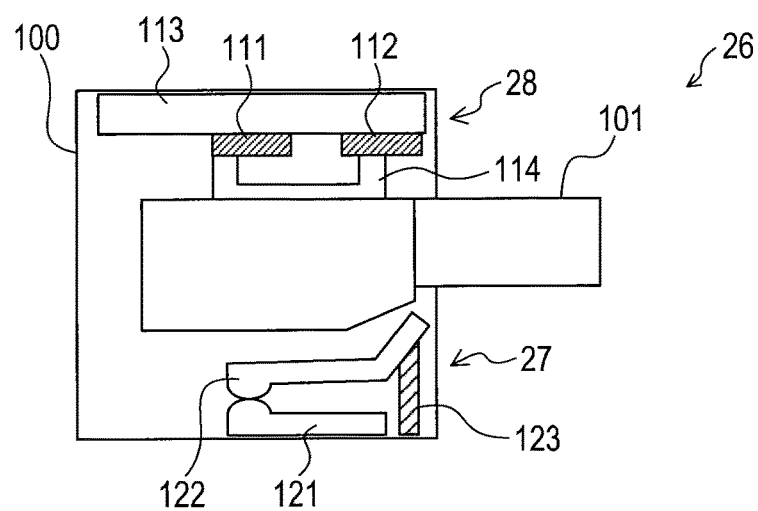
FIG. 4B is an explanatory diagram showing the trigger switch when the trigger operating device is pulled by a certain operation amount less than the maximum operation amount.
Figure 4C:
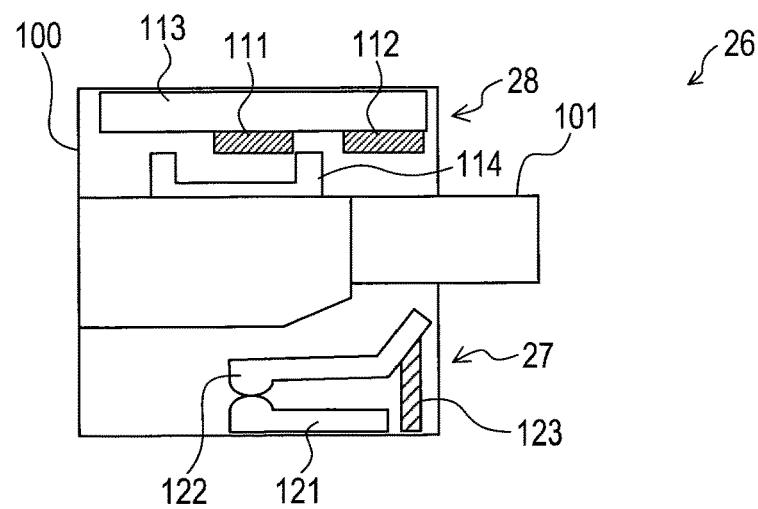
FIG. 4C is an explanatory diagram showing the trigger switch when the trigger operating device is pulled by the maximum operation amount.

The plunger 101 moves in a left direction in FIGS. 4A to 4C, that is, the aforementioned pulling direction, in response to the user pulling the trigger operating device 20. When the trigger operating device 20 is off-operated, the plunger 101 is supported at a position shown in FIG. 4A by a biasing force of a spring (not shown). That the trigger operating device 20 is off-operated includes that the user is not touching the trigger operating device 20. When the trigger operating device 20 is off-operated, the second contact 122 is rotationally moved in a direction away from the first contact 121 by the plunger 101 against a biasing force of the support spring 123. Therefore, the first trigger switch 27 is OFF.

When the trigger operating device 20 is off-operated, the first electrode 111 and the second electrode 112 are electrically connected via the brush 114 in the second trigger switch 28. Therefore, the second trigger switch 28 is ON.

When the user pulls the trigger operating device 20, the plunger 101 moves into the switch box 100. Along with this, in the second trigger switch 28, the brush 114 moves into the switch box 100. In the first trigger switch 27, the plunger 101 gradually moves away from the second contact 122, and then the second contact 122 approaches the first contact 121 by the biasing force of the support spring 123.

As the plunger 101 moves in the pulling direction, the second contact 122 contacts the first contact 121, for example, as shown in FIG. 4B. This turns on the first trigger switch 27. As the plunger 101 further moves in the pulling direction, the brush 114 moves away from the first electrode 111, as shown in FIG. 4C. This turns off the second trigger switch 28. The aforementioned on-operation means that, as illustrated in FIG. 4C, the trigger operating device 20 is pulled so that the first trigger switch 27 is turned on and the second trigger switch 28 is turned off. When the user releases the trigger operating device 20, the plunger 101 moves in the operation release direction with the trigger operating device 20 by the biasing force of the aforementioned elastic member, and returns to the position shown in FIG. 4A.

The trigger detection circuit 80 has a trigger detection function. The trigger detection function is a function to output information corresponding to a state of the trigger switch unit 26. Specifically, the trigger detection circuit 80 outputs a first trigger information ST1, a second trigger information ST2, and a trigger determination information STR.

The trigger detection circuit 80 receives an output signal of the NOT circuit 85. The trigger detection circuit 80 further receives a voltage of the second terminal of the second trigger switch 28, and a first pseudo signal SF1 outputted from the control circuit 23.

The voltage of second terminal of second trigger switch 28 inputted to the trigger detection circuit 80 is outputted to the control circuit 23 as the second trigger information ST2. The control circuit 23 outputs the first pseudo signal SF1 when executing a later-described trigger detection function diagnosis.

The first trigger information ST1, the second trigger information ST2, the trigger determination information STR, the signal received by the trigger detection circuit 80 from the NOT circuit 85, and the first pseudo signal SF1 are, for example, binary signals in the present embodiment.

The first trigger information ST1 basically indicates whether the first trigger switch 27 is ON. The second trigger information ST2 indicates whether the second trigger switch 28 is ON. Low logic level of the second trigger information ST2 indicates that the second trigger switch 28 is ON, that is, the trigger operating device 20 is off-operated. High logic level of the second trigger information ST2 indicates that the second trigger switch is OFF, that is, the trigger operating device 20 is on-operated.

The trigger detection circuit 80 includes a logical sum (OR) circuit 81 and a logical product (AND) circuit 82. The OR circuit 81 receives the output signal of the NOT circuit 85 and the first pseudo signal SF1.

Specifically, the first pseudo signal SF1 is a signal whose logic level is high. In other words, output of the first pseudo signal SF1 means that the logic level of the first pseudo signal SF1 becomes high. Conversely, the logic level of the first pseudo signal SF1 becoming low means that the first pseudo signal SF1 is not outputted. Such correspondence between the logic level of the signal and an output state of the signal indicated by the logic level is the same for the aforementioned first discharge permission signal SA1 and the second discharge permission signal SA2, later-described third discharge permission signal SA3, fourth discharge permission signal SA4, first off detection signal SB1, second off detection signal SB2, overvoltage signal So1, overcurrent signal So2, first overheat signal So31, second overheat signal So32, third overheat signal So33, second pseudo signal SF2, third pseudo signal SF31, fourth pseudo signal SF32, and fifth pseudo signal SF33.

The OR circuit 81 calculates a logical sum of the two inputted signals and outputs the first trigger information ST1 indicating the calculation result. The first trigger information ST1 is inputted to the control circuit 23 and the AND circuit 82.

For example, assume that the first pseudo signal SF1 is not inputted to the OR circuit 81. In this case, the logic level of the first trigger information ST1 becomes low in response to the trigger operating device 20 being off-operated, and becomes high in response to the trigger operating device 20 being on-operated. That the logic level of the first trigger information ST1 and the logic level of the second trigger information ST2 are low indicates a trigger-off state. In the trigger-off state, the trigger operating device 20 is off-operated. That the logic level of the first trigger information ST1 and the logic level of the second trigger information ST2 are high indicates a trigger-on state. In the trigger-on state, the trigger operating device 20 is on-operated.

When the first pseudo signal SF1 is inputted to the OR circuit 81, the logic level of the first trigger information ST1 is high regardless of a state of the trigger operating device 20 (that is, regardless of a state of the first trigger switch 27). The control circuit 23, by inputting the first pseudo signal SF1 to the OR circuit 81, can set the first trigger information ST1 to be electrically equivalent to the state when the trigger operating device 20 is on-operated.

The AND circuit 82 receives the first trigger information ST1 and the second trigger information ST2. The AND circuit 82 calculates a logical product of the first trigger information ST1 and the second trigger information ST2, and outputs the trigger determination information STR indicating the calculation result. The trigger determination information STR is inputted to the interruption latch circuit 70. The trigger determination information STR whose logic level is low indicates a trigger-off state. The trigger determination information STR whose logic level is high indicates a trigger-on state.

The motor 21 receives motor drive power from the motor drive circuit 22 to be rotationally driven. When the motor 21 rotates, a rotational driving force of the motor 21 is transmitted to an output tool (not shown in FIG. 2) via the drive mechanism, and the output tool operates. The motor 21 of the present embodiment is, for example, a brushless motor.

The output tool is, for example, the aforementioned rotary blade 162 in the present embodiment. However, the output tool may be any tool. The output tool may be a tool that can process a workpiece by rotating, such as a drill bit, a driver bit, a rotation grinding stone, and a circular saw blade, for example. The output tool can be attached to/detached from the electric work machine 1. Alternatively, rotation of the motor 21 may be converted into a linear motion and transmitted to the output tool.

The electric work machine 1 further includes a first power supply line 91, a second power supply line 92, and a main power supply line 93. A first end of the first power supply line 91 is connected to the first battery pack 5. The voltage of the battery 11 is supplied to the first end of the first power supply line 91. A second end of the first power supply line 91 is connected to a first end of the main power supply line 93.

A first end of the second power supply line 92 is connected to the second battery pack 7. The voltage of the battery 16 is supplied to the first end of the second power supply line 92. A second end of the second power supply line 92 is connected to the first end of the main power supply line 93.

A second end of the main power supply line 93 is connected to the motor drive circuit 22. A capacitor C0 is connected between the main power supply line 93 and the ground line.

Electric power of the battery 11 is supplied to the motor drive circuit 22 via the first power supply line 91 and the main power supply line 93. Electric power of the battery 16 is supplied to the motor drive circuit 22 via the second power supply line 92 and the main power supply line 93.

The motor drive circuit 22 receives electric power of the battery 11 or electric power of the battery 16, as later described. In other words, the main power supply line 93 receives the voltage of the battery 11 or the voltage of the battery 16. The voltage of the battery 11 or the voltage of the battery 16 supplied to the main power supply line 93 is hereinafter, referred to as "input battery voltage".

The first power supply line 91 includes a first charging suppression circuit 31 and a first switching circuit 36.

The first switching circuit 36 includes a switch 37, and an AND circuit 38. The switch 37 completes (or establishes) or interrupts the first power supply line 91. When the switch 37 is turned on, a portion with the switch 37 in the first power supply line 91 is completed. When the switch 37 is turned off, the portion with the switch 37 in the first power supply line 91 is interrupted, and supply of electric power from the battery 11 to the motor 21 is interrupted.

The switch 37 is turned on when the logic level of the signal outputted from the AND circuit 38 is high. The switch 37 is turned off when the logic level of the signal outputted from the AND circuit 38 is low.

The switch 37 may be configured in any way. In the present embodiment, the switch 37 includes, for example, an n-channel Metal Oxide Semiconductor Field-Effect Transistor (MOSFET). Later-described switches 32, 42, 47 may be also configured in any way, and each include, for example, an n-channel MOSFET in the present embodiment.

The AND circuit 38 includes three signal input terminals. The three signal input terminals receive a first discharge permission signal SA1, a third discharge permission signal SA3 outputted from the control circuit 23, and a second off detection signal SB2. The second off detection signal SB2 is outputted from the second off detection circuit 49. The AND circuit 38 calculates a logical product of signals inputted to the signal input terminals, and outputs a signal indicating the calculation result to a gate of the switch 37.

The AND circuit 38 outputs a high-level signal when receiving the first discharge permission signal SA1, the third discharge permission signal SA3 and the second off detection signal SB2. The AND circuit 38 outputs a low-level signal when not receiving the first discharge permission signal SA1, the third discharge permission signal SA3 and/or the second off detection signal SB2.

The second off detection circuit 49, as later described, outputs the second off detection signal SB2 when the switch 42 of a second charging suppression circuit 41 and the switch 47 of a second switching circuit 46 are OFF. When the switch 42 and/or the switch 47 are ON, the second off detection signal SB2 is not outputted. Therefore, for example, when the switch 47 is turned on, the second off detection signal SB2 is not inputted to the AND circuit 38. In this case, the output of the AND circuit 38 has low logic level and the switch 37 is turned off. This suppresses simultaneous turning-on of the switches 37, 47.

The first charging suppression circuit 31 includes the switch 32 and a synchronous rectifier circuit 33. The switch 32 completes or interrupts the first power supply line 91. When the switch 32 is turned on, a portion with the switch 32 of the first power supply line 91 is completed. When the switch 32 is turned off, the portion with the switch 32 of the first power supply line 91 is interrupted. The switch 32 is turned on or, off by the synchronous rectifier circuit 33.

A gate of the switch 32 is connected to the synchronous rectifier circuit 33. A source of the switch 32 is connected to the first battery pack 5 and to the synchronous rectifier circuit 33. A drain of the switch 32 is connected to a drain of the switch 37.

The synchronous rectifier circuit 33 turns on or off the switch 32 based on a voltage between the source and the drain of the switch 32. Specifically, when a discharge current from the first battery pack 5 flows to a parasitic diode existing between the source and the drain of the switch 32, the synchronous rectifier circuit 33 detects the discharge current and turns on the switch 32. The synchronous rectifier circuit 33, when detecting that the discharge from the first battery pack 5 is stopped or a charging current is supplied to the first battery pack 5 via the first power supply line 91 while the switch 32 is ON, turns off the switch 32. Due to such configuration, when electric current flows from the main body 3 to the battery 11, the switch 32 is turned off to interrupt the electric current, and charging of the battery 11 is suppressed or avoided. More specifically, the synchronous rectifier circuit 33 controls a gate voltage of the switch 32 so that a voltage value between the drain and the source of the switch 32 is a specified voltage value (about 30 mV, for example).

The second power supply line 92 includes the second charging suppression circuit 41 and the second switching circuit 46.

The second switching circuit 46 includes the switch 47 and an AND circuit 48. The switch 47 completes or interrupts the second power supply line 92. When the switch 47 is turned on, a portion with the switch 47 of the second power supply line 92 is completed. When the switch 47 is turned off, the portion with the switch 47 of the second power supply line 92 is interrupted, and supply of electric power from the battery 16 to the motor 21 is interrupted.

The switch 47 is turned on when the logic level of the signal outputted from the AND circuit 48 is high. The switch 47 is turned off when the logic level of the signal outputted from the AND circuit 48 is low.

The AND circuit 48 includes three signal input terminals. The signal input terminals in the AND circuit 48 receive the second discharge permission signal SA2, the fourth discharge permission signal SA4, and the first off detection signal SB1. The first off detection signal SB1 is outputted from the first off detection circuit 39. The AND circuit 48 calculates a logical product of signals outputted from the signal input terminals, and outputs a signal indicating the calculation result to the gate of the switch 47.

The AND circuit 48 outputs a high-level signal when receiving the second discharge permission signal SA2, the fourth discharge permission signal SA4 and the first off detection signal SB1. The AND circuit 48 outputs a low-level signal when the second discharge permission signal SA2, the fourth discharge permission signal SA4 and/or the first off detection signal SB1 are not inputted.

The first off detection circuit 39, as later described, outputs the first off detection signal SB1 when the switch 32 of the first charging suppression circuit 31 and the switch 37 of the first switching circuit 36 are OFF. When the switch 32 and/or the switch 37 are turned on, the first off detection signal SB1 is not outputted. Therefore, for example, when the switch 37 is turned on, the first off detection signal SB1 is not inputted to the AND circuit 48. In this case, output of the AND circuit 48 has low logic level and the switch 47 is turned off. This suppresses simultaneous turning-on of the switches 37, 47.

The second charging suppression circuit 41 includes the switch 42 and a synchronous rectifier circuit 43. The switch 42 completes or interrupts the second power supply line 92. When the switch 42 is turned on, a portion with the switch 42 of the second power supply line 92 is completed. When the switch 42 is turned off, the portion with the switch 42 of the second power supply line 92 is interrupted. The switch 42 is turned on or off by the synchronous rectifier circuit 43.

A gate of the switch 42 is connected to the synchronous rectifier circuit 43. A source of the switch 42 is connected to the second battery pack 7 and to the synchronous rectifier circuit 43. A drain of the switch 42 is connected to a drain of the switch 47.

The synchronous rectifier circuit 43 turns on or off the switch 42 based on a voltage between the source and the drain of the switch 42. Specifically, when a discharge current from the second battery pack 7 flows to a parasitic diode existing between the source and the drain of the switch 42, the synchronous rectifier circuit 43 detects the discharge current and turns on the switch 42. The synchronous rectifier circuit 43, when detecting that the discharge from the second battery pack 7 is stopped or a charging current is supplied to the second battery pack 7 via the second power supply line 92 while the switch 42 is ON, turns off the switch 42. Due to such configuration, when electric current flows from the main body 3 to the battery 16, the switch 42 is turned off to interrupt the electric current, and charging of the battery 16 is suppressed or avoided. More specifically, the synchronous rectifier circuit 43 controls a gate voltage of the switch 42 so that a voltage value between the drain and the source of the switch 42 is a specified voltage value (about 30 mV, for example).

The first off detection circuit 39 receives a voltage between the first charging suppression circuit 31 and the first switching circuit 36 in the first power supply line 91. The first off detection circuit 39 detects that the switch 32 and the switch 37 are turned off. The first off detection circuit 39 outputs the first off detection signal SB1 (high-level signal) when the switch 32 and the switch 37 are turned off. The first off detection circuit 39 does not output the first off detection signal SB1 when the switch 32 and/or the switch 37 are turned on. In this case, an output port of the first off detection signal SB1 in the first off detection circuit 39 has low logic level.

The second off detection circuit 49 receives a voltage between the second charging suppression circuit 41 and the second switching circuit 46 in the second power supply line 92. The second off detection circuit 49 detects that the switch 42 and the switch 47 are turned off. The second off detection circuit 49 outputs the second off detection signal SB2 (high-level signal) when the switch 42 and the switch 47 are turned off. The second off detection circuit 49 does not output the second off detection signal SB2 when the switch 42 and/or the switch 47 are turned on. In this case, an output port of the second off detection signal SB2 in the second off detection circuit 49 has low logic level.

The motor drive circuit 22 converts electric power (hereinafter, "battery power") supplied from the first battery pack 5 or the second battery pack 7 to the aforementioned motor drive power, and supplies the motor drive power to the motor 21. The motor drive power is, for example, three-phase power.

Specifically, the motor drive circuit 22 of the present embodiment includes, for example, an inverter (not shown). The inverter includes a U-phase switch pair, a V-phase switch pair and a W-phase switch pair connected to each other in parallel. Each of the U-phase switch pair, the V-phase switch pair and the W-phase switch pair includes two semiconductor switching elements connected in series. In other words, the motor drive circuit 22 includes six semiconductor switching elements.

The U-phase switch pair, the V-phase switch pair and the W-phase switch pair are connected to the motor 21. The U-phase switch pair supplies a U-phase voltage to the motor 21. The U-phase voltage is a voltage at a connection point of the two semiconductor switching elements connected in series in the U-phase switch pair. The V-phase switch pair supplies a V-phase voltage to the motor 21. The V-phase voltage is a voltage at a connection point of the two semiconductor switching elements connected in series in the V-phase switch pair. The W-phase switch pair supplies a W-phase voltage to the motor 21. The W-phase voltage is a voltage at a connection point of the two semiconductor switching elements connected in series in the W-phase switch pair.

The motor drive circuit 22 is connected to the control circuit 23 via a drive line 90. The motor drive circuit 22 receives a motor drive command SD from the control circuit 23 via the drive line 90. The motor drive circuit 22, when receiving the motor drive command SD, turns on or off the six semiconductor switching elements in accordance with the motor drive command SD. This generates motor drive power including the aforementioned U-phase voltage, V-phase voltage and W-phase voltage.

The drive line 90 includes an interruption switch 29. The interruption switch 29 completes or interrupts the drive line 90. When the interruption switch 29 is turned on, the motor drive command SD outputted from the control circuit 23 is inputted to the motor drive circuit 22 via the interruption switch 29. When the interruption switch 29 is turned off, transmission of the motor drive command SD from the control circuit 23 to the motor drive circuit 22 is interrupted.

The interruption switch 29 is turned on or off in accordance with interruption information SS outputted from the interruption latch circuit 70. The interruption switch 29 is turned on when the logic level of the interruption information SS is high. The interruption switch 29 is turned off when the logic level of the interruption information SS is low. The interruption information SS whose logic level is high indicates command permission. The interruption information SS whose logic level is low indicates command interruption.

The interruption switch 29 may be configured in any way. The interruption switch 29 may include, for example, a MOSFET.

The overvoltage detection circuit 50, the current detection circuit 55, and the overheat detector 60 are provided to detect five failure states. The five failure states include an overvoltage state, an overcurrent state, a U-phase overheated state, a V-phase overheated state, and a W-phase overheated state.

The overvoltage state indicates, for example, a state where an input battery voltage value is higher than a prescribed normal voltage range. The input battery voltage value is a value of the input battery voltage supplied to the motor drive circuit 22 via the main power supply line 93.

The overcurrent state indicates, for example, a state where a motor current value is higher than a prescribed normal current range. The motor current value is a value of electric current supplied to the motor 21 via the motor drive circuit 22.

The U-phase overheated state indicates, for example, a state where a later-described U-phase temperature is higher than a prescribed normal temperature range. The V-phase overheated state indicates, for example, a state where a later-described V-phase temperature is higher than the prescribed normal temperature range. The W-phase overheated state indicates, for example, a state where a later-described W-phase temperature is higher than the prescribed normal temperature range.

The overvoltage detection circuit 50, the current detection circuit 55, and the overheat detector 60, as later described, detect corresponding failure states not by software processing based on a program (computer program) but by hardware processing.

The overvoltage detection circuit 50 detects the input battery voltage value, and outputs information based on the detected input battery voltage value. Specifically, the overvoltage detection circuit 50 outputs a voltage signal SV. The voltage signal SV is an analog signal indicating the input battery voltage value.

The overvoltage detection circuit 50 further has a function to detect the overvoltage state. Specifically, the overvoltage detection circuit 50 outputs the overvoltage signal So1 when the input battery voltage value is, for example, equal to or more than a first voltage threshold. The overvoltage signal So1 indicates generation of the overvoltage state. The first voltage threshold may be, for example, a higher value than the aforementioned normal voltage range.

The overvoltage detection circuit 50 receives the second pseudo signal SF2 from the control circuit 23. The control circuit 23 outputs the second pseudo signal SF2 when executing a later-described overvoltage protection function diagnosis.

The overvoltage detection circuit 50 may be configured, for example, as shown in FIG. 3. As shown in FIG. 3, the overvoltage detection circuit 50 includes a comparator 51, a buffer 52, resistors R3, R4, a capacitor C1, and a diode D1. An anode of the diode D1 is connected to the main power supply line 93. A cathode of the diode D1 is connected to a first terminal of the resistor R3. A second terminal of the resistor R3 is connected to a first terminal of the resistor R4. A second terminal of the resistor R4 is connected to the ground line. A first terminal of the capacitor C1 is connected to the cathode of the diode D1. A second terminal of the capacitor C1 is connected to the ground line. The circuit including the diode D1 and the capacitor C1 functions as a so-called peak hold circuit.

A voltage at a connection point of the resistor R3 and the resistor R4 (that is, voltage of the first terminal of the resistor R4) is outputted to the control circuit 23 as the voltage signal SV. The voltage at the connection point of the resistor R3 and the resistor R4 is further inputted to the comparator 51. The comparator 51 is configured not to output the overvoltage signal So1 when the input battery voltage value is lower than the first voltage threshold, and to output the overvoltage signal So1 when the input battery voltage value is equal to or higher than the first voltage threshold.

The buffer 52 receives the second pseudo signal SF2. An output signal of the buffer 52 is inputted to the comparator 51. A voltage value of the second pseudo signal SF2 is a value that enables output of the overvoltage signal So1 from the comparator 91 when the overvoltage detection circuit 50 operates properly. The comparator 51 outputs the overvoltage signal So1 in response to receiving the second pseudo signal SF2. Therefore, when the overvoltage detection circuit 50 operates properly, the overvoltage detection circuit 50 outputs the overvoltage signal So1 in response to receiving the second pseudo signal SF2 even if the overvoltage state is not actually generated. The second pseudo signal SF2 is a signal for generating a pseudo overvoltage state.

The current detection circuit 55 detects the motor current value, and outputs information based on the detected motor current value. Specifically, the current detection circuit 55 outputs a current signal SC. The current signal SC is an analog signal indicating the motor current value.

The current detection circuit 55 further has a function to detect the overcurrent state. Specifically, the current detection circuit 55 outputs the overcurrent signal So2 when the motor current value is, for example, equal to or higher than a first current threshold. The overcurrent signal So2 indicates generation of the overcurrent state. The first current threshold may be, for example, higher than the aforementioned normal current range.

The current detection circuit 55 may be, for example, configured as shown in FIG. 3. As shown in FIG. 3, the current detection circuit 55 includes an amplifier circuit 57, a comparator 56, and a resistor R5. The resistor R5 is provided in a current path through which the motor current flows, and the motor current flows through the resistor R5. Accordingly, a voltage corresponding to a value of the motor current is generated across the resistor R5. The amplifier circuit 57 amplifies the voltage across the resistor R5.

The voltage amplified by the amplifier circuit 57 is outputted to the control circuit 23 as the current signal SC. The voltage amplified by the amplifier circuit 57 is further inputted to the comparator 56. The comparator 56 does not output the overcurrent signal So2 when the motor current value is lower than the first current threshold. The comparator 56 outputs the overcurrent signal So2 when the motor current value is equal to or higher than the first current threshold.

The overheat detector 60 detects the temperature of the motor drive circuit 22. More specifically, the overheat detector 60 includes a first overheat detection circuit 61, a second overheat detection circuit 62, and a third overheat detection circuit 63, as shown in FIG. 3.

The first overheat detection circuit 61 detects the temperature of the U-phase switch pair (hereinafter, "U-phase temperature") in the motor drive circuit 22. Specifically, the U-phase temperature may be, for example, one of the temperatures of the two semiconductor switching elements included in the U-phase switch pair. The U-phase temperature may be, for example, one of the temperatures of the two semiconductor switching elements with the longer on period.

The first overheat detection circuit 61 outputs information based on the detected U-phase temperature. Specifically, the first overheat detection circuit 61 outputs a first temperature signal STM1. The first temperature signal STM1 is an analog signal indicating the U-phase temperature.

The first overheat detection circuit 61 further has a function to detect the U-phase overheated state. Specifically, the first overheat detection circuit 61 outputs the first overheat signal So31 when the U-phase temperature is equal to or higher than a first U-phase temperature threshold. The first overheat signal So31 indicates generation of the U-phase overheated state. The first U-phase temperature threshold may be, for example, higher than the aforementioned normal temperature range.

The first overheat detection circuit 61 receives the third pseudo signal SF31 from the control circuit 23. The control circuit 23 outputs the third pseudo signal SF31 when a later-described first overheat protection function diagnosis is executed.

The first overheat detection circuit 61 may be, for example, configured as shown in FIG. 3. As shown in FIG. 3, the first overheat detection circuit 61 includes a temperature detection element 66, a comparator 67, a switch 68, and a resistor R6. The temperature detection element 66 is provided at or near a detection target for the aforementioned U-phase temperature so as to be able to detect the U-phase temperature. In the present embodiment, the temperature detection element 66 may be, for example, an NTC thermistor having negative resistance temperature characteristics.

A first terminal of the resistor R6 is connected to the control power-supply line. A second terminal of the resistor R6 is connected to a first terminal of the temperature detection element 66. A second terminal of the temperature detection element 66 is connected to the ground line. A first terminal of the switch 68 is connected to a connection point of the resistor R6 and the temperature detection element 66 (that is, first terminal of the temperature detection element 66). A second terminal of the switch 68 is connected to the ground line.

A voltage at the connection point of the resistor R6 and the temperature detection element 66 is outputted to the control circuit 23 as the first temperature signal STM1. The voltage at the connection point of the resistor R6 and the temperature detection element 66 is further inputted to the comparator 67. The comparator 67 is configured not to output the first overheat signal So31 when the U-phase temperature is lower than the first U-phase temperature threshold, and to output the first overheat signal So31 when the U-phase temperature is equal to or higher than the first U-phase temperature threshold.

The switch 68 is normally off when no third pseudo signal SF31 is inputted to the first overheat detection circuit 61. While the third pseudo signal SF3 is inputted to the first overheat detection circuit 61, the switch 68 is ON. When the switch 68 is turned on, a value of voltage inputted to the comparator 67 becomes substantially 0 V. In this case, if the first overheat detection circuit 61 operates properly, the first overheat signal So31 is outputted from the comparator 67. In other words, when the third pseudo signal SF31 is inputted to the first overheat detection circuit 61, the U-phase overheated state is generated in a pseudo manner even if the U-phase overheated state is not actually generated.

In the present embodiment, the second overheat detection circuit 62 and the third overheat detection circuit 63 are configured in the same manner as the first overheat detection circuit 61 except for the position of the temperature detection element 66.

The second overheat detection circuit 62 detects the temperature of the V-phase switch pair (hereinafter, "V-phase temperature") in the motor drive circuit 22. The V-phase temperature may be, for example, one of temperatures of the two semiconductor switching elements included in the V-phase switch pair, as in the U-phase temperature. The second overheat detection circuit 62 outputs a second temperature signal STM2 which is an analog signal indicating the detected V-phase temperature.

The second overheat detection circuit 62 further has a function to detect the V-phase overheated state. Specifically, the second overheat detection circuit 62 outputs a second overheat signal So32 when the V-phase temperature is, for example, equal to or higher than a first V-phase temperature threshold. The second overheat signal So32 indicates generation of the V-phase overheated state. The first V-phase temperature threshold may be, for example, higher than the aforementioned normal temperature range.

The second overheat detection circuit 62 receives the fourth pseudo signal SF32 from the control circuit 23. The control circuit 23 outputs the fourth pseudo signal SF32 when a later-described second overheat protection function diagnosis is executed. When the fourth pseudo signal SF32 is inputted to the second overheat detection circuit 62, the V-phase overheated state is generated in a pseudo manner even if the V-phase overheated state is not actually generated. The second overheat detection circuit 62, when receiving the fourth pseudo signal SF2, outputs the second overheat signal So32.

The third overheat detection circuit 63 detects the temperature of the W-phase switch pair (hereinafter, "W-phase temperature") in the motor drive circuit 22. Specifically, the W-phase temperature, like the U-phase temperature, may be, for example, one of the temperatures of the two semiconductor switching elements included in the W-phase switch pair. The third overheat detection circuit 63 outputs a third temperature signal STM3 which is an analog signal indicating the detected W-phase temperature.

The third overheat detection circuit 63 further has a function to detect the W-phase overheated state. Specifically, the third overheat detection circuit 63 outputs a third overheat signal So33 when the W-phase temperature is, for example, equal to or higher than a first W-phase temperature threshold. The third overheat signal So33 indicates generation of the W-phase overheated state. The first W-phase temperature threshold may be, for example, higher than the aforementioned normal temperature range.

The third overheat detection circuit 63 receives the fifth pseudo signal SF33 from the control circuit 23. The control circuit 23 outputs the fifth pseudo signal SF33 when executing a later-described third overheat protection function diagnosis. When the fifth pseudo signal SF33 is inputted to the third overheat detection circuit 63, the W-phase overheated state is generated in a pseudo manner even if the W-phase overheated state is not actually generated. The third overheat detection circuit 63 outputs the third overheat signal So33 when receiving the fifth pseudo signal SF3.

At least two of the first U-phase temperature threshold, the first V-phase temperature threshold and the first W-phase temperature threshold may be equal to each other. The first U-phase temperature threshold, the first V-phase temperature threshold and the first W-phase temperature threshold may be different from each other.

The interruption latch circuit 70 receives the trigger determination information STR. The interruption latch circuit 70 can further receive the overvoltage signal So1, the overcurrent signal So2, the first overheat signal So31, the second overheat signal So32, and the third overheat signal So33. The interruption latch circuit 70 outputs the interruption information SS based on these information and signals. The interruption latch circuit 70 may further output failure detection information Sor.

The interruption latch circuit 70, when the electric work machine 1 is in a drive permitted state, outputs interruption information SS whose logic level is high indicating the command permission to turn on the interruption switch 29.

The drive permitted state indicates a state where the motor 21 may be driven. The interruption latch circuit 70, when the electric work machine 1 is in a drive prohibited state, outputs the interruption information SS whose logic level is low indicating the command interruption to turn off the interruption switch 29. The drive prohibited state indicates a state where the motor 21 should not be driven.

In the present embodiment, the drive permitted state includes (i) a state where the trigger determination information STR indicates the trigger-on state, and (ii) a failure undetected state. The failure undetected state further indicates a state where the overvoltage signal So1, the overcurrent signal So2, the first overheat signal So31, the second overheat signal So32, and the third overheat signal So33 are not inputted. In other words, the failure undetected state indicates a state where none of the aforementioned five failure states is detected.

In the present embodiment, the drive prohibited state includes a state where the trigger determination information STR indicates the trigger-off state and/or a failure detected state. The failure detected state indicates a state where the overvoltage signal So1, the overcurrent signal So2, the first overheat signal So31, the second overheat signal So32 and/or the third overheat signal So33 are inputted. In other words, the failure detected state is a state where one or more of the aforementioned five failure states is detected.

The interruption latch circuit 70 further has an interruption latch function. The interruption latch function is a function to maintain the interruption switch 29 to be off until at least the trigger operating device 20 is off-operated once, even after the electric work machine 1 is shifted to the failure undetected state from the failure detected state where the interruption switch 29 is turned off. The interruption latch circuit 70 continuously outputs the interruption information SS indicating the command interruption to maintain the interruption switch 29 to be off.

The interruption latch circuit 70 may be, for example, configured as shown in FIG. 3. As shown in FIG. 3, the interruption latch circuit 70 includes a first flip flop (FF) 71, an OR circuit 72, a NOT circuit 73, an OR circuit 74, a second flip flop (FF) 75, an AND circuit 76, resistors R7, R8, and capacitors C2, C3. In the present embodiment, the first FF 71 and the second FF 75 are, for example, D-type FF. The first FF 71 and the second FF 75 each includes a clock input terminal, a data input terminal, and an output terminal. Each time a rising edge (that is, change of logic level from low to high) of the signal inputted to the clock input terminal occurs, the first FF 71 and the second FF 75 each output a signal having the same logic level as the signal inputted to the data input terminal at that time from the output terminal. After the rising edge occurs and until the next rising edge occurs again, the first FF 71 and the second FF 75 maintain the logic level of the signal outputted from the output terminal even if the logic level of the signal inputted to the data input terminal changes.

The OR circuit 72 includes five input terminals. The five input terminals can receive the overvoltage signal So1, the overcurrent signal So2, the first overheat signal So31, the second overheat signal So32, and the third overheat signal So33. The OR circuit 72 calculates a logical sum of the signal inputted to the five input terminals and outputs the calculation result.

The trigger determination information STR is inputted to the clock input terminal of the first FF 71 and the AND circuit 76. The trigger determination information STR is further inputted to the OR circuit 74 via the capacitor C2.

The resistor R8 is connected between a connection point of the capacitor C2 and the OR circuit 74, and the ground line. A circuit including the capacitor C2 and the resistor R8 functions as a differentiation circuit that differentiates the trigger determination information STR and outputs the resulting value to the OR circuit 74.

An output signal of the OR circuit 72 is inputted to the NOT circuit 73, and also to the OR circuit 74 via the resistor R7. The output signal of the OR circuit 72 is further inputted to the control circuit 23 as the failure detection information Sor.

The capacitor C3 is connected between a connection point of the resistor R7 and the OR circuit 74, and the ground line. A circuit including the resistor R7 and the capacitor C3 functions as an integral circuit that integrates the output signal of the OR circuit 72 and outputs the resulting value to the OR circuit 74. The output signal of the OR circuit 74 is also inputted to the clock input terminal of the second FF 75.

An output signal of the NOT circuit 73 is inputted to the data input terminal of the first FF 71 and the data input terminal of the second FF 75. An output signal of the first FF 71 and an output signal of the second FF 75 are inputted to the AND circuit 76.

The interruption latch circuit 70 configured as above operates as follows, for example. Assume that the electric work machine 1 is in the failure undetected state, and the logic level of the trigger determination information STR is low which indicates the trigger-off state, for example. In this state, the output signal of the AND circuit 76 is low level. In other words, in this state, the interruption information SS indicates the command interruption. Therefore, the interruption switch 29 is turned off.

Further, assume that the overvoltage signal So1, the overcurrent signal So2, the first overheat signal So31, the second overheat signal So32, and the third overheat signal So33 are not inputted to the OR circuit 72. In this state, the logic levels of the data input terminals of the first FF 71 and the second FF 75 are high.

From the state as above, one situation is assumed where the logic level of the trigger determination information STR changes to high which indicates the trigger-on state. When the logic level of the trigger determination information STR changes to high, a rising edge occurs in signals inputted to the clock input terminals of the first FF 71 and the second FF 75. Therefore, the logic levels of the signals outputted from the output terminal of the first FF 71 and the second FF 75 change to high. As a result, the output signal of the AND circuit 76 changes to high level. In other words, in this case, the interruption information SS changes to information indicating the command permission. Therefore, the interruption switch 29 is turned on.

One situation is assumed where the overvoltage signal So1, the overcurrent signal So2, the first overheat signal So31, the second overheat signal So32 and/or the third overheat signal So33 are inputted to the OR circuit 72, from the situation where the interruption information SS indicating the command permission is outputted from the interruption latch circuit 70 as above (that is, situation where the electric work machine 1 is shifted to the failure detected state). In this situation, the logic level of the data input terminal of the second FF 75 changes to low. After the logic level of the data input terminal of the second FF 75 changes to low, the logic level of the clock input terminal of the second FF 75 changes to high. As a result, the output signal of the second FF 75 changes to low level, and the output signal of the AND circuit 76 changes to low level. In other words, the interruption information SS changes to information indicating the command interruption. Therefore, the interruption switch 29 is turned off. Time difference from when the logic level of the data input terminal becomes low until when the logic level of the clock input terminal becomes high is based on a time constant of the aforementioned integral circuit.

One situation is assumed where, from the situation where the interruption information SS indicating the command interruption is outputted as a result of the failure as above, the high-level signal inputted to the OR circuit 72 is changed to a low-level signal due to recovery from the failure. In this situation, the logic levels of the data input terminals of the first FF 71 and the second FF 75 change to high. However, while the logic level of the trigger determination information STR is maintained to be high, the output signals of the first FF 71 and the second FF 75 do not change, and the interruption information SS is maintained to indicate the command interruption. Therefore, the interruption switch 29 is kept to be off.

Further, one situation is assumed where, in the situation of recovery from the failure as above, the trigger operating device 20 is off-operated, and on-operated again. When the trigger operating device 20 is off-operated, the logic levels of the clock input terminals of the first FF 71 and the second FF 75 change to low. When the trigger operating device 20 is off-operated and then on-operated again, the logic levels of the clock input terminals of the first FF 71 and the second FF 75 change to high, and the output signals of the first FF 71 and the second FF 75 change to high level. This changes the output signal of the AND circuit 76 to high level, and changes the interruption information SS to indicate the command permission. Therefore, the interruption switch 29 is turned on.

As above, the interruption latch circuit 70 executes various functions, including the function to output the interruption information SS and the interruption latch function, in hardware processing, without executing software processing.

The control circuit 23 operates by the power-supply voltage supplied from the aforementioned power-supply circuit. The control circuit 23 includes a microcomputer provided with a CPU 24 and a memory 25. The memory 25 may include a semiconductor memory such as a RAM, a ROM, and a flash memory. The memory 25 stores various programs and data that the CPU 24 reads and executes in order to achieve various functions of the electric work machine 1. These functions are not limited to software processing as mentioned above, and some or all of the functions may be achieved by hardware that includes a logic circuit, an analog circuit and the like.

The control circuit 23 receives the first trigger information ST1, the second trigger information ST2, the trigger determination information STR, the first discharge permission signal SA1, the second discharge permission signal SA2, the first off detection signal SB1, the second off detection signal SB2, the interruption information SS, the voltage signal SV, the current signal SC, the first temperature signal STM1 to the third temperature signal STM3, and the failure detection information Sor. The control circuit 23 further receives information indicating user's operation of the main power switch 30 from the main power switch 30.

The control circuit 23 enables or disables the main operation of the electric work machine 1 based on the information inputted from the main power switch 30. The control circuit 23 alternately enables or disables the main operation each time the main power switch 30 is pressed and released. The control circuit 23 executes various functions based on each of the aforementioned information and signals inputted to the control circuit 23.

The control circuit 23 of the present embodiment disables the main operation, after enabling the main operation, when the trigger operating device 20 has not been pulled for a prescribed time even if the main power switch 30 is not operated.

The control circuit 23, when receiving the first discharge permission signal SA1 and the second discharge permission signal SA2, outputs the third discharge permission signal SA3 or the fourth discharge permission signal SA4. In this case, the switch 37 on the first power supply line 91 or the switch 47 on the second power supply line 92 is turned on.

The control circuit 23, when receiving the first discharge permission signal SA1 without receiving the second discharge permission signal SA2, outputs the third discharge permission signal SA3 without outputting the fourth discharge permission signal SA4. In this case, the switch 37 on the first power supply line 91 is turned on and the switch 47 on the second power supply line 92 is turned off.

The control circuit 23, when receiving the second discharge permission signal SA2 without receiving the first discharge permission signal SA1, outputs the fourth discharge permission signal SA4 without outputting the third discharge permission signal SA3. In this case, the switch 47 on the second power supply line 92 is turned on and the switch 37 on the first power supply line 91 is turned off.

The control circuit 23, when the trigger operating device 20 is on-operated for an enabling period during which the main operation is enabled, outputs the motor drive command SD to the motor drive circuit 22 to drive the motor 21.

The control circuit 23, when the first trigger information ST1 and the second trigger information ST2 indicate the trigger-on state (that is, logic levels are high), determines that the trigger operating device 20 is on-operated and outputs the motor drive command SD. The control circuit 23, when the first trigger information ST1 and/or the second trigger information ST2 indicate the trigger-off state (that is, logic level is low), determines that the trigger operating device 20 is off-operated and does not output the motor drive command SD.

The control circuit 23 outputs the trigger detection information ST0 to the first battery pack 5 and the second battery pack 7. The trigger detection information ST0 indicates whether the trigger operating device 20 is on-operated. The control circuit 23, when determining that the trigger operating device 20 is off-operated, outputs the trigger detection information ST0 whose logic level is low. The trigger detection information ST0 whose logic level is low indicates that the trigger operating device 20 is off-operated. The control circuit 23, when determining that the trigger operating device 20 is on-operated, outputs the trigger detection information ST0 whose logic level is high. The trigger detection information ST0 whose logic level is high indicates that trigger operating device 20 is on-operated. While the power-supply voltage is not supplied to the control circuit 23 and the control circuit 23 stops operation, the logic level of the trigger detection information ST0 is maintained to be low.

The control circuit 23, when outputting the motor drive command SD during the enabling period, stores a motor drive history indicating that the motor 21 has been driven in the memory 25.

The control circuit 23 has failure detection functions. Specifically, the failure detection functions include an overvoltage detection function, an overcurrent detection function, and an overheat detection function. The failure detection functions are executed when the CPU 24 executes a later-described main process in the control circuit 23. In other words, these failure detection functions are executed based on software.

The overvoltage detection function is a function to detect the aforementioned overvoltage state. The control circuit 23 detects the overvoltage state based on the input battery voltage value indicated by the voltage signal SV received from the overvoltage detection circuit 50. For example, the control circuit 23 may determine that the overvoltage state has been generated when the input battery voltage value is equal to or higher than a second voltage threshold. The second voltage threshold may be, for example, higher than the aforementioned normal voltage range. The second voltage threshold may be, for example, the same value as the first voltage threshold, may be higher than the first voltage threshold, or may be lower than the first voltage threshold.

The overcurrent detection function is a function to detect the aforementioned overcurrent state. The control circuit 23 detects the overcurrent state based on the motor current value indicating the current signal SC received from the current detection circuit 55. For example, the control circuit 23 may determine that the overcurrent state has been generated when the motor current value is equal to or higher than a second current threshold. The second current threshold may be, for example, higher than the aforementioned normal current range. The second current threshold may be, for example, the same value as the first current threshold, may be higher than the first current threshold, or may be lower than the first current threshold.

More specifically, the overheat detection function includes a first overheat detection function, a second overheat detection function and a third overheat detection function.

The first overheat detection function is a function to detect the aforementioned U-phase overheated state. The control circuit 23 detects the U-phase overheated state based on the U-phase temperature indicated by the first temperature signal STM1 received from the first overheat detection circuit 61. For example, the control circuit 23 may determine that the U-phase overheated state has been generated when the U-phase temperature is equal to or higher than a second U-phase temperature threshold. The second U-phase temperature threshold may be higher than the aforementioned normal temperature range. The second U-phase temperature threshold may be, for example, the same value as the first U-phase temperature threshold, may be higher than the first U-phase temperature threshold, or may be lower than the first U-phase temperature threshold.

The second overheat detection function is a function to detect the aforementioned V-phase overheated state. The control circuit 23 detects the V-phase overheated state based on the V-phase temperature indicated by the second temperature signal STM2 received from the second overheat detection circuit 62. For example, the control circuit 23 may determine that the V-phase overheated state has been generated when the V-phase temperature is equal to or higher than a second V-phase temperature threshold. The second V-phase temperature threshold may be higher than the aforementioned normal temperature range. The second V-phase temperature threshold may be, for example, the same value as the first V-phase temperature threshold, may be higher than the first V-phase temperature threshold, or may be lower than first V-phase temperature threshold.

The third overheat detection function is a function to detect the aforementioned W-phase overheated state. The control circuit 23 detects the W-phase overheated state based on the W-phase temperature indicated by the third temperature signal STM3 received from the third overheat detection circuit 63. For example, the control circuit 23 may determine that the W-phase overheated state has been generated when the W-phase temperature is equal to or higher than a second W-phase temperature threshold. The second W-phase temperature threshold may be higher than the aforementioned normal temperature range. The second W-phase temperature threshold may be, for example, the same value as the first W-phase temperature threshold, may be higher than the first W-phase temperature threshold, or may be lower than the first W-phase temperature threshold.

The second U-phase temperature threshold, the second V-phase temperature threshold and the second W-phase temperature threshold may be the same value, any two of them may be the same value, or all of them may be different values.

The control circuit 23, while outputting the motor drive command SD, executes a forced stop function. The forced stop function includes stopping output of the motor drive command SD to stop the motor 21 even if the trigger operating device 20 is on-operated, in response to detection of any of the failures by the aforementioned failure detection functions. The forced stop function includes storing a failure drive history in the memory 25. The failure drive history indicates that a failure has been detected during driving of motor.

(3) Description of Self-Diagnosis Function

The control circuit 23 has a self-diagnosis function. The self-diagnosis function is a function to execute self-diagnoses corresponding to diagnosis items one by one in a prescribed order at a corresponding diagnosis timing.

In the present embodiment, the diagnosis items include, for example, a first diagnosis item, a second diagnosis item, a third diagnosis item, a fourth diagnosis item, a fifth diagnosis item, and a sixth diagnosis item. The first diagnosis item is a trigger detection function diagnosis. The second diagnosis item is a power supply line function diagnosis. The third diagnosis item is a first overheat protection function diagnosis. The fourth diagnosis item is a second overheat protection function diagnosis. The fifth diagnosis item is a third overheat protection function diagnosis. The sixth diagnosis item is an overvoltage protection function diagnosis.

The prescribed order to execute the self-diagnosis of each diagnosis item may be any order. The prescribed order of the present embodiment is that, for example, the first is the first diagnosis item, the second is the second diagnosis item, the third is the third diagnosis item, the fourth is the fourth diagnosis item, the fifth is the fifth diagnosis item, and the sixth is the sixth diagnosis item. Next to the sixth diagnosis item is the first diagnosis item, and the diagnosis is executed again from the first diagnosis item in the aforementioned order.

The diagnosis timing of each diagnosis item, for example, except for the diagnosis timing of the power supply line function diagnosis, corresponds to a disabling timing. The disabling timing is when the main operation is disabled. The disabling timing may correspond to any timing from immediately after the main operation is disabled until a given length of time elapses.

One of the reasons why the diagnosis timing of each diagnosis item other than the power supply line function diagnosis is set to the disabling timing is as follows. That is, the control circuit 23 of the present embodiment is configured to interrupt the self-diagnosis when the trigger operating device 20 is on-operated during the self-diagnosis. When the self-diagnosis is executed at a timing when probability that the trigger operating device 20 is on-operated is low, probability that the self-diagnosis is interrupted is also low. The disabling timing can be considered to correspond to a timing when the user of the electric work machine 1 indicates that the operation using the electric work machine 1 has been done. For a while from this timing, it is expected that the probability that the trigger operating device 20 is on-operated is low. Thus, in the present embodiment, except for the diagnosis timing of the power supply line function diagnosis, the diagnosis timing of each diagnosis item is set to the disabling timing.

The control circuit 23 does not execute the self-diagnosis at the disabling timing when the motor drive history is not stored during the last enabling period or the failure drive history is stored during the last enabling period. In this case, the diagnosis item at the next diagnosis timing is again set to be the diagnosis item that has not been executed this time. The last enabling period means the enabling period immediately before the disabling timing. When the motor drive history is not stored during the last enabling period, it means that the motor 21 is not driven during the last enabling period. When the failure drive history is stored during the last enabling period, it means that a failure has been detected when the motor 21 is driven and the motor 21 has stopped during the last enabling period.

Execution timing of the power supply line function diagnosis, for example, corresponds to an enabling timing. The enabling timing is when the main operation is enabled. The enabling timing may correspond to any timing from immediately after the main operation is enabled until a given length of time elapses.

The control circuit 23 stores a self-diagnosis history indicating a result of the self-diagnosis for each diagnosis item in the memory 25. Specifically, the control circuit 23, when the result of the diagnosis shows a failure, stores information indicating "failure" determination as the self-diagnosis history. In this case, the control circuit 23 again executes the self-diagnosis of the same diagnosis item as that of this time at the next enabling timing. The control circuit 23, when the result of the diagnosis shows no failure, stores information indicating "no failure" determination as the self-diagnosis history.

The control circuit 23, when the diagnosis is interrupted without completed properly, again executes the self-diagnosis of the same diagnosis item as that of this time at a regular diagnosis timing corresponding to the diagnosis item, which comes first after the interruption.

In the trigger detection function diagnosis, the control circuit 23 diagnoses whether the trigger detection circuit 80 and the interruption latch circuit 70 properly operate. Specifically, the control circuit 23 outputs the first pseudo signal SF1 to the trigger detection circuit 80 to set the first trigger information ST1 to information indicating the trigger-on state in a pseudo manner (that is, high level).

The control circuit 23, while outputting the first pseudo signal SF1, executes the diagnosis based on the first trigger information ST1, the second trigger information ST2 and the interruption information SS received by the control circuit 23. At the timing when the trigger detection function diagnosis is executed, the main power switch 30 is OFF. Therefore, if the trigger detection circuit 80 and the interruption latch circuit 70 properly operate, the logic level of the first trigger information ST1 becomes high, the logic level of the second trigger information ST2 becomes low, and the logic level of the interruption information SS becomes low, when the first pseudo signal SF1 is outputted.

The control circuit 23, when each of the aforementioned information is appropriate (that is, the logic level of the first trigger information ST1 is high, and the logic levels of the second trigger information ST2 and the interruption information SS are low), determines that the trigger detection circuit 80 and the interruption latch circuit 70 properly operate. In this case, the control circuit 23 determines that the self-diagnosis result indicates no failure, and stores the self-diagnosis history indicating the "no failure" determination in the memory 25.

The control circuit 23, when the first trigger information ST1 is not appropriate, determines that the trigger detection circuit 80 does not properly operate. In this case, the control circuit 23 determines that the self-diagnosis result indicates a failure, and stores the self-diagnosis history indicating the "failure" determination in the memory 25.

The control circuit 23, when the interruption information SS is not appropriate, determines that the trigger detection circuit 80 or the interruption latch circuit 70 does not properly operate. In this case, the control circuit 23 determines that the self-diagnosis result indicates a failure, and stores the self-diagnosis history indicating the "failure" determination in the memory 25.

When the second trigger information ST2 is not appropriate, the control circuit 23 may determine that the trigger detection circuit 80 does not properly operate. However, in the present embodiment, the diagnosis is interrupted.

In the power supply line function diagnosis, the control circuit 23 diagnoses whether the first switching circuit 36 and the second switching circuit 46 properly operate.

Specifically, the control circuit 23, when not receiving the first discharge permission signal SA1 from the first battery pack 5, outputs the third discharge permission signal SA3. The control circuit 23, when receiving the first off detection signal SB1 from the first off detection circuit 39 while outputting the third discharge permission signal SA3 (that is, when the switches 32, 37 are OFF), determines that the first switching circuit 36 properly operates. The control circuit 23, when not receiving the first off detection signal SB1 from the first off detection circuit 39 while outputting the third discharge permission signal SA3, determines that the first switching circuit 36 does not properly operate.

Further, the control circuit 23, when not receiving the second discharge permission signal SA2 from the second battery pack 7, outputs the fourth discharge permission signal SA4. The control circuit 23, when receiving the second off detection signal SB2 from the second off detection circuit 49 while outputting the fourth discharge permission signal SA4 (that is, when the switches 42, 47 are OFF), determines that the second switching circuit 46 properly operates. The control circuit 23, when not receiving the second off detection signal SB2 from the second off detection circuit 49 while outputting the fourth discharge permission signal SA4, determines that the second switching circuit 46 does not properly operate.

The control circuit 23, when not determining in the power supply line function diagnosis that the first switching circuit 36 and the second switching circuit 46 do not operate properly, determines that the self-diagnosis result indicates no failure. In this case, the control circuit 23 stores the self-diagnosis history indicating the "no failure" determination in the memory 25. The control circuit 23, when determining that either the first switching circuit 36 or the second switching circuit 46 does not operate properly, determines that the self-diagnosis result indicates a failure. In this case, the control circuit 23 stores the self-diagnosis history indicating the "failure" determination in the memory 25.

One of the reasons why the diagnosis timing of the power supply line function diagnosis is set to the enabling timing is as follows. For example, the battery failure detection circuit 12, when not detecting a failure of the first battery pack 5, outputs the first discharge permission signal SA1 based on the trigger detection information ST0. More specifically, the battery failure detection circuit 12, in response to recognition that the trigger operating device 20 is on-operated based on the trigger detection information ST0, outputs the first discharge permission signal SA1 for a certain period from the time of recognition. Depending on a use state of the electric work machine 1 by the user, there is a possibility that the main operation is disabled before the certain period elapses from when the trigger operating device 20 is on-operated. In other words, there is a possibility that the main operation is disabled in a state where the first discharge permission signal SA1 is outputted. In this case, since the first discharge permission signal SA1 is outputted, the power supply line function diagnosis cannot be appropriately executed. On the other hand, the enabling timing is a state where the user is going to use the electric work machine 1 from now on, and probability that the first discharge permission signal SA1 is outputted is low. Thus, in the present embodiment, the diagnosis timing of the power supply line function diagnosis is set to the enabling timing.

In the first overheat protection function diagnosis, the control circuit 23 diagnoses whether the first overheat detection circuit 61 and the interruption latch circuit 70 properly operate. Specifically, the control circuit 23 outputs the third pseudo signal SF31 to the first overheat detection circuit 61 to generate the U-phase overheated state in a pseudo manner. The control circuit 23, while outputting the third pseudo signal SF31, executes the diagnosis based on the first temperature signal STM1 and the failure detection information Sor received by the control circuit 23.

The control circuit 23, when the U-phase temperature indicated by the first temperature signal STM1 is equal to or higher than the specific U-phase threshold and the logic level of the failure detection information Sor is high, determines that the first overheat detection circuit 61 and the interruption latch circuit 70 properly operate. In this case, the control circuit 23 determines that the self-diagnosis result indicates no failure, and stores the self-diagnosis history indicating the "no failure" determination in the memory 25. The U-phase threshold may be any value. The U-phase threshold may be, for example, a specific value higher than the aforementioned normal temperature range. The U-phase threshold may be, for example, the same value as the aforementioned first U-phase temperature threshold or the second U-phase temperature threshold.

The control circuit 23, when the U-phase temperature indicated by the first temperature signal STM1 is lower than the U-phase threshold, determines that the first overheat detection circuit 61 does not properly operate. In this case, the control circuit 23 determines that the self-diagnosis result indicates a failure, and stores the self-diagnosis history indicating the "failure" determination in the memory 25.

The control circuit 23, when the U-phase temperature indicated by the first temperature signal STM1 is equal to or higher than the U-phase threshold (that is, the first overheat detection circuit 61 operates properly), while the logic level of the failure detection information Sor is low, determines that the interruption latch circuit 70 does not properly operate. In this case, the control circuit 23 determines that the self-diagnosis result indicates a failure and stores the self-diagnosis history indicating the "failure" determination in the memory 25.

In the second overheat protection function diagnosis, the control circuit 23 outputs the fourth pseudo signal SF32 to the second overheat detection circuit 62. Then, the control circuit 23, based on the second temperature signal STM2 and the failure detection information Sor, diagnoses whether the second overheat detection circuit 62 and the interruption latch circuit 70 properly operate, in the same manner as in the first overheat protection function diagnosis.

In the third overheat protection function diagnosis, the control circuit 23 outputs the fifth pseudo signal SF33 to the third overheat detection circuit 63. Then, the control circuit 23, based on the third temperature signal STM3 and the failure detection information Sor, diagnoses whether the third overheat detection circuit 63 and the interruption latch circuit 70 properly operate, in the same manner as in the first overheat protection function diagnosis.

In the overvoltage protection function diagnosis, the control circuit 23 diagnoses whether the overvoltage detection circuit 50 and the interruption latch circuit 70 properly operate. Specifically, the control circuit 23 outputs the second pseudo signal SF2 to the overvoltage detection circuit 50 to generate the overvoltage state in a pseudo manner. The control circuit 23, while outputting the second pseudo signal SF2, executes the diagnosis based on the voltage signal SV and the failure detection information Sor received by the control circuit 23.

The control circuit 23, when the input battery voltage value indicated by the voltage signal SV is equal to or higher than the specific voltage determination threshold and the logic level of the failure detection information Sor is high, determines that the overvoltage detection circuit 50 and the interruption latch circuit 70 properly operate. In this case, the control circuit 23 determines that the self-diagnosis result indicates no failure, and stores the self-diagnosis history indicating the "no failure" determination in the memory 25. The voltage determination threshold may be any value. The voltage determination threshold may be, for example, a specific value higher than the aforementioned normal voltage range. The voltage determination threshold may be, for example, the same value as the aforementioned first voltage threshold or second voltage threshold.

The control circuit 23 when the input battery voltage value indicated by the voltage signal SV is lower than the voltage determination threshold, determines that the overvoltage detection circuit 50 does not properly operate. In this case, the control circuit 23 determines that the self-diagnosis result indicates a failure, and stores the self-diagnosis history indicating the "failure" determination in the memory 25.

The control circuit 23, when the input battery voltage value indicated by the voltage signal SV is equal to or higher than the voltage determination threshold (that is, the overvoltage detection circuit 50 operates properly) while the logic level of the failure detection information Sor is low, determines that the overvoltage detection circuit 50 does not properly operate. In this case, the control circuit 23 determines that the self-diagnosis result indicates a failure, and stores the self-diagnosis history indicating the "failure" determination in the memory 25.

(4) Execution Example of Self-Diagnosis

Now, execution examples of the self-diagnosis function by the control circuit 23 will be described with reference to FIGS. 5 to 7.

Firstly, a first execution example shown in FIG. 5 will be described. The first execution example indicates a case where a result of each self-diagnosis indicates no failure. In the first execution example, the first diagnosis item is set as the diagnosis item to be executed first at or after time t1.

In the first execution example, the main operation is enabled at the time t1. Since the diagnosis timing of the first diagnosis item corresponds to the disabling timing, self-diagnosis of the first diagnosis item is not yet executed at the time t1.

In the first execution example, after the main operation is enabled at the time t1, the main operation is disabled at time t2 without the motor 21 being driven. The time t2 corresponds to the diagnosis timing of the first diagnosis item. However, since the motor 21 is not driven during the last enabling period corresponding to the time t2, the self-diagnosis of the first diagnosis item is not executed at the time t2.

In the first execution example, after the main operation is enabled at time t3, the main operation is disabled at time t4. The trigger operating device 20 is on-operated for a certain period from the time t3 to the time t4. In the first execution example, while the trigger operating device 20 is on-operated, the motor 21 is properly driven without being improperly stopped. At the time t4, based on the time t4 corresponding to the diagnosis timing of the first diagnosis item, the self-diagnosis of the first diagnosis item is executed. The first execution example shows an example when a result "no failure" is obtained in the self-diagnosis of the first diagnosis item started at the time t4.

In the first execution example, the main operation is enabled at time t5. At the time t5, based on the diagnosis item of the self-diagnosis to be executed next (hereinafter, "next diagnosis item") being the second diagnosis item, and the diagnosis timing of the second diagnosis item corresponding to the enabling timing, self-diagnosis of the second diagnosis item is executed. That the next diagnosis item is the second diagnosis item is based on the diagnosis result of the first diagnosis item executed at the time t4 indicating no failure. The first execution example shows an example when a result "no failure" is obtained in the self-diagnosis of the second diagnosis item started at the time t5.

In the first execution example, the main operation is disabled at time t6, and is enabled at time t7. At the time t7, the next diagnosis item is the third diagnosis item. That the next diagnosis item is the third diagnosis item is based on the diagnosis result of the second diagnosis item executed at the time t5 indicating no failure. The diagnosis timing of the third diagnosis item corresponds to the disabling timing. Therefore, the self-diagnosis of the third diagnosis item is not yet executed at the time t7.

In the first execution example, the main operation is disabled at time t8. For a certain period from the time t7 to the time t8, the trigger operating device 20 is on-operated. While the trigger operating device 20 is on-operated, the motor 21 is driven. However, in the first execution example, since a failure is detected by the failure detection functions while the motor 21 is driven, that the trigger operating device 20 is on-operated is disabled and the motor 21 is stopped.

The time t8 primarily corresponds to the diagnosis timing of the third diagnosis item to be executed next. However, in the last enabling period corresponding to the time t8, the motor 21 is stopped due to detection of a failure as mentioned above. Therefore, self-diagnosis of the third diagnosis item is not performed at the time t8.

In the first execution example, the main operation is enabled at time t9. Since the diagnosis timing of the third diagnosis item corresponds to the disabling timing, self-diagnosis of the third diagnosis item is not yet executed at the time t9.

In the first execution example, the main operation is disabled at time t10. For a certain period from the time t9 to the time t10, the trigger operating device 20 is on-operated. In the first execution example, while the trigger operating device 20 is on-operated, the motor 21 is properly driven without being stopped improperly. At the time t10, based on the time t10 corresponding to the diagnosis timing of the third diagnosis item, self-diagnosis of the third diagnosis item is executed. The first execution example shows an example when a result "no failure" is obtained in the self-diagnosis of the third diagnosis item started at the time t10.

In the first execution example, the main operation is enabled at time t11. In the time t11, the next diagnosis item is the fourth diagnosis item. That the next diagnosis item is the fourth diagnosis item is based on the diagnosis result of the third diagnosis item executed at the time t10 indicating no failure. The diagnosis timing of the fourth diagnosis item corresponds to the disabling timing. Therefore, self-diagnosis of the fourth diagnosis item is not yet executed at the time t11.

In the first execution example, the main operation is disabled at time t12. For a certain period from the time t11 to the time t12, the trigger operating device 20 is on-operated. In the first execution example, while the trigger operating device 20 is on-operated, the motor 21 is driven properly without being stopped improperly. At the time t12, based on the time t12 corresponding to the diagnosis timing of the fourth diagnosis item, self-diagnosis of the fourth diagnosis item is executed. The first execution example shows an example when a result "no failure" is obtained in the self-diagnosis of the fourth diagnosis item started at the time t12.

In the first execution example, the main operation is enabled at time t13. In the time t13, the next diagnosis item is the fifth diagnosis item. That the next diagnosis item is the fifth diagnosis item is based on the diagnosis result of the fourth diagnosis item executed at the time t12 indicating no failure. The diagnosis timing of the fifth diagnosis item corresponds to the disabling timing. Thus, self-diagnosis of fifth diagnosis item is not yet executed at the time t13.

Now, a second execution example shown in FIG. 6 will be described. The second execution example includes a case where a result of self-diagnosis "failure" is obtained. In the second execution example, the diagnosis item to be executed first at and after time t21 is set as the first diagnosis item.

Figure 6:
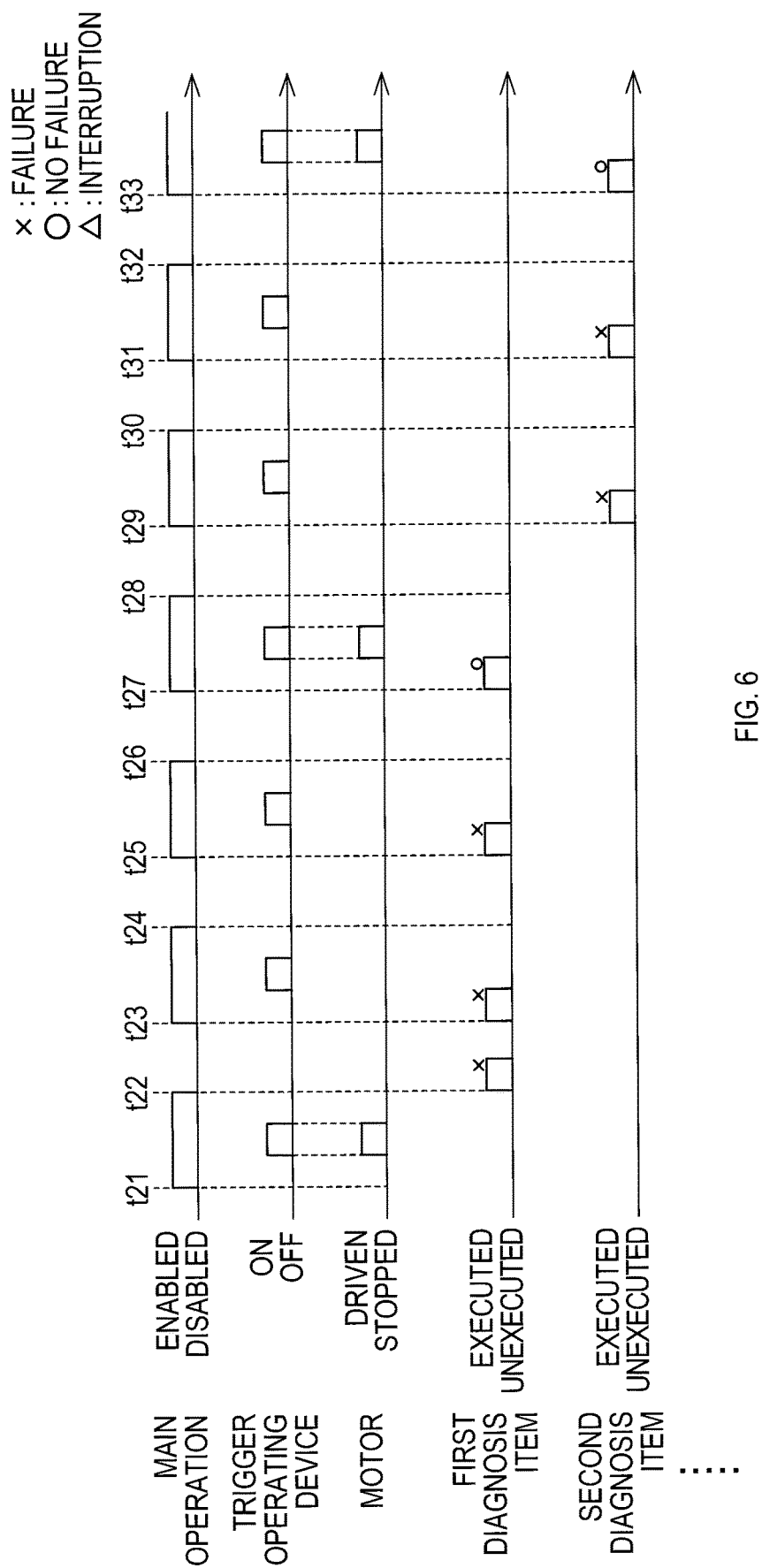
FIG. 6 is a time chart showing a second execution example of self-diagnosis.
Figure 7:
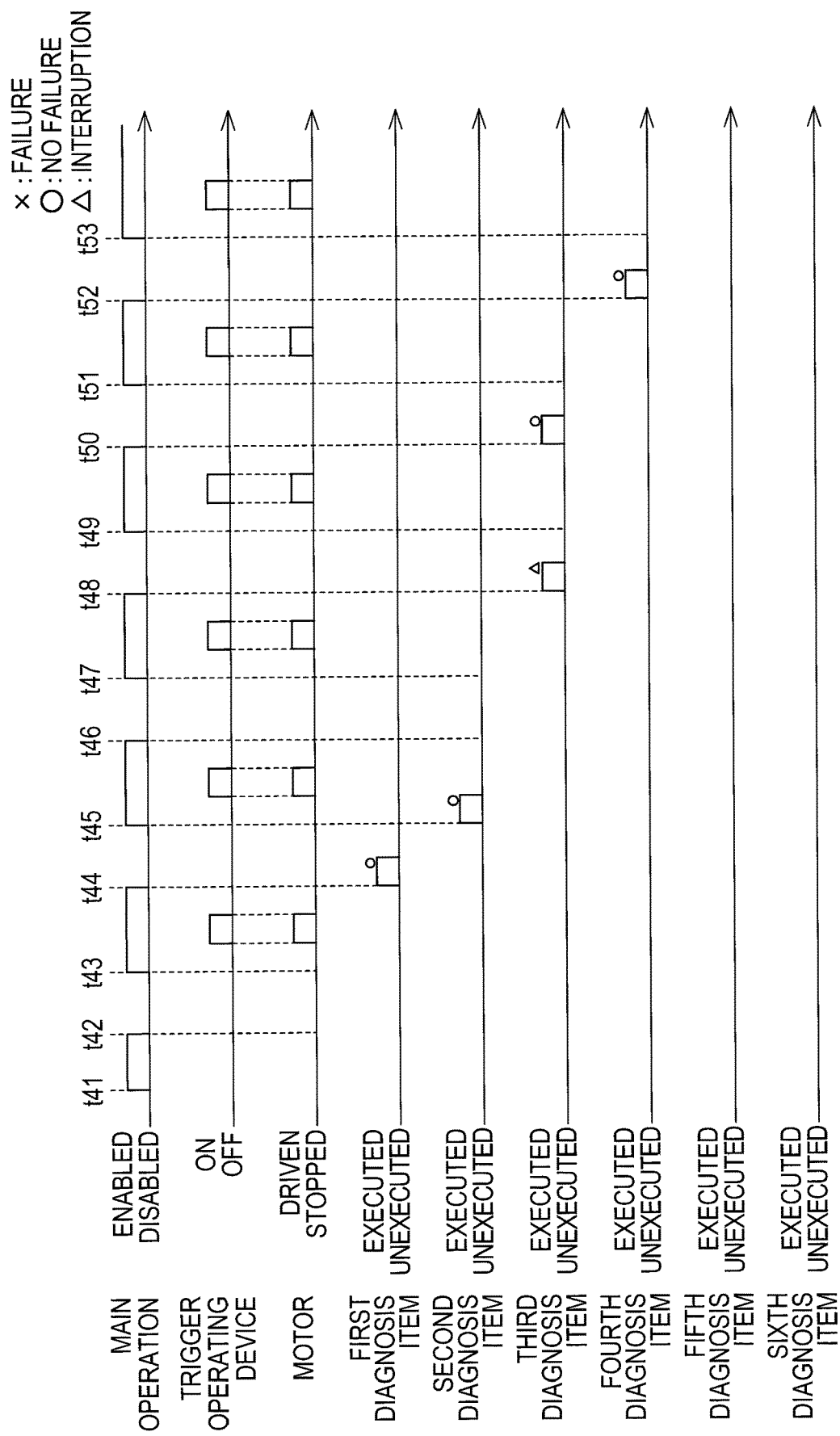
FIG. 7 is a time chart showing a third execution example of self-diagnosis.
Figure 8:
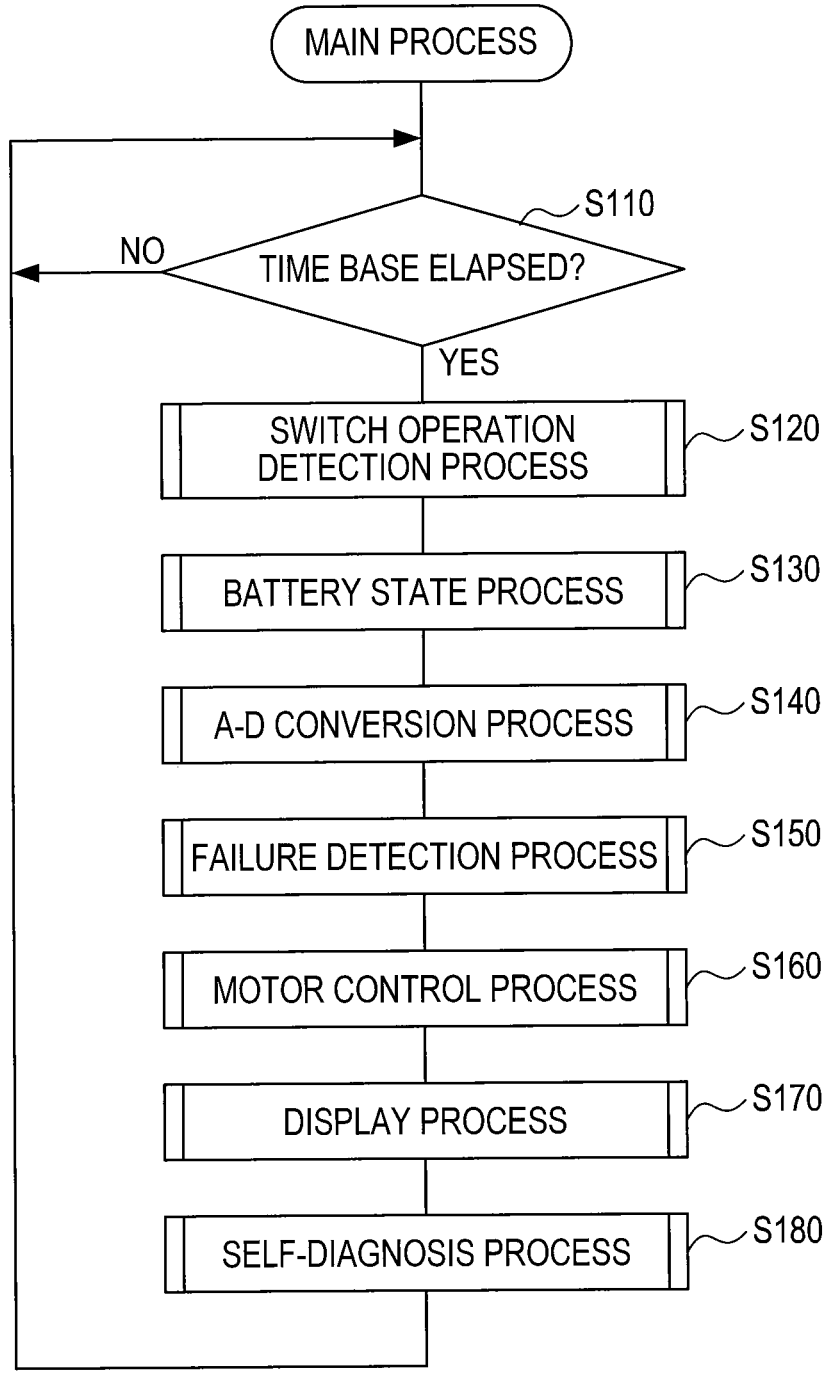
FIG. 8 is a flowchart showing a main process.

As shown in FIG. 6, in the second execution example, the main operation is enabled at the time t21, and is disabled at time t22. For a certain period from the time t21 to the time t22, the trigger operating device 20 is on-operated. While the trigger operating device 20 is on-operated, the motor 21 is driven properly without being stopped improperly.

At the time t22, based on the time t22 corresponding to the diagnosis timing of the first diagnosis item, self-diagnosis of the first diagnosis item is executed. The second execution example shows an example when a result "failure" is obtained in the self-diagnosis of the first diagnosis item started at the time t22.

In the second execution example, the main operation is enabled at time t23. At the time t23, the next diagnosis item continues to be the first diagnosis item. That the next diagnosis item continues to be the first diagnosis item is based on the diagnosis result of the first diagnosis item indicating a failure in the last self-diagnosis executed at the time t22.

The diagnosis timing of the first diagnosis item primarily corresponds to the disabling timing. However, in the present embodiment, when self-diagnosis of the same diagnosis item is performed again based on the result of the last self-diagnosis indicating a failure, the diagnosis timing becomes the enabling timing. Accordingly, self-diagnosis of the first diagnosis item is again executed at the enabling timing of the time t23. The second execution example shows an example when a result "failure" is obtained also in the self-diagnosis of the first diagnosis item started at the time t23. In this case, as illustrated in the time t23 to t24 in FIG. 6, when the trigger operating device 20 is on-operated, the motor 21 is not driven.

In the second execution example, the main operation is disabled at time t24, and is enabled at time t25. In this case as well, similar to the case at the time t23, based on the last self-diagnosis result of the first diagnosis item indicating a failure, self-diagnosis of the first diagnosis item is executed again at the enabling timing of the time t25. The second execution example shows an example when a result "failure" is obtained also in the self-diagnosis of the first diagnosis item started at the time t25. In this case, as illustrated in the time t25 to t26 in FIG. 6, when the trigger operating device 20 is on-operated, the motor 21 is not driven.

In the second execution example, the main operation is disabled at time t26, and is enabled at time t27. In this case as well, similar to the case at the time t23 and time t25, based on the last self-diagnosis result of the first diagnosis item indicating a failure, self-diagnosis of the first diagnosis item is executed again at the enabling timing of the time t27. The second execution example shows an example when a result "no failure" is obtained in the self-diagnosis started at the time t27. In this case, as illustrated in the time t27 to t28 in FIG. 6, when the trigger operating device 20 is on-operated, the motor 21 is driven.

In the second execution example, the main operation is disabled at the time t28, and is enabled at time t29. At the time t29, based on the next diagnosis item being the second diagnosis item and the diagnosis timing of the second diagnosis item corresponding to the enabling timing, self-diagnosis of the second diagnosis item is executed. That the next diagnosis item is second diagnosis item is based on the diagnosis result of the first diagnosis item indicating no failure in the last self-diagnosis executed at the time t27. The second execution example shows an example when a result "failure" is obtained in the self-diagnosis started at the time t29.

In the second execution example, the main operation is disabled at time t30, and is enabled at time t31. At the time t31, based on the diagnosis result of the second diagnosis item indicating a failure in the last self-diagnosis, self-diagnosis of the second diagnosis item is executed again. The second execution example shows an example when a result "failure" is obtained also in the self-diagnosis started at the time t31.

In the second execution example, the main operation is disabled at time t32, and is enabled at time t33. In this case as well, similar to the case at the time t31, based on the last self-diagnosis result of the second diagnosis item indicating a failure, self-diagnosis of the second diagnosis item is executed again at the enabling timing of the time t33. The second execution example shows an example when a result "no failure" is obtained in the self-diagnosis started at the time t33.

Now, a third execution example shown in FIG. 7 will be described. The third execution example includes a case where self-diagnosis is interrupted. In the third execution example, the first diagnosis item is set as the diagnosis item to be executed first at or after time t41.

Figure 5:
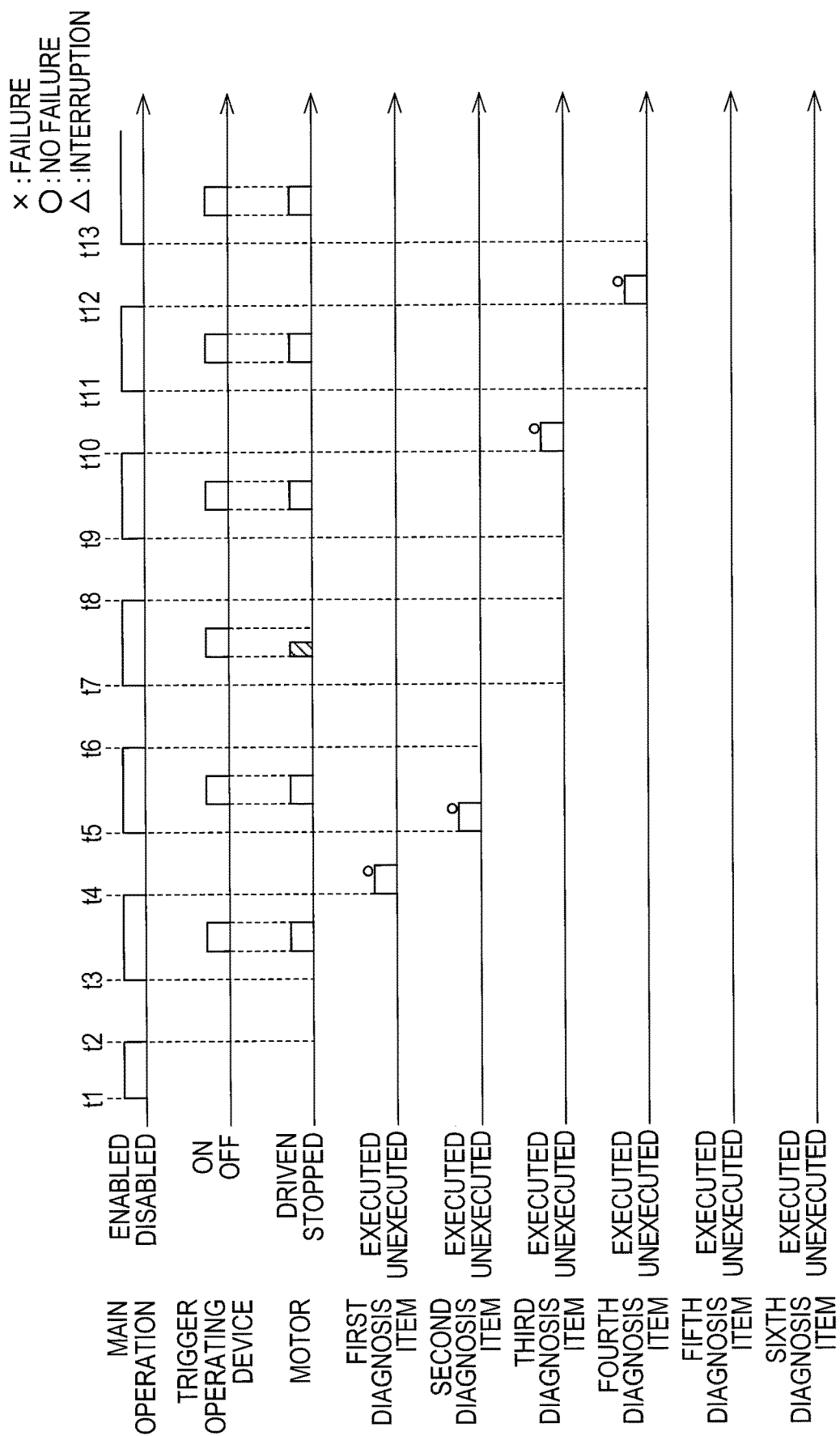
FIG. 5 is a time chart showing a first execution example of self-diagnosis.

In the third execution example, operations from the time t41 to t47 are the same as the operations from the time t1 to t7 of the first execution example shown in FIG. 5. Therefore, description of the operation from the time t41 to t47 will not be repeated.

In the third execution example, the main operation is enabled at the time t47, and is disabled at time t48. For a certain period from the time t47 to the time t48, the trigger operating device 20 is on-operated. In the third execution example, while the trigger operating device 20 is on-operated, the motor 21 is driven properly without being stopped improperly.

At the time t48, based on the time t48 corresponding to the diagnosis timing of the third diagnosis item, self-diagnosis of the third diagnosis item is executed. The third execution example shows an example when the self-diagnosis started at the time t48 is interrupted before completed properly. The control circuit 23, when an interruption condition is established during the self-diagnosis, interrupts the self-diagnosis. The interruption condition may include any condition. The interruption condition may be established, for example, when the trigger operating device 20 is on-operated.

In the third execution example, the main operation is enabled at time t49. In the present embodiment, when self-diagnosis is interrupted, the interrupted diagnosis item continues to be the next diagnosis item.

However, the next diagnosis timing after interruption is different from the next diagnosis timing when the self-diagnosis result indicates a failure. Specifically, the diagnosis timing after interruption corresponds to the prescribed diagnosis timing corresponding to the diagnosis item.

Therefore, self-diagnosis of the third diagnosis item is not executed at the time t49, and self-diagnosis of the third diagnosis item is executed at the disabling timing of the time t50. The third execution example shows an example when a result "no failure" is obtained in the self-diagnosis started at the time t50. As illustrated in the time t49 to t50 of FIG. 7, when the self-diagnosis is interrupted at the time of the last self-diagnosis, driving of the motor 21 is not limited in the next enabling period, and when the trigger operating device 20 is on-operated, the motor 21 is driven. The operations at or after the time t51 are the same as the operations at or after the time t11 in the first execution example shown in FIG. 5. Thus, description of the operation at or after the time t51 will not be repeated.

(5) Main Process

Now, the main process executed by the control circuit 23 will be described with referent to FIGS. 8 to 14. The CPU 24 of the control circuit 23 executes the main process based on a main process program stored in memory 25 during a specified execution period. The specified execution period may be, for example, a period from when the main power switch 30 is turned on until the main power switch 30 is turned off and a later-described self-diagnosis process of S180 immediately after the turning-off of the main switch 30 is completed. Each execution example shown in FIGS. 5 to 7 is executed by the CPU 24 executing the main process.

The CPU 24, when starting the main process, determines in S110 whether a time base has elapsed since the last transition from S110 to S120. The time base means a control cycle. The control cycle may be any time. When the time base elapses in S110, the present process moves to S120.

In S120, the CPU 24 executes a switch operation detection process. Specifically, the CPU 24 detects an operation state of the trigger operating device 20 by the user of the electric work machine 1 based on the first trigger information ST1 and the second trigger information ST2. The CPU 24 outputs the trigger detection information ST0 corresponding to the detected operation state from the control circuit 23 to the first battery pack 5 and the second battery pack 7.

Figure 9:
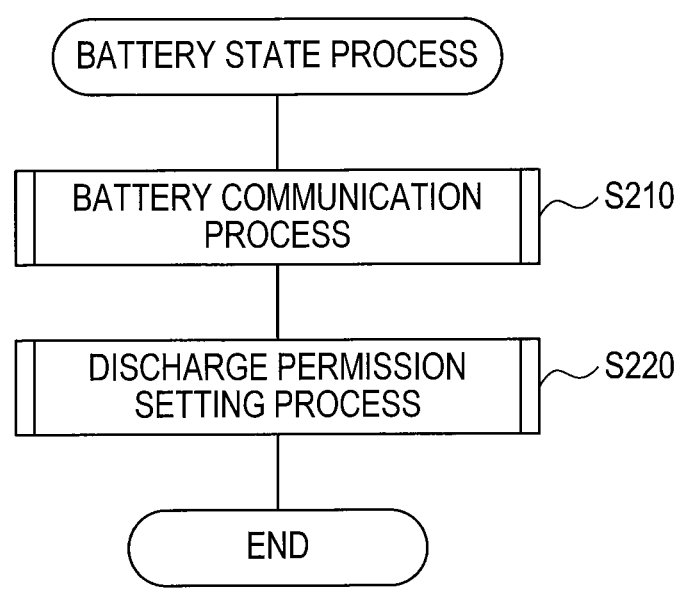
FIG. 9 is a flowchart showing detail of a battery state process of S130.

In S130, the CPU 24 executes a battery state process. Detail of the battery state process is as shown in FIG. 9. That is, the CPU 24, when moving to the battery state process, executes a battery communication process in S210. Specifically, the CPU 24 performs specific data communication with the first battery pack 5 and the second battery pack 7. The battery communication process includes a process to acquire the first discharge permission signal SA1 and a process to acquire the second discharge permission signal SA2.

In S220, the CPU 24 executes a discharge permission setting process. Specifically, the CPU 24, when the first discharge permission signal SA1 and the second discharge permission signal SA2 are acquired in the battery communication process of S210, outputs the third discharge permission signal SA3 or the fourth discharge permission signal SA4 from the control circuit 23. When the first discharge permission signal SA1 is acquired and the second discharge permission signal SA2 is not acquired in the battery communication process of S210, the CPU 24 outputs the third discharge permission signal SA3 from the control circuit 23. When the second discharge permission signal SA2 is acquired and the first discharge permission signal SA1 is not acquired in the battery communication process of S210, the CPU 24 outputs the fourth discharge permission signal SA4 from the control circuit 23. When the third discharge permission signal SA3 is outputted from the control circuit 23, the switch 37 is turned on and battery power can be supplied from the first battery pack 5 to the motor drive circuit 22. When the fourth discharge permission signal SA4 is outputted from the control circuit 23, the switch 47 of the second switching circuit 46 is turned on and battery power can be supplied from the second battery pack 7 to the motor drive circuit 22. When the discharge permission setting process of S220 ends, the present process moves to S140 (see FIG. 8).

In S140, the CPU 24 executes an A-D conversion process. Specifically, the CPU 24 controls an A-D conversion circuit (not shown) and converts various analog signals inputted to the control circuit 23 to digital values that the CPU 24 can process by the A-D conversion circuit. The CPU 24 acquires the digital values converted by the A-D conversion circuit.

In S150, the CPU 24 executes a failure detection process. Specifically, the CPU 24 executes the aforementioned failure detection functions. In other words, the CPU 24 executes the overvoltage detection function based on the voltage signal SV, the overcurrent detection function based on the current signal SC, the first overheat detection function based on the first temperature signal STM1, the second overheat detection function based on the second temperature signal STM2, and the third overheat detection function based on the third temperature signal STM3.

Figure 10:
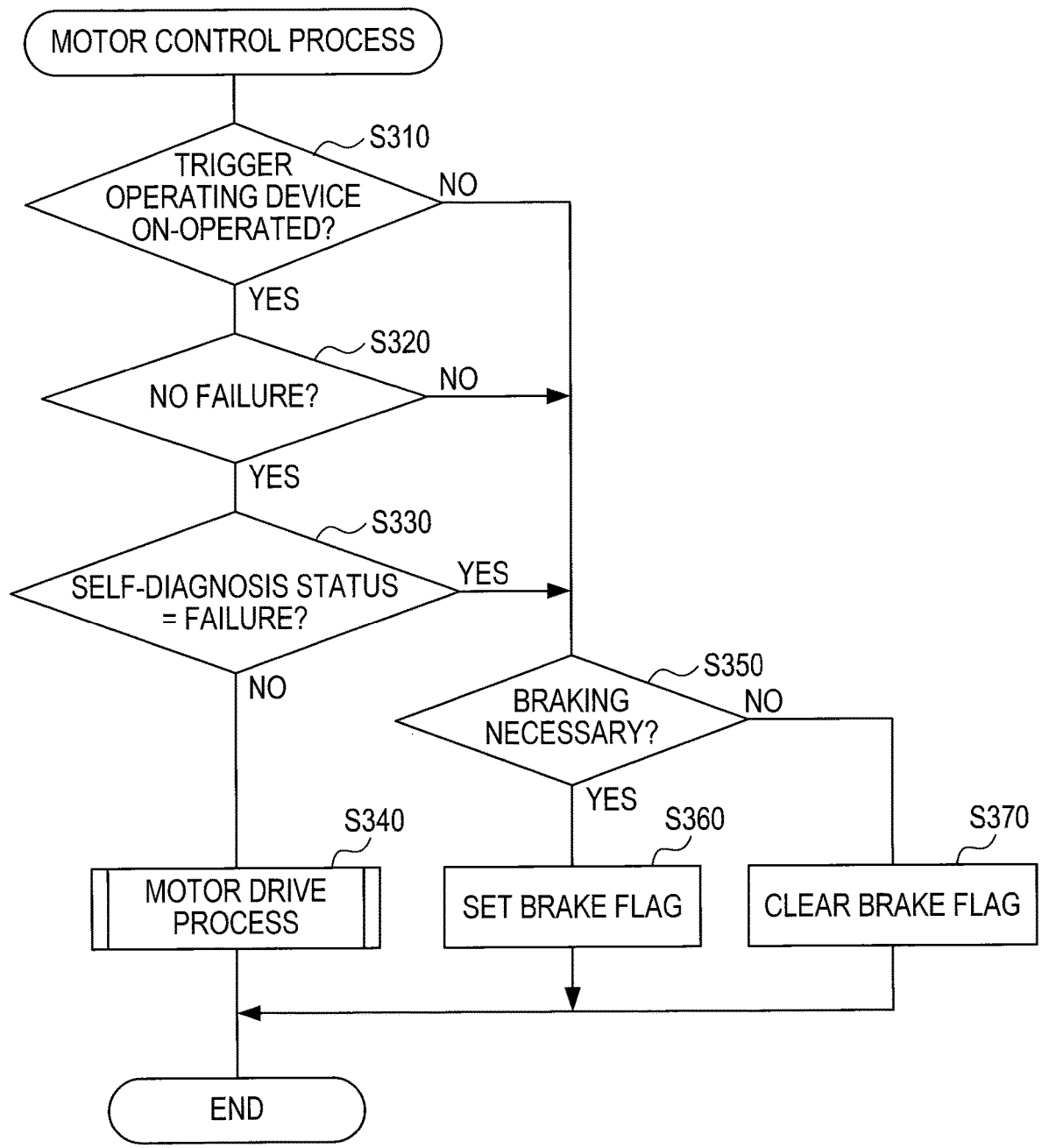
FIG. 10 is a flowchart showing detail of a motor control process of S160.

In S160, the CPU 24 executes a motor control process. Detail of the motor control process is as shown in FIG. 10. The CPU 24, when moving to the motor control process, determines in S310 whether the trigger operating device 20 is on-operated based on the first trigger information ST1 and the second trigger information ST2.

When the trigger operating device 20 is off-operated, the present process moves to S350. When the trigger operating device 20 is on-operated, the present process moves to S320. In S320, the CPU 24 determines whether a failure is detected in one or more of the detection functions in the failure detection process of S150. When a failure is detected in the failure detection process, the present process moves to S350. When no failure is detected in the failure detection process, the CPU 24 further determines whether the interruption information SS indicates the command permission. When the interruption information SS indicates the command permission, the CPU 24 determines that no failure has occurred in the electric work machine 1 and moves to S330. When the interruption information SS indicates the command interruption, the CPU 24 determines that a failure has occurred in the electric work machine 1 and moves to S350.

In S330, the CPU 24 determines whether a later-described self-diagnosis status is set to "failure". When the self-diagnosis status is set to "failure", the present process moves to S350. When the self-diagnosis status is not set to "failure", the present process moves to S340.

In S340, the CPU 24 executes a motor drive process. Specifically, the CPU 24 calculates various parameters. The various parameters are used by the CPU 24 for controlling the motor drive circuit 22 to drive the motor 21. The CPU 24 further outputs the motor drive command SD corresponding to each of the calculated various parameters to the motor drive circuit 22 to drive the motor 21. After the process of S340, the present process moves to S170 (see FIG. 8).

In S350, the CPU 24 determines whether it is necessary to brake the motor 21. Moving to S350 means that it is necessary to stop the motor 21. The process of S350 to S370 is a process to appropriately stop the motor 21.

In S350, the CPU 24, for example, based on a rotation signal inputted from a rotation sensor (not shown), determines whether it is necessary to brake the motor 21. The rotation signal indicates a rotating state of the motor 21. For example, when the motor 21 is rotating above a prescribed speed, it is necessary to brake the motor 21. When it is necessary to brake the motor 21, the present process moves to S360. In S360, the CPU 24 sets a brake flag. This executes braking. Specifically, the CPU 24, in a brake process executed in parallel with the main process separately from the main process, applies braking in response to the set brake flag. After the process of S360, the present process moves to S170.

When it is not necessary to apply braking in S350, the present process moves to S370. For example, when the motor 21 is already stopped, it is not necessary to apply braking. In S370, the CPU 24 clears the brake flag. This stops braking in the aforementioned brake process, in response to the cleared brake flag. After the process of S370, the present process moves to S170. As mentioned above, in the motor control process, when it is determined in S320 that there is no failure, and when the self-diagnosis status is not set to "failure" in S330, the process moves to S340 and the motor drive command SD is outputted. On the other hand, when it is determined in S320 that there is a failure or when the self-diagnosis status is set to "failure" in S330, the motor drive command SD is not outputted and the motor 21 is not driven.

In S170, the CPU 24 executes a display process. Specifically, the CPU 24 displays various information on the display panel 171.

Figure 11:
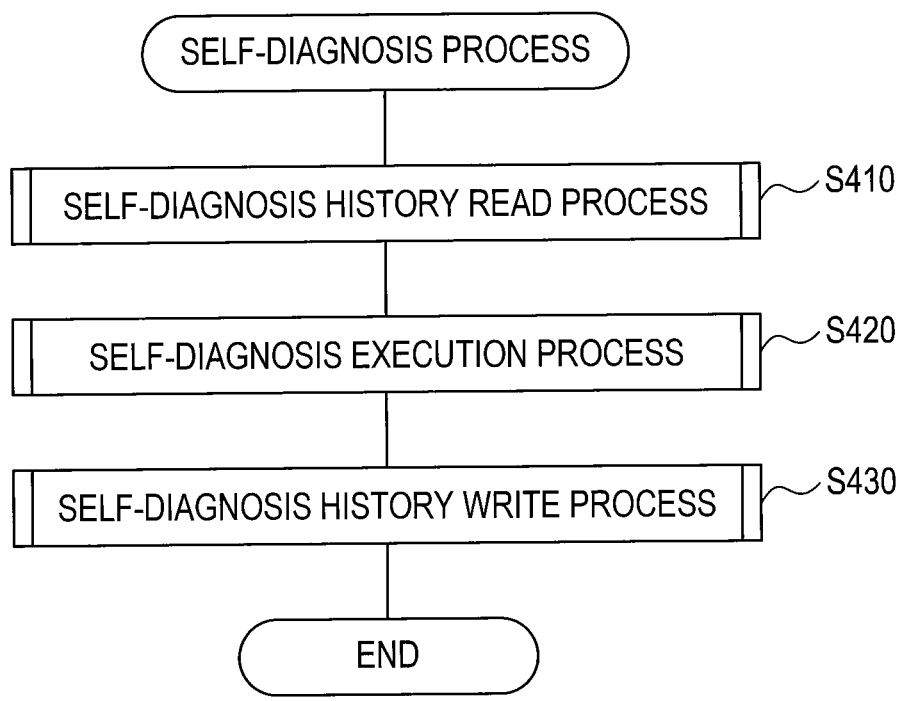
FIG. 11 is a flowchart showing detail of a self-diagnosis process of S180.
Figure 12:
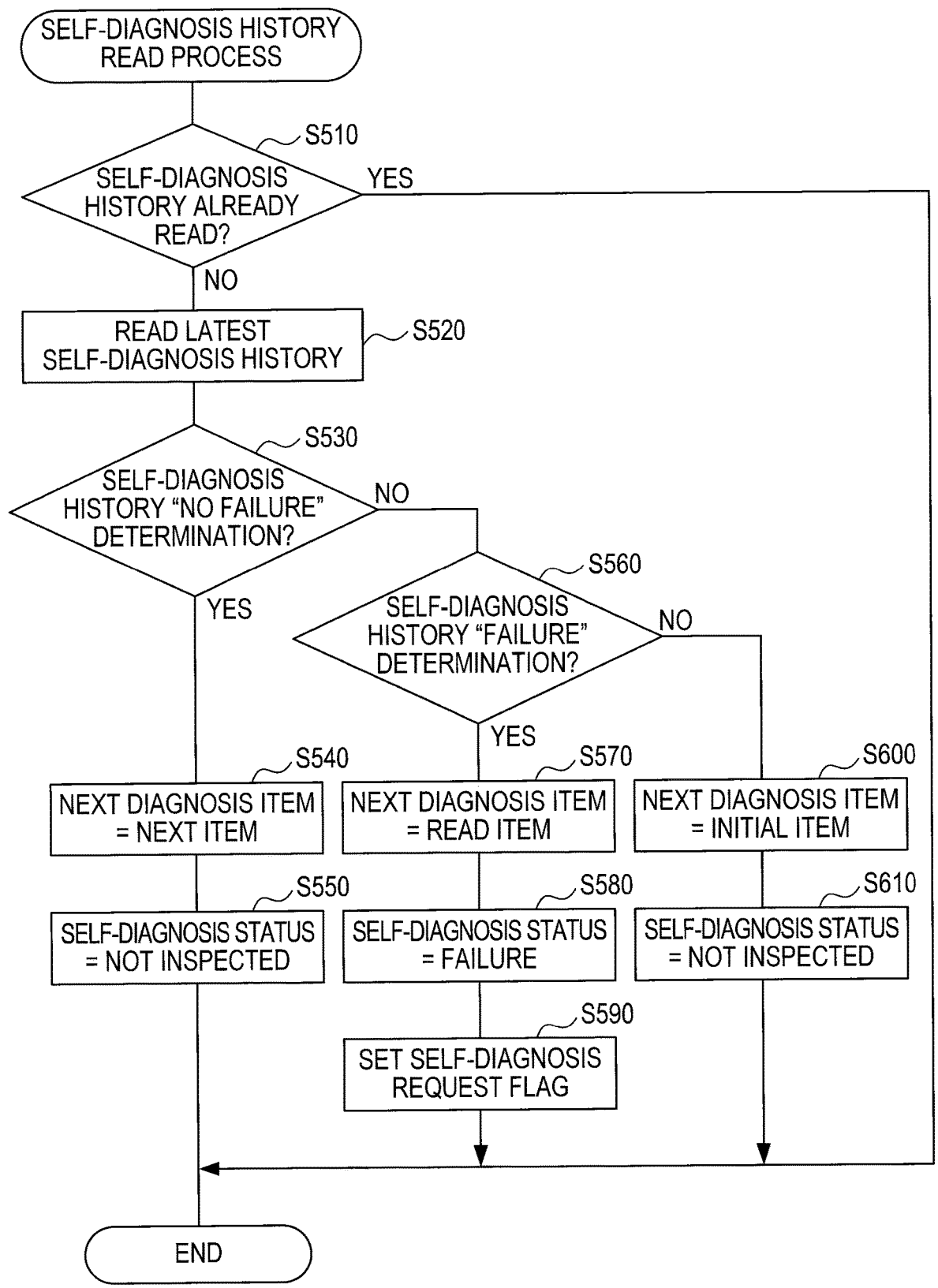
FIG. 12 is a flowchart showing detail of a self-diagnosis history read process of S410.

In S180, the CPU 24 executes a self-diagnosis process. Detail of the self-diagnosis process is as shown in FIG. 11. The CPU 24, when moving to the self-diagnosis process, executes a self-diagnosis history read process in S410. Detail of the self-diagnosis history read process is as shown in FIG. 12.

The CPU 24, when moving to the self-diagnosis history read process, determines in S510 whether the self-diagnosis history most recently written to the memory 25 has already been read. The self-diagnosis history most recently written to the memory 25 indicates the result of the self-diagnosis executed last time. The self-diagnosis history is written to the memory 25 in S830 or S850 in a later-described self-diagnosis history write process shown in FIG. 14.

In S510, when the self-diagnosis history has already been read, the present process moves to S420 (see FIG. 11). When the self-diagnosis history is not yet read, the present process moves to S520. In S520, the CPU 24 reads the self-diagnosis history written to the memory 25 in the most recent process of S830 or S850 from the memory 25.

In S530, the CPU 24 determines whether the self-diagnosis history read in S520 indicates the "no failure" determination. When the self-diagnosis history read in S520 indicates the "no failure" determination, the present process moves to S540. In S540, the CPU 24 sets the next diagnosis item (that is, diagnosis item of self-diagnosis to be executed this time; in other words, diagnosis item of self-diagnosis to be executed first) to the next diagnosis item of the diagnosis item executed last time in the aforementioned prescribed order. In S550, the CPU 24 sets the self-diagnosis status to "not inspected". After the process of S550, the present process moves to S420 (see FIG. 11). The self-diagnosis status is reset to a prescribed initial value each time the main operation is disabled or enabled.

In S530, when the self-diagnosis history read in S520 is not information indicating the "no failure" determination, the present process moves to S560. In S560, the CPU 24 determines whether the self-diagnosis history read in S520 indicates the "failure" determination. When the self-diagnosis history read in S520 indicates the "failure" determination, the present process moves to S570. In S570, the CPU 24 sets the next diagnosis item to the diagnosis item corresponding to the self-diagnosis history that has been read this time. In other words, the CPU 24 sets the next diagnosis item to the same diagnosis item as that of the self-diagnosis executed last time.

In S580, the CPU 24 sets the self-diagnosis status to "failure". While the self-diagnosis status continues to be set to "failure" after the self-diagnosis status is set to "failure" in S580, it is positively determined in S330 (see FIG. 10) and the motor 21 is not driven.

In S590, the CPU 24 sets a self-diagnosis request flag. The self-diagnosis request flag is cleared each time the main operation is disabled or enabled. After the process of S590, the present process moves to S420 (see FIG. 11).

When the self-diagnosis history read in S560 does not indicate the "failure" determination, the present process moves to S600. In this case, for example, it is assumed that the self-diagnosis history was not properly written at the time of the last self-diagnosis or the self-diagnosis history is not yet written. Thus, in S600, the CPU 24 sets the next diagnosis item to an initial (first) diagnosis item in the prescribed order. In S610, the CPU 24 sets the self-diagnosis status to "not inspected". After the process of S610, the present process moves to S420 (see FIG. 11).

Figure 13:
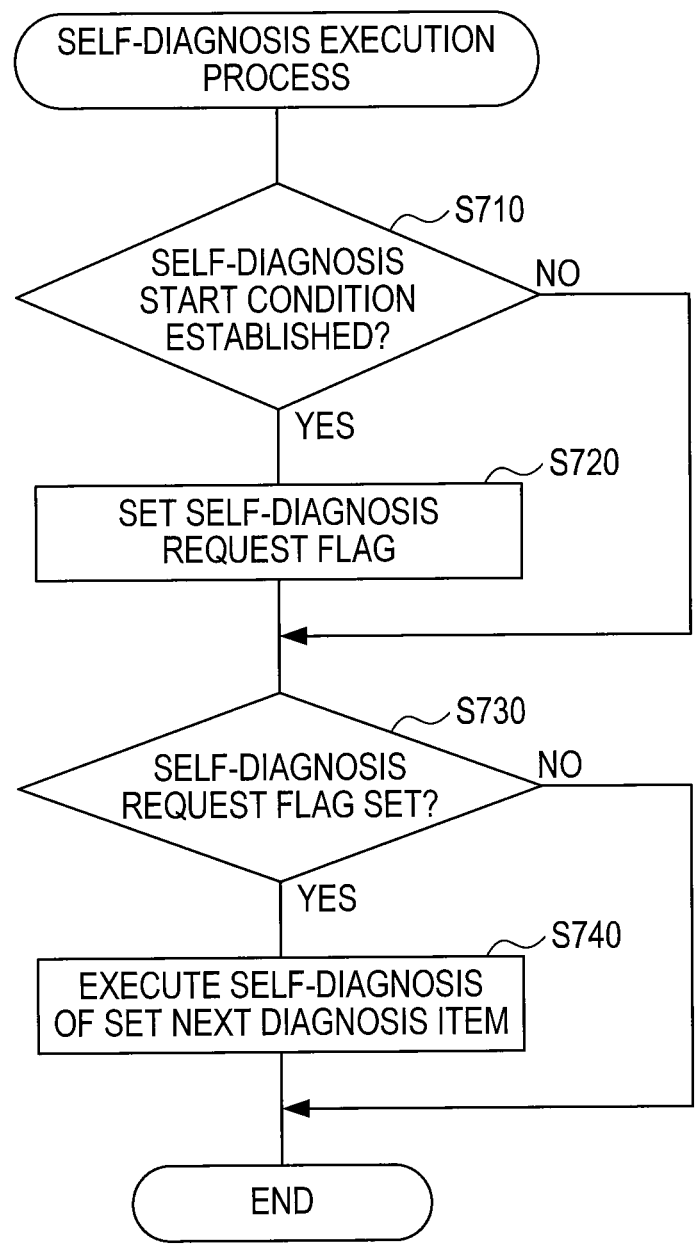
FIG. 13 is a flowchart showing detail of a self-diagnosis execution process of S420.

In S420, the CPU 24 executes a self-diagnosis execution process. Detail of the self-diagnosis execution process is as shown in FIG. 13. The CPU 24, when moving to the self-diagnosis execution process, determines in S710 whether a self-diagnosis start condition is established.

The self-diagnosis start condition differs depending on the prescribed diagnosis timing corresponding to the next diagnosis item. In other words, the self-diagnosis start condition of the diagnosis item of which prescribed diagnosis timing corresponds to the enabling timing (power supply line function diagnosis of the second diagnosis item in the present embodiment) is established when the enabling timing arrives. The main process is started when the main operation is enabled. Therefore, after start of the main process, when the prescribed diagnosis timing corresponding to the next diagnosis item corresponds to the enabling timing, it is determined in S710 that the self-diagnosis start condition is established.

The self-diagnosis start condition of diagnosis item in which the prescribed diagnosis timing corresponds to the disabling timing is established when (i) and (ii) below are satisfied:

(i) the disabling timing has arrived; and (ii) the motor drive command SD is outputted (that is, the motor 21 is driven) during the last enabling period, and the motor 21 is not stopped improperly.

The above (ii) may be determined based on the aforementioned motor drive history and failure drive history.

When the self-diagnosis start condition is not established in S710, the present process moves to S730. When the self-diagnosis start condition is established in S710, the present process moves to S720. In S720, the CPU 24 sets the self-diagnosis request flag.

In S730, the CPU 24 determines whether the self-diagnosis request flag is set. When the self-diagnosis request flag is not set, the present process moves to S430 (see FIG. 11). When the self-diagnosis request flag is set, the present process moves to S740. In S740, self-diagnosis of the next diagnosis item is executed.

The case where self-diagnosis is executed in S740 is basically a case where the self-diagnosis start condition is established for the next diagnosis item in S710, and further the self-diagnosis request flag is set in S720. When the self-diagnosis start condition is not established, self-diagnosis of S740 is not executed. However, when self-diagnosis of the same diagnosis item is executed again this time due to "failure" determination in the last self-diagnosis, the self-diagnosis request flag is set in S590 of FIG. 12. Therefore, even in this case, even if the self-diagnosis start condition is not established, it is positively determined in S730, and self-diagnosis is executed in S740. After the self-diagnosis in S740, the present process moves to S430 (see FIG. 11).

Figure 14:
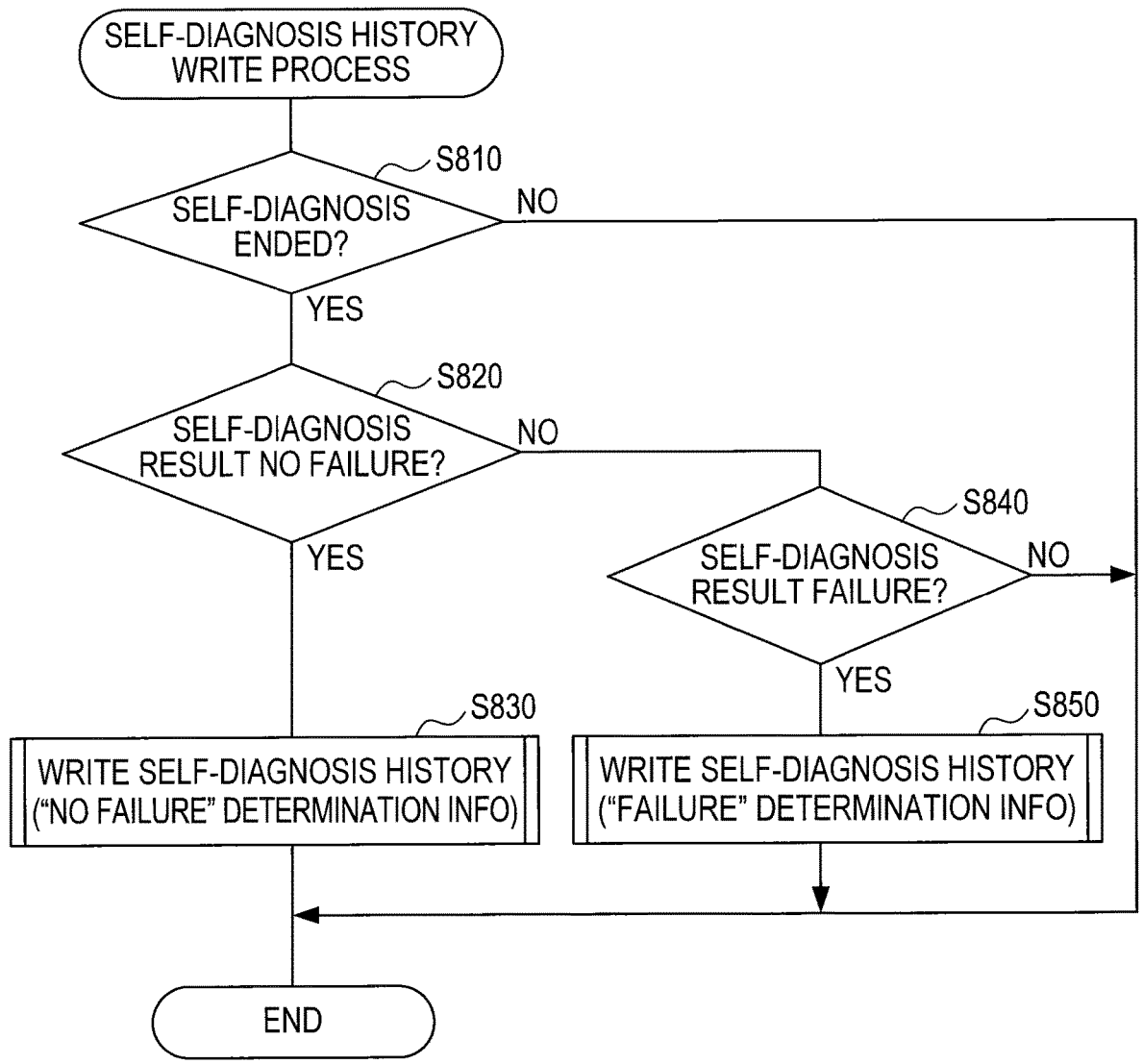
FIG. 14 is a flowchart showing detail of a self-diagnosis history write process of S430.

In S430, the CPU 24 executes a self-diagnosis history write process. Detail of the self-diagnosis history write process is as shown in FIG. 14. The CPU 24, when moving to the self-diagnosis history write process, determines in S810 whether self-diagnosis of the diagnosis item this time has ended. When the self-diagnosis is interrupted for some reason, the CPU 24 ends the self-diagnosis history write process and moves to S110 (see FIG. 8).

When the self-diagnosis of the diagnosis item this time ends in S810, the present process moves to S820. In S820, the CPU 24 determines whether the diagnosis result of self-diagnosis executed this time indicates no failure. When the diagnosis result indicates no failure, the CPU 24 writes the self-diagnosis history to the memory 25 in S830. Specifically, the CPU 24 writes information indicating the "no failure" determination. In S830, the CPU 24 further sets the self-diagnosis status to, for example, "inspected". As a result, when the main operation is not disabled at the time when the process of S830 is executed, negative determination is subsequently made in the process of S330, and the motor 21 is driven by the process of S340. After the process of S830, the present process moves to S110 (see FIG. 8).

When the diagnosis result indicates a failure in S820, the CPU 24 determines in S840 whether the diagnosis result indicates a failure. When the diagnosis result indicates no failure, there is a possibility that the diagnosis result has not been acquired correctly for some reason. Therefore, when the diagnosis result indicates no failure, the CPU 24 moves to S110 (see FIG. 8) without writing the self-diagnosis history.

When the diagnosis result indicates a failure in S820, the CPU 24 writes the self-diagnosis history to the memory 25 in S850. Specifically, the CPU 24 writes information indicating the "failure" determination. In S850, the CPU 24 further sets the self-diagnosis status to "failure". When the self-diagnosis status is set to "failure" in S850, positive determination is made thereafter in S330 (see FIG. 10) during a condition in which the self-diagnosis status is set to "failure", and the motor 21 is not driven. After the process of S850, the present process moves to S110 (see FIG. 8).

(6) Trigger Detection Function Diagnosis Process

Figure 15:
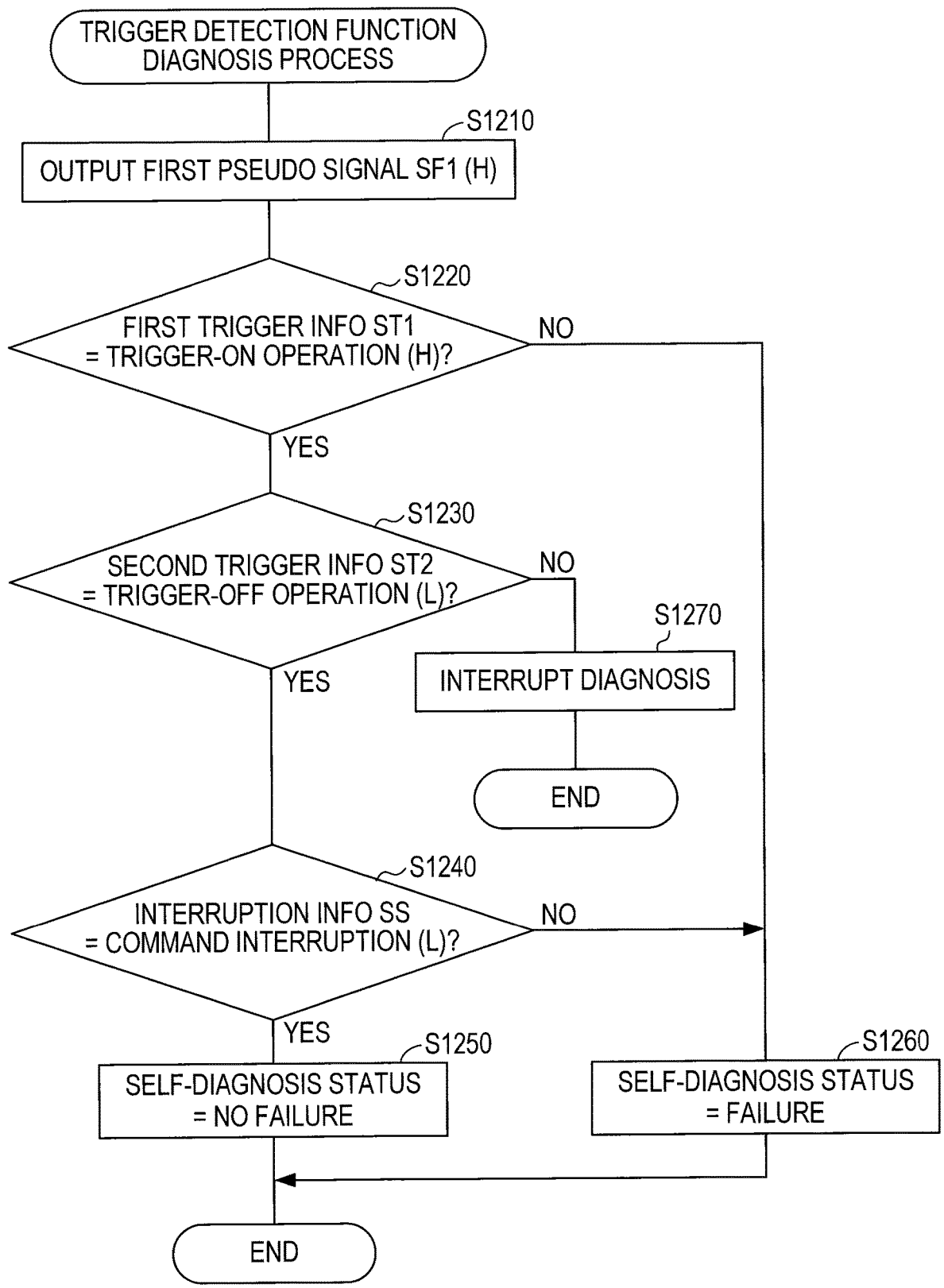
FIG. 15 is a flowchart showing a trigger detection function diagnosis process.

The trigger detection function diagnosis of the first diagnosis item includes the trigger detection function diagnosis process shown in FIG. 15. The CPU 24 executes the trigger detection function diagnosis process shown in FIG. 15 when the next diagnosis item set in S740 of FIG. 13 is the trigger detection function diagnosis.

The CPU 24, when starting the trigger detection function diagnosis process, outputs the first pseudo signal SF1 (high-level binary signal) in S1210. In S1220, the CPU 24 determines whether the first trigger information ST1 indicates the on-operation of the trigger operating device 20. When the first trigger information ST1 does not indicate the on-operation of the trigger operating device 20, the CPU 24 executes a process of S1260. In S1260, the CPU 24 determines that the diagnosis result indicates a failure, sets the self-diagnosis status to "failure", and ends the trigger detection function diagnosis. When the first trigger information ST1 indicates the on-operation of the trigger operating device 20, the present process moves to S1230.

In S1230, the CPU 24 determines whether the second trigger information ST2 indicates the off-operation of the trigger operating device 20. When the second trigger information ST2 does not indicate the off-operation of the trigger operating device 20, there is a possibility that a failure has occurred to the trigger detection circuit 80 or the user is operating the trigger operating device 20. Therefore, when the second trigger information ST2 does not indicate the off-operation of the trigger operating device 20, the CPU 24 interrupts the currently running trigger detection function diagnosis of the first diagnosis item in S1270.

When the second trigger information ST2 indicates the off-operation of the trigger operating device 20 in S1230, the present process moves to S1240. In S1240, the CPU 24 determines whether the interruption information SS indicates the command interruption. When the interruption information SS does not indicate the command interruption, that is, indicates the command permission, the present process moves to S1260. In S1260, the CPU 24 determines that the diagnosis result indicates a failure, and sets the self-diagnosis status to "failure". When the interruption information SS indicates the command interruption, the present process moves to S1250. In S1250, the CPU 24 determines that the diagnosis result indicates no failure, sets the self-diagnosis status to "no failure", and ends the trigger detection function diagnosis process.

(7) Regular Check of Trigger Detection Function

Figure 16:
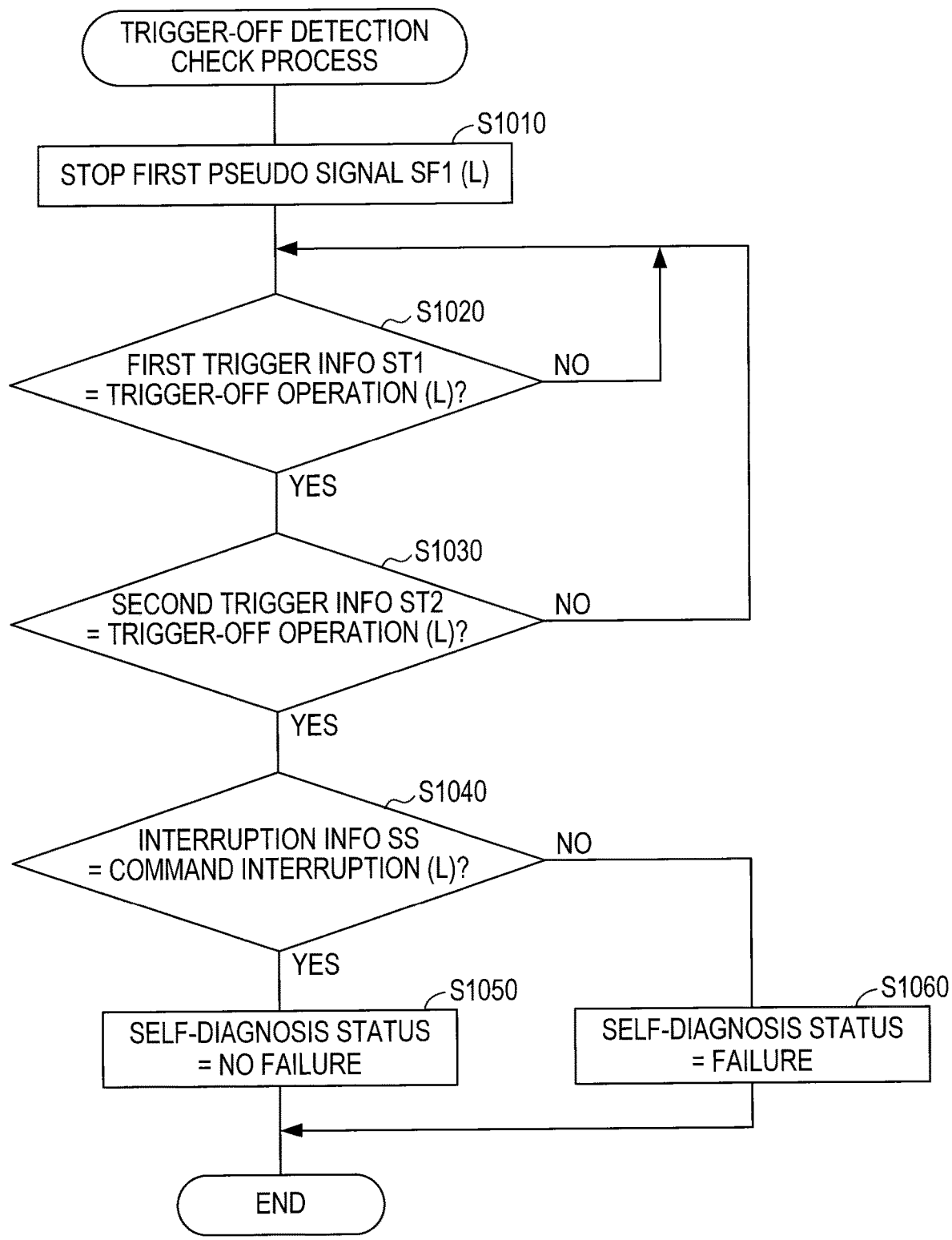
FIG. 16 is a flowchart showing a trigger-off detection check process.
Figure 17:
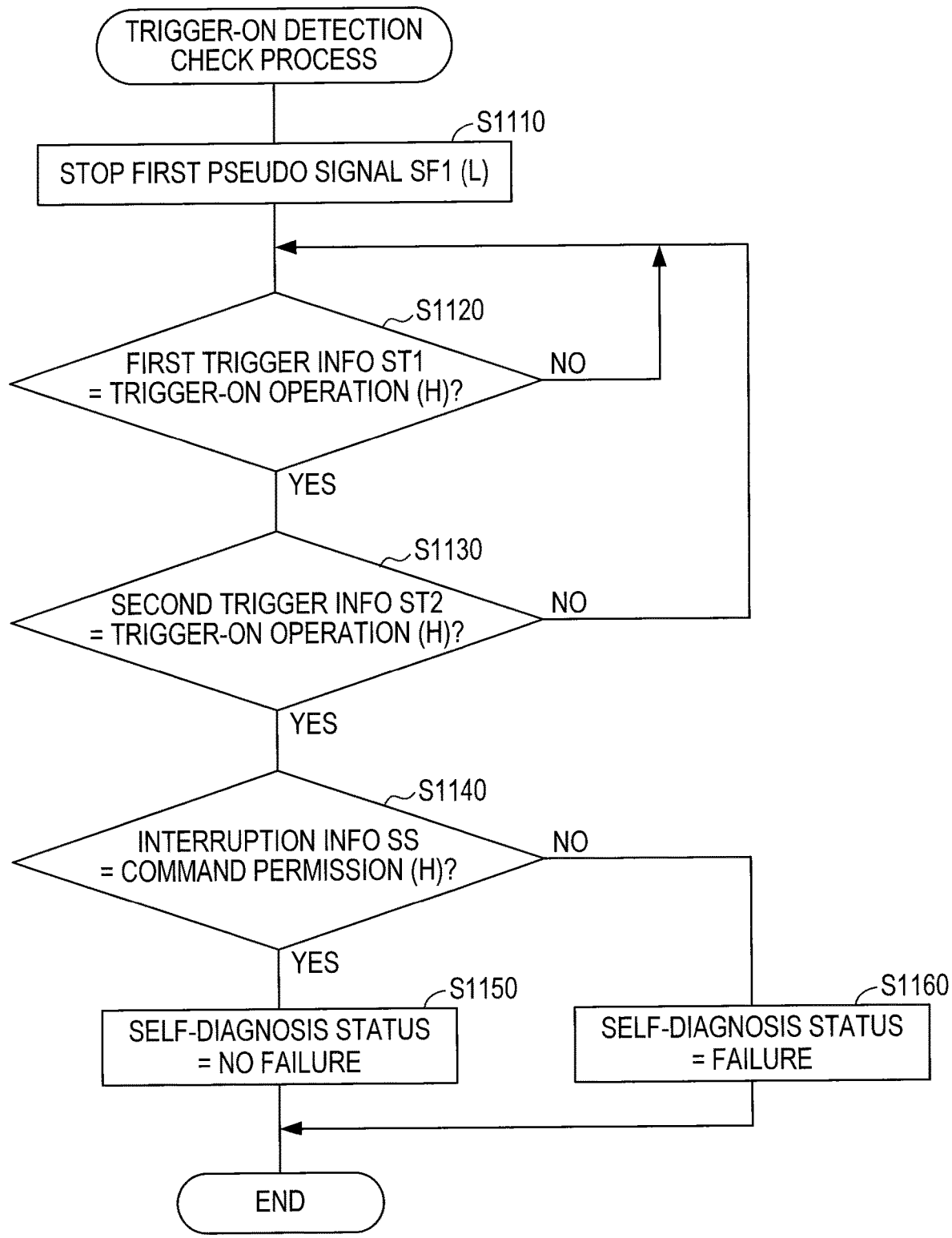
FIG. 17 is a flowchart showing a trigger-on detection check process.

The control circuit 23 (specifically, CPU 24) of the present embodiment, in parallel with the aforementioned main process, executes a trigger-off detection check process shown in FIG. 16 and a trigger-on detection check process shown in FIG. 17.

The trigger-off detection check process confirms whether it is possible to properly recognize that the trigger operating device 20 is off-operated based on the first trigger information ST1 and the second trigger information ST2.

The trigger-on detection check process confirms whether it is possible to properly recognize that the trigger operating device 20 is on-operated based on the first trigger information ST1 and the second trigger information ST2.

The trigger-off detection check process may be included in the aforementioned main process. For example, in the main process of FIG. 8, the control circuit 23, after start of the main process, may perform the trigger-off detection check process first and then move to S110.

The trigger-on detection check process may be included in the aforementioned main process. For example, in the motor control process of FIG. 10, the control circuit 23 may perform the trigger-on detection check process before the process of S330.

(7-1) Trigger-Off Detection Check Process

The control circuit 23 executes the trigger-off detection check process shown in FIG. 16, for example, each time the main operation is enabled and immediately after enabled. The control circuit 23, when starting the trigger-off detection check process, stops outputting the first pseudo signal SF1 in S1010. Basically, the first pseudo signal SF1 is not outputted immediately after the main operation is enabled. Therefore, the process of S1010 is essentially a process for maintaining a state where the first pseudo signal SF1 is not outputted.

In S1020, the control circuit 23 determines whether the first trigger information ST1 indicates the off-operation of the trigger operating device 20. When the first trigger information ST1 does not indicate the off-operation of the trigger operating device 20, there is a possibility that the main power switch 30 is turned on in a state where the trigger operating device 20 is on-operated. Therefore, when the first trigger information ST1 does not indicate the off-operation of the trigger operating device 20, the control circuit 23 repeats the process of S1020 until the first trigger information ST1 indicates the off-operation of the trigger operating device 20.

When the first trigger information ST1 indicates the off-operation of the trigger operating device 20 in S1020, the present process moves to S1030. In S1030, the control circuit 23 determines whether the second trigger information ST2 indicates the off-operation of the trigger operating device 20. When the second trigger information ST2 does not indicate the off-operation of the trigger operating device 20, the present process moves to S1020. When the second trigger information ST2 indicates the off-operation of the trigger operating device 20, the present process moves to S1040.

The processes of S1040 to S1060 are the same as the processes of the aforementioned S1240 to S1260 in FIG. 15. In other words, the control circuit 23, when the interruption information SS does not indicate the command interruption, sets the self-diagnosis status to "failure" in S1060. The control circuit 23, when the interruption information SS indicates the command interruption, sets the self-diagnosis status to "no failure" in S1050.

(7-2) Trigger-on Detection Check Process

The control circuit 23 executes the trigger-on detection check process shown in FIG. 17, for example, when recognizing the on-operation of the trigger operating device 20 based on the first trigger information ST1 and the second trigger information ST2.

The control circuit 23, when starting the trigger-on detection check process, stops outputting the pseudo signal SF1 in S1110, similar to the case of S1010 of FIG. 16. In S1120, the control circuit 23 determines whether the first trigger information ST1 indicates the on-operation of the trigger operating device 20. When first trigger information ST1 does not indicate the on-operation of the trigger operating device 20, the control circuit 23 repeats the process of S1120 until the first trigger information ST1 indicates the on-operation of the trigger operating device 20.

When the first trigger information ST1 indicates the on-operation of the trigger operating device 20 in S1120, the present process moves to S1130. In S1130, the control circuit 23 determines whether the second trigger information ST2 indicates the on-operation of the trigger operating device 20. When the second trigger information ST2 does not indicate the on-operation of the trigger operating device 20, the present process moves to S1120. When the second trigger information ST2 indicates the on-operation of the trigger operating device 20, the present process moves to S1140.

In S1140, the control circuit 23 determines whether the interruption information SS indicates the command permission. When the interruption information SS does not indicate the command permission, that is, indicates the command interruption, the present process moves to S1160. In S1160, the control circuit 23 sets the self-diagnosis status to "failure". When the interruption information SS indicates the command permission, the present process moves to S1150. In S1150, the control circuit 23 sets the self-diagnosis status to "no failure".

(8) Effect of Embodiment

According to the above-described embodiment, the following effects (a) to (i) are produced.

(a) The control circuit 23 executes the main process in accordance with the states of both the first trigger switch 27 and the second trigger switch 28. Specifically, the control circuit 23 outputs the motor drive command SD when the first trigger information ST1 and the second trigger information ST2 indicate the trigger-on state. For example, one situation is assumed where a failure occurs to the first trigger switch 27 and the first trigger information ST1 indicates the trigger-on state, when the trigger operating device 20 is off-operated. In this case, if the second trigger information ST2 indicates the trigger-off state, the motor drive command SD is not outputted. Accordingly, when a failure occurs in which the operation of the trigger operating device 20 by the user is not properly transmitted to the control circuit 23, the motor 21 can be properly stopped.

(b) The electric work machine 1 of the present embodiment further includes the circuit configured to operate by hardware processing, in addition to the control circuit 23. Specifically, the control circuit 23 includes the trigger detection circuit 80 and the interruption switch 29.

When the trigger determination information STR outputted from the trigger detection circuit 80 indicates the trigger-off state, the interruption switch 29 interrupts the motor drive command SD from the control circuit 23 to the motor drive circuit 22. Therefore, the electric work machine 1 with high reliability can be provided.

(c) The interruption switch 29 is turned on or off based on the interruption information SS inputted from the interruption latch circuit 70. The interruption switch 29 is provided in the drive line 90 through which the motor drive command SD is transmitted, and completes or interrupts the drive line 90. Therefore, input of the motor drive command SD to the motor drive circuit 22 can be easily interrupted.

The interruption information SS is information on which the trigger determination information STR is reflected. More specifically, when the above-described five failure states have not occurred, the interruption information SS is equivalent to the trigger determination information STR. In other words, in this case, it can be considered that the trigger determination information STR is inputted to the interruption switch 29 via the interruption latch circuit 70. When at least one of the above-described five failure states has occurred, the interruption switch 29 is turned off regardless of the detail of the trigger determination information STR. Therefore, when the trigger determination information STR indicates the trigger-off state, the interruption switch 29 is properly turned off.

(d) The interruption information SS is also inputted to the control circuit 23. Therefore, the control circuit 23 can effectively use the interruption information SS in the main process.

(e) Specifically, even if both the first trigger information ST1 and the second trigger information ST2 indicate the trigger-on state, the control circuit 23 does not output the motor drive command SD when the interruption information SS indicating the command interruption is inputted to the control circuit 23. This can increase reliability of the electric work machine 1.

(f) In a situation where the interruption information SS indicating the command interruption is not inputted to the control circuit 23 while the first trigger information ST1 and/or the second trigger information ST2 indicate the trigger-off state, the control circuit 23 does not output the motor drive command SD even if the trigger operating device 20 is on-operated. This can increase reliability of the electric work machine 1.

(g) The control circuit 23 can diagnose whether the trigger detection circuit 80 and the interruption latch circuit 70 properly operate by outputting the first pseudo signal SF1. In other words, the control circuit 23 can detect whether the trigger detection circuit 80 and/or the interruption latch circuit 70 properly operate based on the first trigger information ST1, the second trigger information ST2 and the interruption information SS before outputting the first pseudo signal SF1, and the first trigger information ST1, the second trigger information ST2 and the interruption information SS when outputting the first pseudo signal SF1. This can increase reliability of the electric work machine 1.

(h) In the present embodiment, the first trigger switch 27 is a normally open switch while the second trigger switch 28 is a normally closed switch. In other words, in response to the operation to the trigger operating device 20, the first trigger switch 27 and the second trigger switch 28 are in opposite states to each other.

With the configuration as above, if the second terminal of the first trigger switch 27 and the second terminal of the second trigger switch 28 are short-circuited, the logic levels of the first trigger information ST1 and the second trigger information ST2 become opposite to each other. Therefore, when the above short circuit occurs, driving of the motor 21 is stopped.

(i) The electric work machine 1 of the present embodiment has the functions achieved by at least one of the circuits to be diagnosed in the first to six diagnosis items. The electric work machine 1 is provided with a dual system, corresponding to each of the functions, that suppresses malfunction of the functions.

For example, the electric work machine 1 has a motor drive function to drive the motor 21 in response to the on-operation of the trigger operating device 20. The electric work machine 1 is provided with a first dual system corresponding to this motor drive function. The first dual system suppresses unintended rotation of the motor 21.

More specifically, the first dual system includes a first motor driving system and a second motor driving system. The motor 21, when both the first motor driving system and the second motor driving system operate properly, is properly driven or stopped. The first motor driving system includes a system from the trigger switch unit 26 to the drive line 90 via the trigger detection circuit 80 and the control circuit 23. In other words, in the first motor driving system, the motor drive command SD is outputted from the control circuit 23, in response to the on-operation of the trigger operating device 20. The second motor driving system includes a system from the trigger switch unit 26 to the interruption switch 29 via the trigger detection circuit 80 and the interruption latch circuit 70. In other words, in the second motor driving system, the interruption information SS indicating the command permission is outputted from the interruption latch circuit 70 to the interruption switch 29, in response to the on-operation of the trigger operating device 20.

In the first motor driving system, for example, one situation is assumed where a failure occurs in which the motor drive command SD is erroneously outputted from the control circuit 23 although the trigger operating device 20 is not on-operated. In this case, if the second motor driving system operates properly, the interruption switch 29 is turned off when the trigger operating device 20 is not on-operated, and the motor 21 is not driven. Conversely, in the second motor driving system, for example, one situation is assumed where a failure occurs in which the interruption switch 29 is turned on even if the trigger operating device 20 is not on-operated. In this case, if the first motor driving system operates properly, the motor drive command SD is not outputted from the control circuit 23 when the trigger operating device 20 is not on-operated, and thus the motor 21 is not driven.

Also, for example, the electric work machine 1 has a first switching function that completes or interrupts the first power supply line 91 by the first switching circuit 36. The electric work machine 1 is provided with a second dual system corresponding to the first switching function. The second dual system suppresses erroneous turning-on of the switch 37 of the first switching circuit 36.

More specifically, the second dual system includes a first on permission system and a second on permission system. The switch 37 of the first switching circuit 36 is properly turned on when both the first on permission system and the second on permission system operate properly. The first on permission system includes a system in which the control circuit 23 outputs the third discharge permission signal SA3 to turn on the switch 37 in response to the control circuit 23 receiving the first discharge permission signal SA1. More specifically, the control circuit 23 outputs the third discharge permission signal SA3 in response to receiving the first discharge permission signal SA1 and the second off detection signal SB2. The second on permission system includes a system in which the first discharge permission signal SA1 is inputted to the first switching circuit 36 without intervention of the control circuit 23.

In the first on permission system, for example, one situation is assumed where a failure occurs in which the third discharge permission signal SA3 is outputted from the control circuit 23 even if the control circuit 23 does not receive the first discharge permission signal SA1 In this case, if the second on permission system operates properly, the switch 37 is not turned on since a low-level signal is inputted from the battery failure detection circuit 12 to the AND circuit 38. This interrupts supply of electric power from the battery 11 to the motor 21, and the motor 21 is not driven by electric power of the battery 11.

Conversely, in the second on permission system, for example, one situation is assumed where a failure occurs in which the input terminal of the first discharge permission signal SA1 in the AND circuit 38 becomes high level even if the first discharge permission signal SA1 is not inputted from the battery failure detection circuit 12 to the electric work machine 1. In this case, if the first on permission system operates properly, the switch 37 is not turned on since the control circuit 23 does not output the third discharge permission signal SA3.

The electric work machine 1 has a second switching function to complete or interrupt the second power supply line 92 by the second switching circuit 46. The electric work machine 1 has a third dual system corresponding to the second switching function. The third dual system suppresses erroneous turning-on of the switch 47 of the second switching circuit 46. For example, one situation is assumed where a failure occurs in which the fourth discharge permission signal SA4 is outputted from the control circuit 23 although the control circuit 23 does not receive the second discharge permission signal SA2. In this case, if a low-level signal is properly inputted from the battery failure detection circuit 17 to the AND circuit 48, the switch 47 is not turned on. This interrupts supply of electric power from the battery 16 to the motor 21, and the motor 21 is not driven by electric power of the battery 16.

The electric work machine 1 further has a fourth dual system corresponding to the first switching function. The fourth dual system suppress erroneous turning-on of the switch 37 of the first switching circuit 36.

Specifically, the fourth dual system includes a third on permission system and a fourth on permission system. The switch 37 is properly turned on when both the third on permission system and the fourth on permission system operate properly. The third on permission system includes a system in which the control circuit 23 outputs the third discharge permission signal SA3 to turn on the switch 37 in response to the control circuit 23 receiving the second off detection signal SB2. More specifically, the control circuit 23 outputs the third discharge permission signal SA3 in response to receiving the second off detection signal SB2 and the first discharge permission signal SA1. The fourth on permission system includes a system in which the second off detection signal SB2 is inputted to the first switching circuit 36 without intervention of the control circuit 23.

In the third on permission system, for example, one situation is assumed where a failure occurs such as in which the third discharge permission signal SA3 is outputted from the control circuit 23 although the second off detection signal SB2 is not outputted to the control circuit 23. In this case, if the fourth on permission system operates properly, the switch 37 is not turned on. Conversely, in the fourth on permission system, for example, one situation is assumed where a failure occurs such as in which the input terminal of the second off detection signal SB2 in the AND circuit 38 becomes high level although the second off detection signal SB2 is not outputted from the second off detection circuit 49. In this case, if the third on permission system operates properly, the switch 37 is not turned on since the control circuit 23 does not output the third discharge permission signal SA3.

Also, for example, the electric work machine 1 has an overvoltage protection function by the overvoltage detection circuit 50. The electric work machine 1 includes a fifth dual system corresponding to this overvoltage protection function. The fifth dual system properly stops the motor 21 when the overvoltage state is generated. More specifically, the fifth dual system corresponding to the overvoltage protection function includes a first overvoltage protection system and a second overvoltage protection system. The first overvoltage protection system includes a system in which the interruption latch circuit 70 turns off the interruption switch 29 in response to the overvoltage signal So1. The second overvoltage protection system includes a system in which the control circuit 23 stops the motor drive command SD in response to the control circuit 23 detecting generation of the overvoltage state based on the voltage signal SV.

Also, for example, the electric work machine 1 has an overcurrent protection function by the current detection circuit 55. The electric work machine 1 includes a sixth dual system corresponding to this overcurrent protection function. The sixth dual system properly stops the motor 21 when the overcurrent state is generated. More specifically, the sixth dual system corresponding to the overcurrent protection function includes a first overcurrent protection system and a second overcurrent protection system. The first overcurrent protection system includes a system in which the interruption latch circuit 70 turns off the interruption switch 29 in response to the overcurrent signal So2. The second overcurrent protection function includes a system in which the control circuit 23 stops the motor drive command SD in response to the control circuit 23 detecting generation of the overcurrent state based on the current signal SC.

Also, for example, the electric work machine 1 includes a first overheat protection function by the first overheat detection circuit 61. The electric work machine 1 includes a seventh dual system corresponding to the first overheat protection function. The seventh dual system properly stops the motor 21 when the U-phase overheated state is generated. More specifically, the seventh dual system corresponding to the first overheat protection function includes a first overheat protection system and a second overheat protection system. The first overheat protection system includes a system in which the interruption latch circuit 70 turns off the interruption switch 29 in response to the first overheat signal So31. The second overheat protection system includes a system in which the control circuit 23 stops the motor drive command SD in response to the control circuit 23 detecting generation of the U-phase overheated state based on the first temperature signal STM1.

In each of the second overheat protection function by the second overheat detection circuit 62 and the third overheat protection function by the third overheat detection circuit 63 as well, two protection systems are built, as in the first overheat protection function.

In the present embodiment, the trigger operating device 20 corresponds to one example of a manipulator in the present disclosure. The first trigger switch 27 corresponds to one example of a first switch in the present disclosure. The second trigger switch 28 corresponds to one example of a second switch in the present disclosure. The first trigger information ST1 corresponds to one example of first switch information in the present disclosure. The second trigger information ST2 corresponds to one example of second switch information in the present disclosure. The motor drive command SD corresponds to one example of a drive command in the present disclosure. The motor drive circuit 22 corresponds to one example of a drive circuit in the present disclosure. The trigger detection circuit 80, the interruption latch circuit 70 and the interruption switch 29 correspond to one example of a drive stop circuit in the present disclosure. The AND circuit 82 in the trigger detection circuit 80 corresponds to one example of a stop signal output circuit in the present disclosure. The interruption switch 29 corresponds to one example of an interruption circuit in the present disclosure. The first pseudo signal SF1 corresponds to one example of a pseudo-ON signal of the present disclosure. The OR circuit 81 in the trigger detection circuit 80 corresponds to one example of a pseudo-ON circuit in the present disclosure.

The process of S1210 in FIG. 15 corresponds to one example of an output process in the present disclosure. The process of S1260 in FIG. 15 corresponds to one example of a first memory process and a second memory process in the present disclosure.

OTHER EMBODIMENTS

The embodiment of the present disclosure has been described in the above. The present disclosure is not limited to the above-described embodiment and can be variously modified.
 (1) In the above-described embodiment, the first terminal of the first trigger switch 27 is connected to the ground line and the second terminal of the first trigger switch 27 is connected to the control power-supply line via the resistor. The voltage of the second terminal is reflected on the first trigger information ST1.

Figure 18:
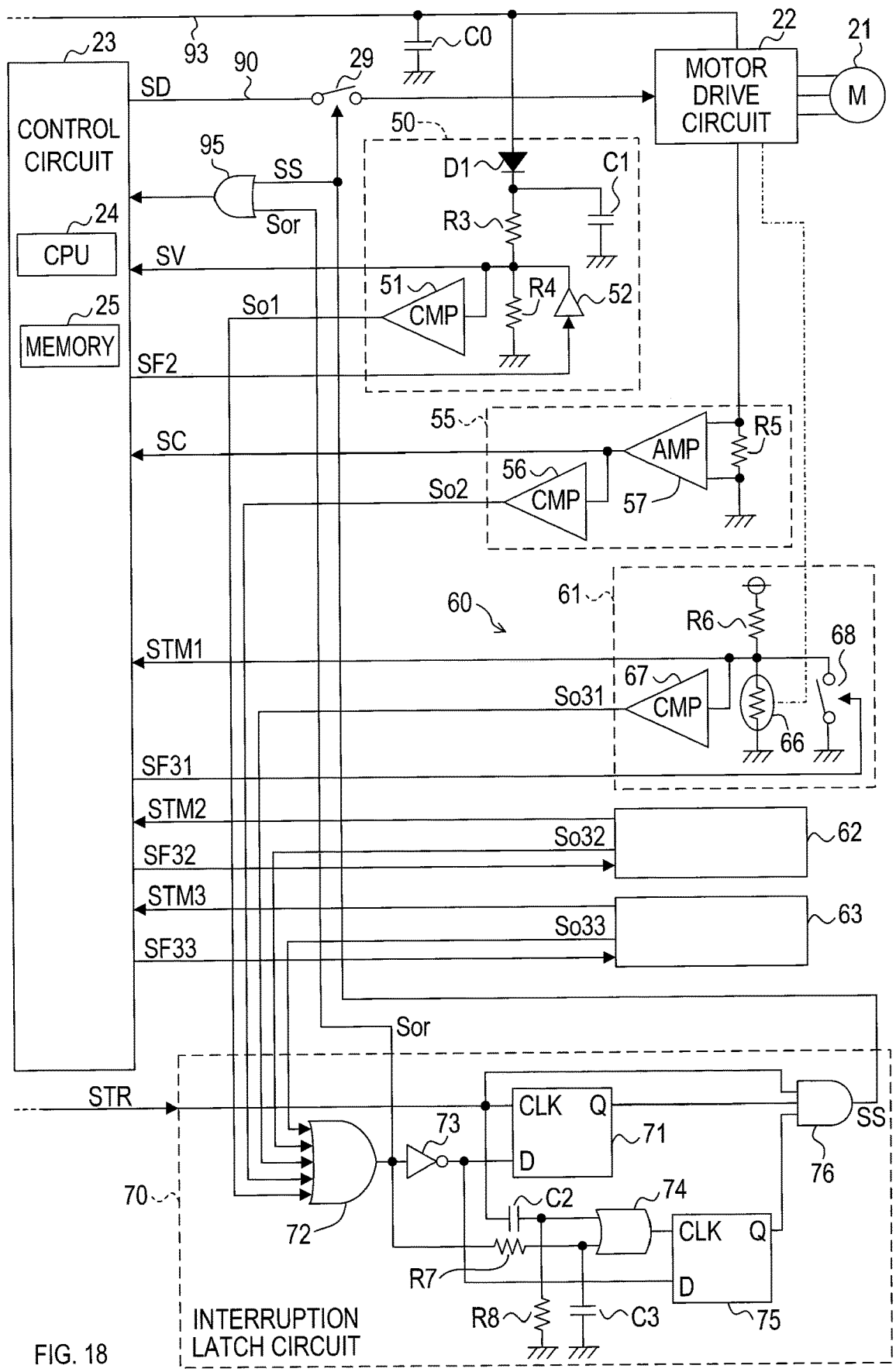
FIG. 18 is an explanatory diagram showing a first variation of the electrical configuration of the electric work machine.

However, the state of the first trigger switch 27 may be reflected on the first trigger information ST1 in any way. For example, the first terminal of the first trigger switch 27 may be connected to the control power-supply line via a resistor. The same applies to the second trigger switch 28.
 (2) The NOT circuit 85 and the OR circuit 81 may be connected to the second terminal of the second trigger switch 28.
 (3) The interruption switch 29 may be any switch. The interruption switch 29 may be a single switch, and may be configured by a circuit with multiple elements.
 (4) The trigger determination information STR outputted from the trigger detection circuit 80 may be inputted to the interruption switch 29 without intervention of the interruption latch circuit 70. In this case, for example, an OR circuit may be provided which calculates a logical sum of the trigger determination information STR and the interruption information SS. An output signal of the OR circuit may be inputted to the interruption switch 29.
 (5) Both of the first trigger switch 27 and the second trigger switch 28 may be normally closed or normally open switches. In that case, for example, the NOT circuit 85 may be omitted.
 (6) The overvoltage detection circuit 50, the current detection circuit 55, the overheat detector 60, the interruption latch circuit 70 and the trigger detection circuit 80 may have different circuit configurations than those shown in FIGS. 2 and 3.
 (7) The electric work machine 1 may have a self-diagnosis function of the current detection circuit 55. Specifically, the control circuit 23 may have a function to output a sixth pseudo signal for generating a pseudo overcurrent state to the current detection circuit 55. The current detection circuit 55 may be configured to turn the current signal SC into a signal indicating the overcurrent state when receiving the sixth pseudo signal. The configuration as such allows the control circuit 23 to diagnose whether the current detection circuit 55 properly operates based on the current signal SC when the sixth pseudo signal is outputted.
 (8) In the above-described embodiment, the interruption information SS and the failure detection information Sor are individually inputted to the control circuit 23. As shown in FIG. 18, a logical sum of the interruption information SS and the failure detection information Sor may be inputted to the control circuit 23. Specifically, as shown in FIG. 18, the electric work machine 1 may include an OR circuit 95. This OR circuit 95 may receive the interruption information SS and the failure detection information Sor. The control circuit 23 may receive an output signal of the OR circuit 95 instead of receiving the interrupt signal SS and the failure detection information Sor.
 (9) The prescribed order may be any order. Each diagnosis item may be associated with weighting. In that case, the prescribed order may be determined based on the weighting. More specifically, the prescribed order may be determined so that the larger the weighting of the diagnosis item is, the higher the execution frequency is.

In the prescribed order, at least one of the six diagnosis items may be arranged successively. Multiple diagnosis items may be assigned to one and the same order. In other words, multiple diagnosis items may be executed sequentially or in parallel at one diagnosis timing.

Figure 19:
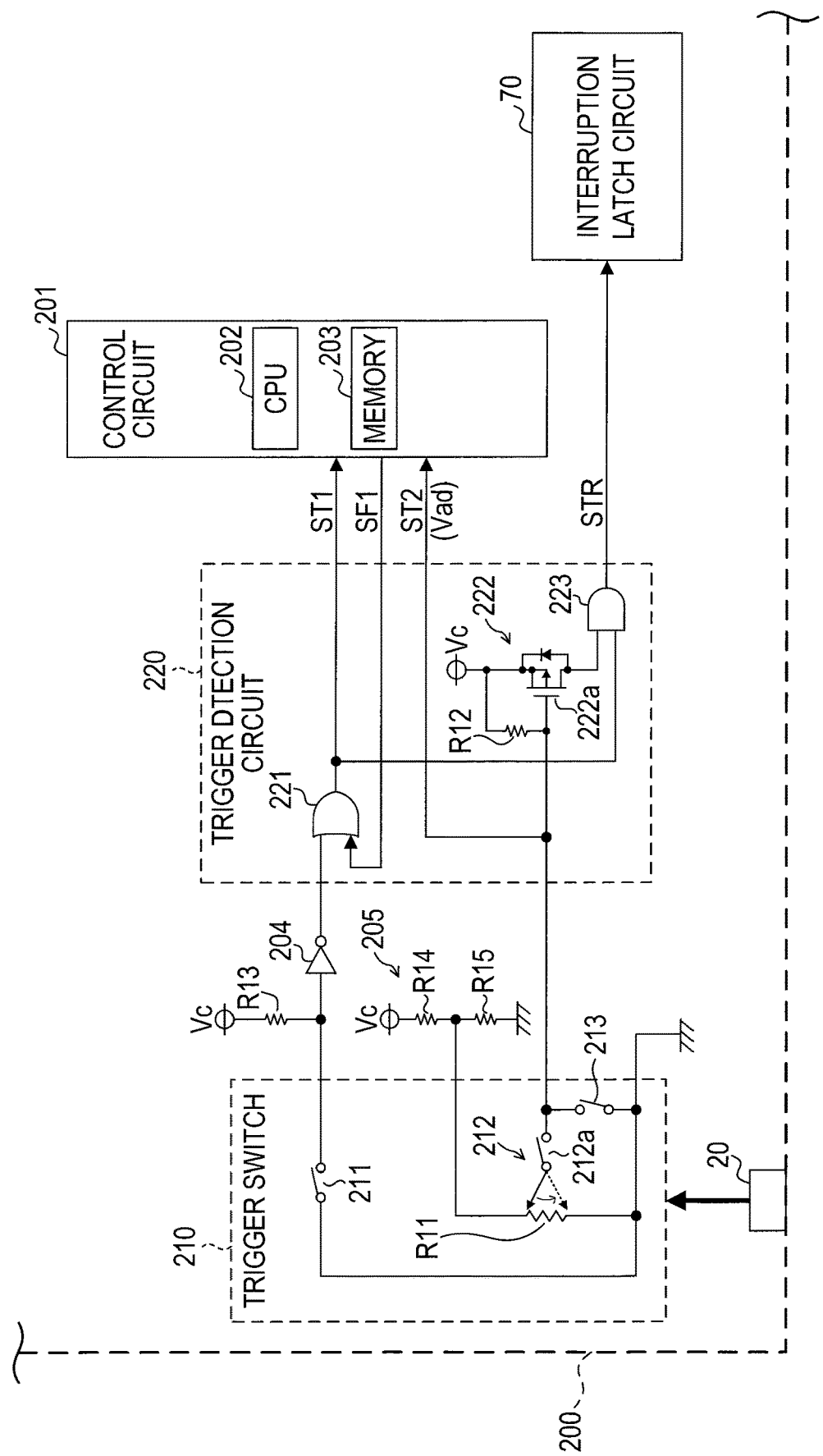
FIG. 19 is an explanatory diagram showing a second variation of the electrical configuration of the electric work machine.

Execution order of self-diagnosis is not limited to the prescribed order, and may be any order. For example, the execution order may be determined randomly. Specifically, for example, the electric work machine 1 may include a random number generator, and the random number generator may determine the next diagnosis item based on the generated random number.
 (10) The present disclosure can be applied to an electric work machine configured to control driving of the motor 21 in accordance with the operation amount of the trigger operating device 20. One example of a main body of the electric work machine configured as such is shown in FIG. 19 as a second variation. FIG. 19 mainly illustrates a portion of a main body 200 of the second variation which is different from the main body 3 shown in FIG. 2. In FIG. 19, the same components as those in the main body 3 in FIG. 2 are not illustrated. Specifically, the main body 200 shown in FIG. 19 is different from the main body 3 in FIG. 2 in circuit configuration for transmitting the operation state of the trigger operating device 20 to a control circuit 201 and the interruption latch circuit 70, and part of the motor control process by the control circuit 201.

In the main body 200 shown in FIG. 19, the trigger switch 210 includes a first trigger switch 211, and a trigger information output circuit (hereinafter, "information output circuit") 212. The information output circuit 212 includes a second trigger switch 212a and a variable resistor R11. The trigger switch 210 further includes a third trigger switch 213.

The first trigger switch 211, the second trigger switch 212a and the third trigger switch 213 are turned off in a non-operation state where the trigger operating device 20 is not operated (for example, not pulled). FIG. 19 shows the trigger switch 210 in the non-operation state.

When the user starts to pull the trigger operating device 20, or when the trigger operating device 20 is pulled by a certain amount from a start position of the pulling, the second trigger switch 212a is turned on first. After the second trigger switch 212a is turned on, and when trigger operating device 20 is pulled further by a certain amount, the first trigger switch 211 is turned on next. After the first trigger switch 211 is turned on, and when the trigger operating device 20 is pulled further and pulled to a prescribed maximum operation amount, the third trigger switch 213 is turned on. In the second variation, the on-operation of the trigger operating device 20 means pulling that causes the first trigger switch 211 and the second trigger switch 212a to be turned on.

A first terminal of the first trigger switch 211 is connected to the ground line. A second terminal of the first trigger switch 211 is connected to the control power-supply line via a resistor R13, and is connected to an input terminal of a NOT circuit 204.

The main body 200 further includes a voltage-dividing circuit 205. The voltage-dividing circuit 205 includes a resistor R14 and a resistor R15. The voltage-dividing circuit 205 divides the power-supply voltage. The voltage-dividing circuit 205 outputs the divided voltage (hereinafter, "divided voltage") to the trigger switch 210. Specifically, a first terminal of the resistor R14 is connected to the control power-supply line. A second terminal of the resistor R14 is connected to a first terminal of the resistor R15. A second terminal of the resistor R15 is connected to the ground line. Each of the resistors R14, R15 may have any resistance value. For example, the resistance value of the resistor R14 may be 470Ω or a value near 470Ω The resistance value of the resistor R15 may be, for example, 1 kΩ or a value near 1 kΩ.

In the information output circuit 212, the divided voltage from the voltage-dividing circuit 205 is applied to a first terminal of the variable resistor R11. A second terminal of the variable resistor R11 is connected to the ground line. A moving contact of the variable resistor R11 is connected to a first terminal of the second trigger switch 212a. A second terminal of the second trigger switch 212a is connected to a first terminal of the third trigger switch 213. A second terminal of the third trigger switch 213 is connected to the ground line. A voltage of the second terminal of the second trigger switch 212a is inputted to the control circuit 201 via a trigger detection circuit 220 as the second trigger information ST2.

When the trigger operating device 20 is further pulled after the first trigger switch 211 and the second trigger switch 212a are turned on due to the trigger operating device 20 being on-operated, the moving contact of the variable resistor R11 moves from the initial position to the end position in accordance with the operation amount. Immediately after the second trigger switch 212a is turned on, the moving contact is in the initial position. At this time, a resistance value (hereinafter, "ground-side resistance value") between the second terminal of the variable resistor R11 and the moving contact of the variable resistor R11 is a specified initial value (for example, 20 kΩ).

The ground-side resistance value decreases in response to the moving contact of the variable resistor R11 moving from the initial position to the end position (that is, in response to an increase in the operation amount of pulling of the trigger operating device 20). The timing when the ground-side resistance value starts to decrease from the initial value may be immediately after the trigger operating device 20 is shifted from the off-operation to the on-operation, or a timing when the trigger operating device 20 is further pulled by a certain amount from immediately after the shift.

The second trigger information ST2 in the second variation includes an analog voltage signal. This voltage signal indicates ON or OFF of the second switching element 212a. The voltage signal further indicates a pulling amount (in other words, information corresponding to the ground-side resistance value) of the trigger operating device 20 while the second switching element 212a is ON. The control circuit 201 includes an A/D conversion circuit (not shown). The control circuit 20, when receiving the voltage signal, converts the voltage signal to digital data by the A/D conversion circuit. A CPU 202 of the control circuit 201 performs various controls based on the data converted by the A/D conversion circuit. In the following description, the second trigger information ST2 is referred to as "A/D input value Vad".

In the main body 200, the trigger detection circuit 220 includes an OR circuit 221, a transmission circuit 222, and an AND circuit 223. The transmission circuit 222 includes a switching element 222a and a resistor R12.

An output signal of the NOT circuit 204 is inputted to a first input terminal of the OR circuit 221. A second input terminal of the OR circuit 221 is connected to an output terminal of the first pseudo signal SF1 in the control circuit 201. An output signal of the OR circuit 221 is inputted to the control circuit 201 and the AND circuit 223 as the first trigger information ST1.

The transmission circuit 222 transmits an ON or OFF state of the second trigger switch 212a to the AND circuit 223. Specifically, when the second trigger switch 212a is turned off, the transmission circuit 222 inputs a low-level transmission signal to a first input terminal of the AND circuit 223. When the second trigger switch 212a is turned on, the transmission circuit 222 inputs a high-level transmission signal to the first input terminal of the AND circuit 223. The low-level transmission signal is generated by turning-off of the switching element 222a. The high-level transmission signal is generated by turning-on of the switching element 222a.

In order to achieve the function as above, the transmission circuit 222 is more specifically configured as follows. That is, for example, a p-channel MOSFET is provided as the switching element 222a. A gate of the switching element 222a is connected to the second terminal of the second trigger switch 212a. A drain of the switching element 222a is connected to the control power-supply line. A source of the switching element 222a is connected to the first input terminal of the AND circuit 223. The resistor R12 is connected between the gate and the drain of the switching element 222a. The resistor R12 may have any resistance value. The resistance value of the resistor R12 may be, for example, 2.2 MΩ or a value near 2.2 MΩ.

The first trigger information ST1 is inputted to a second input terminal of the AND circuit 223. An output signal of the AND circuit 223 is inputted to the interruption latch circuit 70 as the trigger determination information STR.

Figure 20:
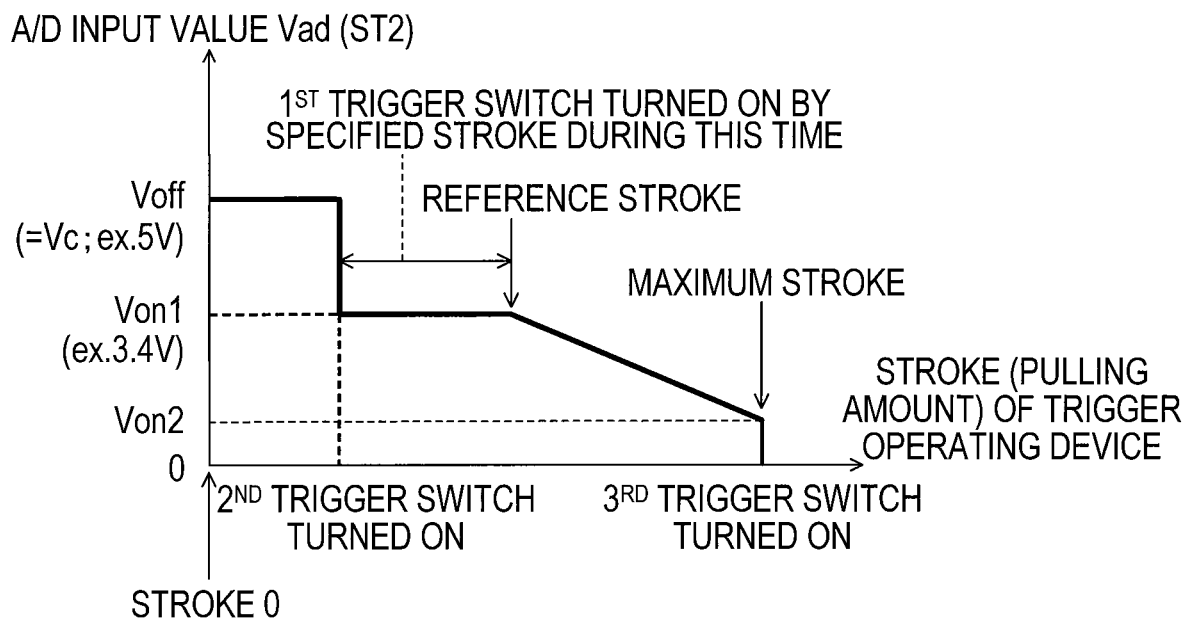
FIG. 20 is an explanatory diagram showing an example of change of an A/D input value Vad (second trigger information ST2) in the second variation.

In the main body 200 configured as above, the A/D input value Vad varies depending on the operation state of the trigger operating device 20, as illustrated in FIG. 20. Specifically, when the trigger operating device 20 is in the non-operation state, that is, when a stroke (pulling amount)

of the trigger operating device 20 is zero (0), the A/D input value Vad is a specified off-voltage value Voff. The off-voltage value Voff is approximately equal to the power-supply voltage value Vc (for example, 5 V). In other words, in this case, since the second trigger switch 212a is turned off, the power-supply voltage having the power-supply voltage value Vc is inputted to the control circuit 201 via the resistor R12 as the A/D input value Vad.

As the trigger operating device 20 is pulled and the stroke starts to increase, the second trigger switch 212a is turned on first as described above. When the second trigger switch 212a is turned on, the A/D input value Vad decreases to a specified first on-voltage value Von1 (for example, 3.4 V). Immediately after the second trigger switch 212a is turned on, the ground-side resistance value of the variable resistor R11 is the initial value. Thus, the first on-voltage value Von1 is approximately equal to the divided voltage from the voltage-dividing circuit 205. The first on-voltage value Von1 corresponds to one example of a value of an initial on-voltage in the present disclosure.

After the second trigger switch 212a is turned on, and when the stroke of the trigger operating device 20 further increases a certain amount, the first trigger switch 211 is turned on. At this time point, that is, the time point when the A/D input value Vad is the first on-voltage value Von1 and the first trigger switch 211 is turned on, the control circuit 201 recognizes that the trigger operating device 20 is on-operated. The control circuit 201 starts driving the motor 21 in response to recognition that the trigger operating device 20 is on-operated.

After the first trigger switch 211 is turned on, the ground-side resistance value of the variable resistor R11 starts to decrease in response to an increase in the stroke of the trigger operating device 20 from a reference stroke to the maximum stroke. Therefore, the A/D input value Vad starts to decrease in response to the increase in the stroke. The reference stroke corresponds to a stroke just before the moving contact of the variable resistor R11 starts moving from the initial position toward the end position. The maximum stroke corresponds to the above-described maximum operation amount. The A/D input value Vad just before the stroke reaches the maximum stroke is a second on-voltage value Von2. The ground-side resistance value of the variable resistor R11 at this time is, for example, 0Ω or a value near 0Ω. When the stroke reaches the maximum stroke, the third trigger switch 213 is turned on, and thereby the A/D input value Vad is 0 V. The first trigger switch 211 is configured to be turned on when a specified stroke is reached during the time until when the operation amount of the trigger operating device 20 reaches the reference stroke after the second trigger switch 212a is turned on.

The control circuit 201 controls the motor 21 in accordance with the A/D input value Vad while the trigger operating device 20 is on-operated. Specifically, the control circuit 201 performs a control such that, for example, when the A/D input value Vad is the first on-voltage value Von1, the rotational speed of the motor 21 is a specified minimum rotational speed. The control circuit 201 increases the rotational speed of the motor 21 in response to a decrease in the A/D input value Vad from the first on-voltage value Von1. The control circuit 201 performs a control such that the rotational speed of the motor 21 becomes a specified maximum rotational speed in response to the A/D input value Vad becoming equal to or less than the second on-voltage value Von2.

There may be no third trigger switch 213. However, providing the third trigger switch 213 allows the A/D input value Vad to reliably decrease to the second on-voltage value Von2 or less (that is, reliably controlling the rotational speed of the motor 21 to the maximum rotational speed) when the trigger operating device 20 is pulled to the maximum stroke.

The control circuit 201 includes the CPU 202 and a memory 203. The memory 203 stores basically the same program and data as those of the memory 25 in FIG. 2. The CPU 202 executes a program of the motor control process stored in the memory 203. The program of the motor control process stored in the memory 203 is partially different from the program of the motor control process (see FIG. 10) stored in the memory 25 (see FIG. 2). The motor control process executed by the CPU 202 in accordance with the program stored in the memory 203 will be described with reference to FIG. 21.

The CPU 202, when starting the motor control process, determines in S1410 whether the A/D input value Vad is equal to or less than the first on-voltage value Von1. In other words, this process is a process to determine whether the second trigger switch 212a is turned on.

When the A/D input value Vad is higher than the first on-voltage value Von1, the present process proceeds to S1460. The processes of S1460 to S1480 are the same as the processes of S350 to S370 in FIG. 10.

In S1410 when the A/D input value Vad is equal to or less than the first on-voltage value Von1 (that is, when the second trigger switch 212a is turned on), the present process proceeds to S1420. In S1420 it is determined whether the logic level of the first trigger information ST1 is high. In other words, this process is a process to determine whether the first trigger switch 211 is turned on.

When the logic level of the first trigger information ST1 is low, the present process proceeds to S1460. When the logic level of the first trigger information ST1 is high (that is, when the first trigger switch 211 is turned on), the present process proceeds to S1430. The CPU 202 recognizes that the trigger operating device 20 is on-operated by positive determination in S1410 and S1420, and proceeds to the motor drive process of S1450 after the processes of S1430 to S1440. The processes of S1430 to S1440 are the same as the processes of S320 to S330 in FIG. 10.

The motor drive process of S1450 is partially different from that of S340 in FIG. 10. Specifically, in S1450 the motor drive command SD for rotating the motor 21 at the rotational speed corresponding to the A/D input value Vad is outputted to the motor drive circuit 22 (not shown in FIG. 19; see FIG. 2). Correspondence between the A/D input value Vad and the rotational speed is as described above.

Figure 21:
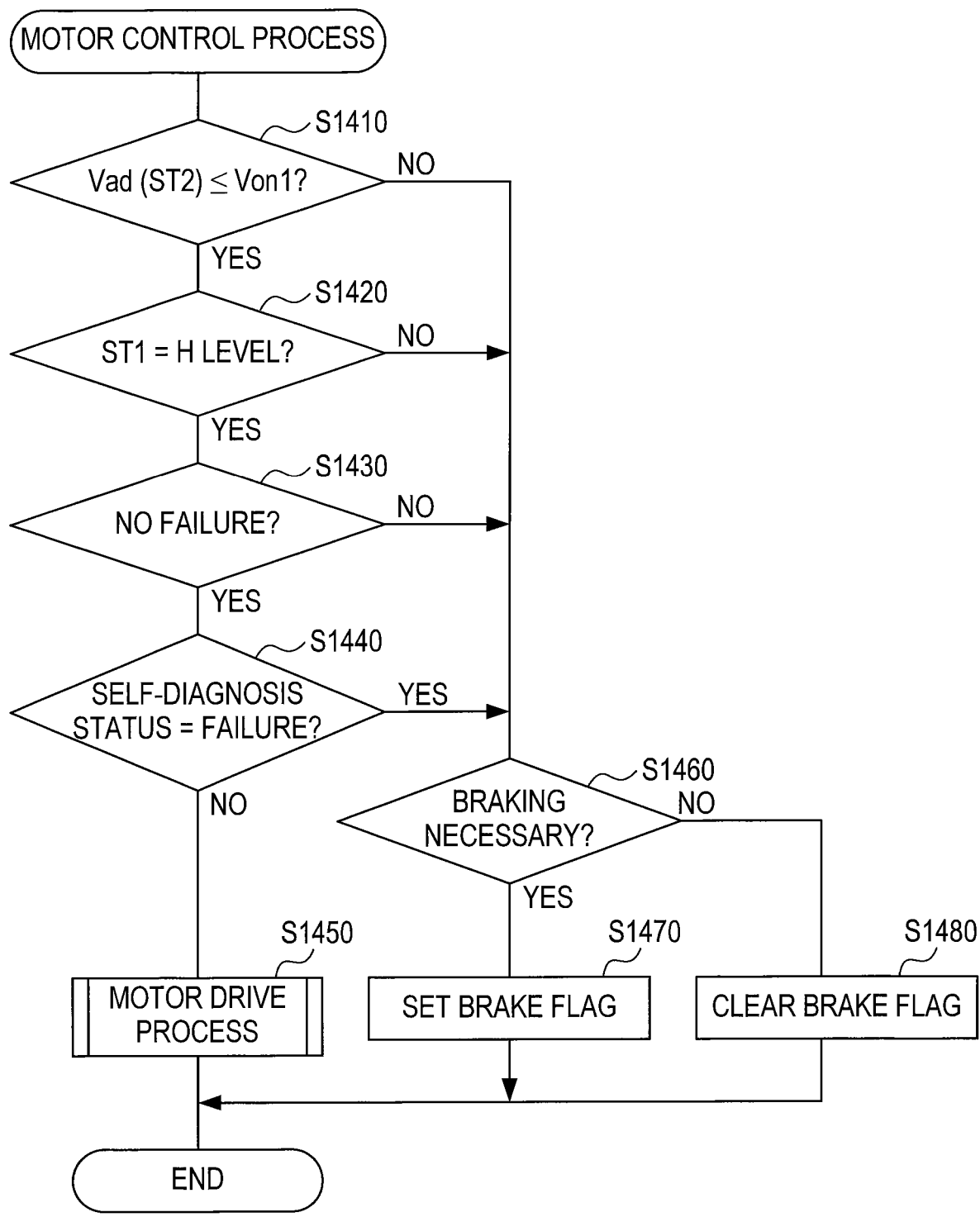
FIG. 21 is a flowchart showing the motor control process in the second variation.

(11) The control circuit 201 in the second variation shown in FIGS. 19 to 21, like the control circuit 23 of the aforementioned embodiment (see FIG. 2), has a self-diagnosis function that uses the first pseudo signal SF1 and the like. However, the control circuit 201 does not necessarily have to have such self-diagnosis function. One example of an electric work machine that does not have the self-diagnosis function that uses the first pseudo signal SF1 and the like will be shown in FIG. 22 as a third variation.

Figure 22:
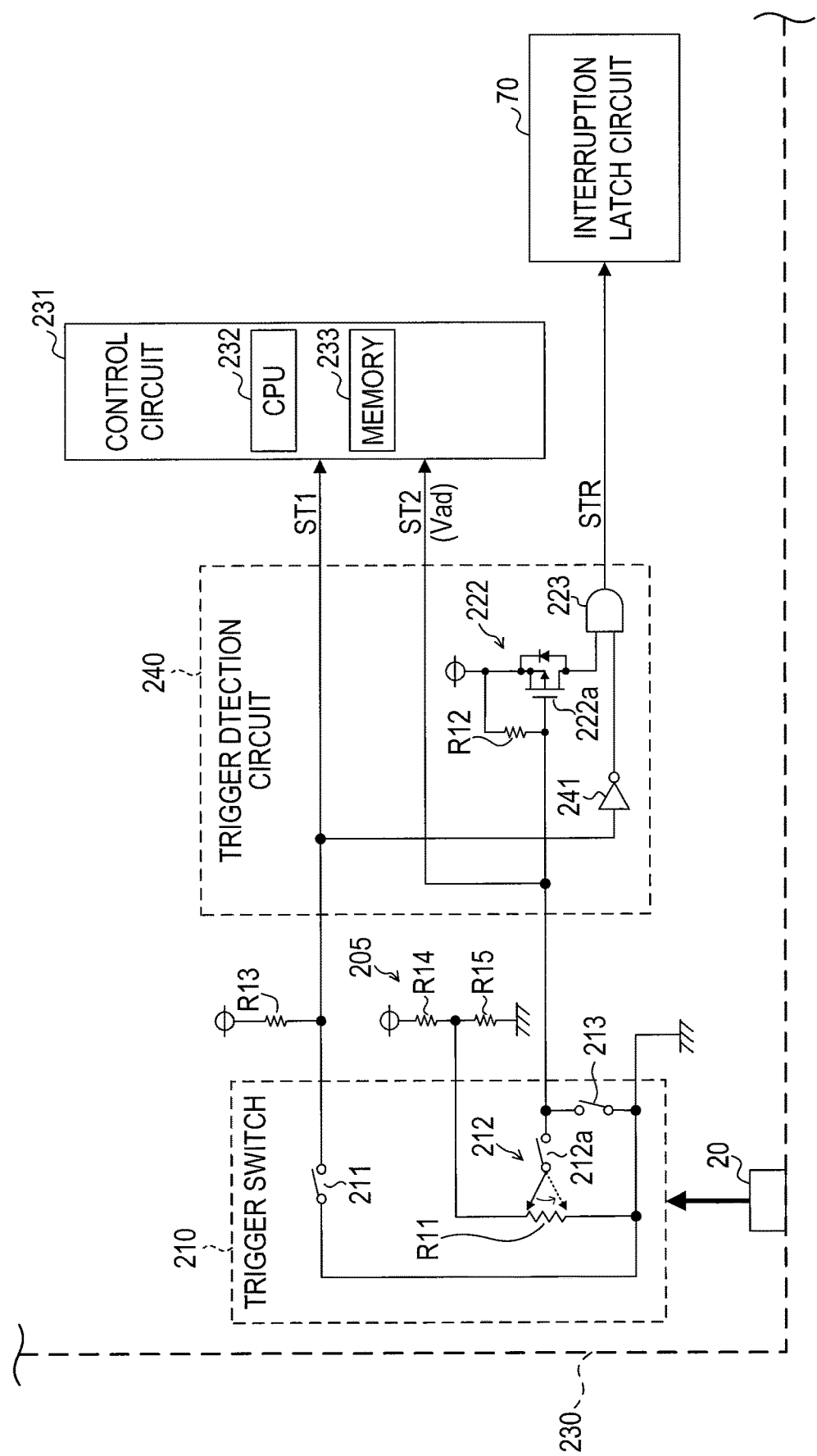
FIG. 22 is an explanatory diagram showing a third variation of the electrical configuration of the electric work machine.

In a main body 230 shown in FIG. 22, the NOT circuit 204 is eliminated from the main body 200 in the second variation shown in FIG. 19. Further, the main body 230 differs from the main body 200 in configuration of a trigger detection circuit 240 and part of processing of a control circuit 231.

As shown in FIG. 22, as compared with the trigger detection circuit 220 of FIG. 19, the trigger detection circuit 240 in the third variation does not include the OR circuit 221, and includes a NOT circuit 241. A voltage of the second terminal of the first trigger switch 211 is inputted to the control circuit 231 via the trigger detection circuit 240 as the first trigger information ST1. The first trigger information ST1 is further inputted to an input terminal of the NOT circuit 241. An output signal of the NOT circuit 241 is inputted to a second input terminal of the AND circuit 223.

In the main body 230 configured as above, while the first trigger switch 211 is OFF, the logic level of the first trigger information ST1 is high. When the first trigger switch 211 is turned on, the logic level of the first trigger information ST1 becomes low.

The control circuit 231 includes a CPU 232 and a memory 233. The memory 233 stores basically the same program and data as those of the memory 203 of FIG. 19. However, the program stored in the memory 233 differs from the program stored in the memory 203 (see FIG. 19) in that the self-diagnosis process is not executed. Further, part of the motor control process in the program stored in the memory 233 differs from the motor control process stored in the memory 203 (see FIG. 21). The motor control process stored in the memory 233 and executed by the CPU 232 will be described with reference to FIG. 23.

Figure 23:
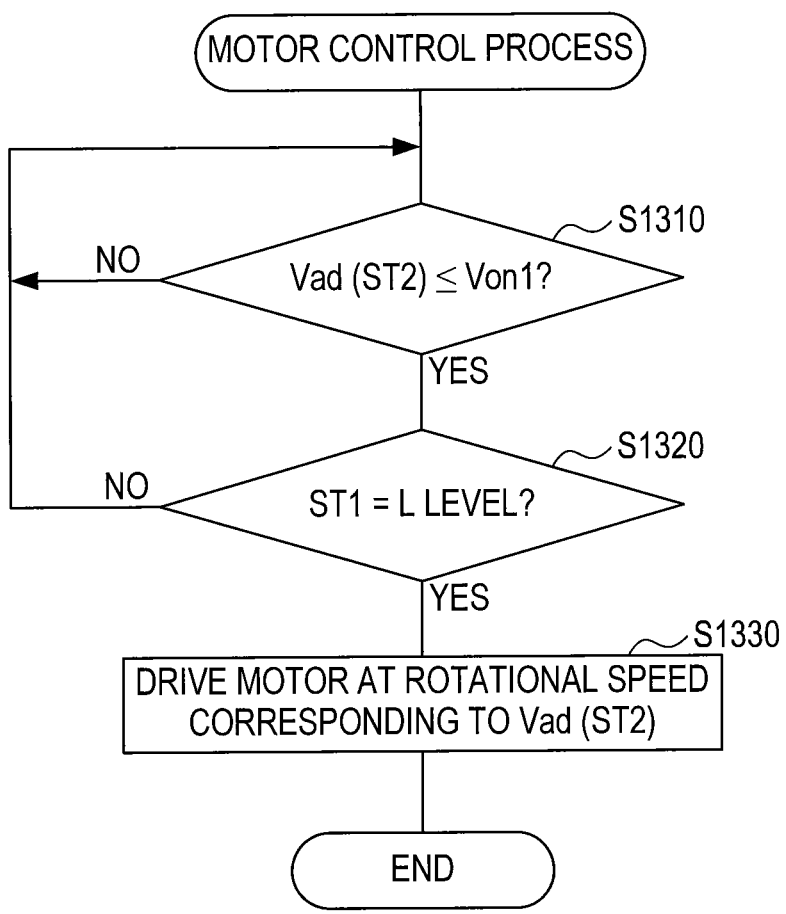
FIG. 23 is a flowchart showing the motor control process in the third variation.

The CPU 232, when starting the motor control process in FIG. 23, determines in S1310 whether the A/D input value Vad is equal to or less than the first on-voltage value Von1, as in S1410 of FIG. 21. When the A/D input value Vad is larger than the first on-voltage value Von1, determination of S1310 is repeated. When the A/D input value Vad is equal to or less than the first on-voltage value Von1, the present process moves to S1320.

In S1320, it is determined whether the logic level of the first trigger information ST1 is low. This process, like the process in S1420 of FIG. 21, is a process to determine whether the first trigger switch 211 is turned on.

When the logic level of the first trigger information ST1 is high, the present process moves to S1310. When the logic level of the first trigger information ST1 is low (that is, the first trigger switch 211 is turned on), the present process moves to S1330. In S1330, the motor drive command SD for driving the motor 21 at a rotational speed corresponding to the A/D input value Vad is outputted to the motor drive circuit 22.

In the second variation and the third variation, the first trigger switch 211 may be configured to be turned on before the second trigger switch 212a is turned on, depending on the operation of the trigger operating device 20. Alternatively, the first trigger switch 211 may be configured to be turned on simultaneously with the second trigger switch 212a.

(12) The motor of the present disclosure may be different from a brushless motor. The electric work machine of the present disclosure is not limited to an electric work machine driven by battery power, and may be an electric work machine that receives alternating current (AC) power and is driven by the AC power.

(13) The technique of the present disclosure may be applied to various electric work machines, such as electric work machines for gardening other than bush/grass cutters, and electric power tools for masonry work, metalworking, or woodworking. More specifically, the present disclosure may be applied to various electric work machines such as, for example, electric hammers, electric hammer drills, electric drills, electric drivers, electric wrenches, electric grinders, electric circular saws, electric reciprocating saws, electric jig saws, electric cutters, electric chain saws, electric planers, electric nailers (including tackers), electric hedge trimmers, electric lawn mowers, electric bush/grass trimmers, electric cleaners, electric blowers, electric sprayers, electric spreaders, electric dust collectors, and so on.

(14) Functions of one component in the aforementioned embodiment may be achieved by two or more components, and a function of one component may be achieved by two or more components. Functions of two or more components may be achieved by one component, and a function achieved by two or more components may be achieved by one component. A part of the aforementioned embodiment may be omitted. At least a part of the configuration of the aforementioned embodiment may be added to or replaced with the configuration of the other embodiments.

The invention claimed is:

1. An electric work machine comprising:
a battery;
a motor;
a motor drive circuit configured to (i) convert electric power of the battery into three-phase power and (ii) supply the three-phase power to the motor, in response to receiving a drive command;
a rotary blade configured to be rotated by the motor;
a handle configured to be gripped by a user of the electric work machine;
a trigger comprising a first trigger switch and a second trigger switch, and configured to be on-operated or off-operated by the user,
the first trigger switch being configured to be turned off in response to the trigger being on-operated and to be turned on in response to the trigger being off-operated, the first trigger switch being configured to output a first switch information indicating whether the first trigger switch is turned on or off,
the second trigger switch being configured to be turned on in response to the trigger being on-operated and to be turned off in response to the trigger being off-operated, the second trigger switch being configured to output a second switch information indicating whether the second trigger switch is turned on or off; and
a control circuit configured to execute a motor control process in accordance with a computer program, the control circuit being configured to receive the first switch information and the second switch information, and the motor control process including:
outputting the drive command in response to (i) the first switch information indicating that the first trigger switch is turned off and (ii) the second switch information indicating that the second trigger switch is turned on; and
stopping the output of the drive command in response to (i) the first switch information indicating that the first trigger switch is turned on and (ii) the second switch information indicating that the second trigger switch is turned off.

2. An electric work machine comprising:
a motor;
a manipulator configured to be on-operated or off-operated by a user of the electric work machine;
a first switch configured to be turned on or off in response to the manipulator being on-operated or off-operated;
a second switch configured to be turned on or off in response to the manipulator being on-operated or off-operated; and
a control circuit configured to execute a motor control process in accordance with a computer program, the control circuit being configured to receive a first switch information and a second switch information, the first switch information indicating a state of the first switch, the second switch information indicating a state of the second switch, and the motor control process including outputting a drive command in response to the first switch information and the second switch information indicating that the manipulator is on-operated, the drive command being a command to drive the motor.

3. The electric work machine according to claim 2, further comprising:
  a drive stop circuit configured to operate by hardware processing, the drive stop circuit being configured to receive the first switch information and the second switch information, and the drive stop circuit being configured to disable the drive command from the control circuit thereby to stop the motor in response to the state of the first switch and/or the state of the second switch corresponding to an off-operated state of the manipulator, the state of the first switch being indicated by the first switch information, and the state of the second switch being indicated by the second switch information.

4. The electric work machine according to claim 2,
  wherein the first switch is configured to be turned off in response to the manipulator being on-operated,
  wherein the first switch is configured to be turned on in response to the manipulator being off-operated,
  wherein the second switch is configured to be turned on in response to the manipulator being on-operated, and
  wherein the second switch is configured to be turned off in response to the manipulator being off-operated.

5. The electric work machine according to claim 2,
  wherein the manipulator is configured such that an operation amount of the manipulator is changed in conjunction with the manipulator being on-operated,
  wherein the electric work machine further comprises an information output circuit that includes the second switch,
  wherein the information output circuit is configured to output the second switch information, and is configured to output the second switch information including information indicating the operation amount while the second switch is ON, and
  wherein the control circuit is configured to output the drive command in accordance with the operation amount indicated by the second switch information.

6. The electric work machine according to claim 3 further comprising:
  a drive circuit configured to receive the drive command from the control circuit, the drive circuit being configured to supply electric power to the motor thereby to drive the motor in response to receiving the drive command,
  wherein the drive stop circuit is configured to interrupt the drive command to the drive circuit thereby to stop the motor.

7. The electric work machine according to claim 5,
  wherein the second switch information is indicated by a voltage corresponding to an operation state of the manipulator,
  wherein the information output circuit is configured to output an off-voltage as the second switch information in response to turning-off of the second switch, the off-voltage corresponding to turning-off of the second switch,
  wherein the information output circuit is configured to output an initial on-voltage as the second switch information in response to change of the second switch from OFF to ON, the initial voltage being lower than the off-voltage, and
  wherein the information output circuit is configured to reduce the voltage from the initial on-voltage in accordance with the operation amount while the second switch is ON.

8. The electric work machine according to claim 6,
  wherein the drive stop circuit includes:
    a stop signal output circuit configured to output a stop signal in response to the state of the first switch and/or the state of the second switch corresponding to the off-operated state of the manipulator; and
    an interruption circuit configured to receive the stop signal, the interruption circuit being configured to interrupt the drive command to the drive circuit in response to receiving the stop signal.

9. The electric work machine according to claim 8,
  wherein the control circuit is configured to receive the stop signal from the stop signal output circuit.

10. The electric work machine according to claim 8,
  wherein the control circuit is configured to output a pseudo-ON signal,
  wherein the electric work machine further comprising:
    a pseudo-ON circuit configured to receive the pseudo-ON signal, the pseudo-ON circuit being configured to set the first switch information to indicate that the manipulator is on-operated in response to receiving the pseudo-ON signal,
  wherein the control circuit is configured to store first information indicating a first failure state,
  wherein the control circuit is configured to execute:
    an output process to output the pseudo-ON signal in response to the first switch information and the second switch information indicating that the manipulator is off-operated; and
    a first memory process to store the first information in response to the control circuit not receiving the stop signal while the pseudo-ON signal is outputted by the output process, and
  wherein the control circuit is configured not to output the drive command in response to (i) the first switch information and the second switch information indicating that the manipulator is on-operated, and (ii) the first information being stored in the control circuit.

11. The electric work machine according to claim 9,
  wherein the control circuit is configured not to output the drive command in response to (i) the first switch information and the second switch information indicating that the manipulator is on-operated, and (ii) the control circuit receiving the stop signal.

12. The electric work machine according to claim 9,
  wherein the control circuit is configured not to output the drive command in response to change in the first switch information and the second switch information to indicate that the manipulator is on-operated, in a situation where the control circuit has not received the stop signal while the first switch information and/or the second switch information indicate that the manipulator is off-operated.

13. The electric work machine according to claim 10,
  wherein the control circuit is configured to store second information indicating a second failure state,
  wherein the control circuit is configured to further execute a second memory process to store the second information in response to (i) the control circuit outputting the pseudo-ON signal, and (ii) the first switch information not indicating that the manipulator is on-operated, and wherein the control circuit is configured not to output the drive command in response to (i) the first switch information and the second switch information indicating that the manipulator is on-operated, and (ii) the second information being stored in the control circuit.

* * * * *